(12) United States Patent
Milano et al.

(10) Patent No.: US 9,820,003 B2
(45) Date of Patent: *Nov. 14, 2017

(54) APPLICATION PANEL MANAGER

(71) Applicant: Flextronics AP, LLC, San Jose, CA (US)

(72) Inventors: Eduardo Diego Torres Milano, Burlington (CA); Gregory Burdzinski, Mississauga (CA); Todd Lee, Ancaster (CA); John S. Visosky, Gormley (CA); Tong Chen, Markham (CA); Terrance D. Voth, Uxbridge (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,612

(22) Filed: Nov. 19, 2015

(65) Prior Publication Data
US 2016/0182958 A1    Jun. 23, 2016

Related U.S. Application Data

(63) Continuation of application No. 13/968,709, filed on Aug. 16, 2013, now Pat. No. 9,374,546, and a
(Continued)

(51) Int. Cl.
*H04N 21/482* (2011.01)
*H04N 21/422* (2011.01)
(Continued)

(52) U.S. Cl.
CPC ......... *H04N 21/4823* (2013.01); *G06F 3/017* (2013.01); *G06F 3/0481* (2013.01);
(Continued)

(58) Field of Classification Search
CPC ........... H04N 5/44543; H04N 5/44513; H04N 21/4823; H04N 21/42207; H04N 21/4332
See application file for complete search history.

(56) References Cited

U.S. PATENT DOCUMENTS

| 4,284,849 A | 8/1981 | Anderson et al. |
| 5,539,479 A * | 7/1996 | Bertram ............ G06F 3/03548 345/158 |

(Continued)

FOREIGN PATENT DOCUMENTS

| CN | 1832534 | 9/2006 |
| CN | 101472102 | 7/2009 |

(Continued)

OTHER PUBLICATIONS

International Search Report and Written Opinion for International (PCT) Patent Application No. PCT/US13/36678, dated Aug. 30, 2013 9 pages.

(Continued)

*Primary Examiner* — Sumaiya A Chowdhury
(74) *Attorney, Agent, or Firm* — Sheridan Ross P.C.

(57) ABSTRACT

An Intelligent TV having a silo manager, a panel manager and a panel controller. The various managers and controllers managing a global panel and an application panel. The global panel includes various types of information and the various types of input and content available. The global panel includes various information including, for example, Live TV information, on demand information, media center information, application information, HDMI 1 information, HDMI 2 information, HDMI 3 information, component 1 information, component 2 information, AV 1 information, AV 2 information, VGA information, as well as an option to hide undetected inputs. The application panel is dynamic and can optionally change based on one or more of context and content of the underlying application being viewed. The (Continued)

application panel can include various subcategories of information, with the number and type of the subcategories also capable of being dynamic based on the underlying context or content.

19 Claims, 61 Drawing Sheets

Related U.S. Application Data continuation of application No. 13/968,652, filed on Aug. 16, 2013, now abandoned, and a continuation of application No. 13/968,681, filed on Aug. 16, 2013, now abandoned, and a continuation of application No. 13/968,732, filed on Aug. 16, 2013, now abandoned, and a continuation of application No. 13/969,777, filed on Aug. 19, 2013, now abandoned.

(60) Provisional application No. 61/684,672, filed on Aug. 17, 2012, provisional application No. 61/702,650, filed on Sep. 18, 2012, provisional application No. 61/697,710, filed on Sep. 6, 2012, provisional application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | | |
|---|---|---|
| H04N 21/462 | (2011.01) | |
| H04N 1/00 | (2006.01) | |
| H04N 21/231 | (2011.01) | |
| H04N 21/431 | (2011.01) | |
| H04N 21/4725 | (2011.01) | |
| H04N 21/40 | (2011.01) | |
| H04N 21/43 | (2011.01) | |
| H04N 21/8545 | (2011.01) | |
| H04N 21/85 | (2011.01) | |
| H04N 17/04 | (2006.01) | |
| H04N 5/44 | (2011.01) | |
| H04N 5/50 | (2006.01) | |
| H04N 21/262 | (2011.01) | |
| H04N 21/437 | (2011.01) | |
| H04N 21/81 | (2011.01) | |
| H04N 21/442 | (2011.01) | |
| H04N 21/485 | (2011.01) | |
| H04N 21/472 | (2011.01) | |
| H04N 21/4788 | (2011.01) | |
| H04N 21/475 | (2011.01) | |
| H04N 21/84 | (2011.01) | |
| H04N 21/478 | (2011.01) | |
| H04N 21/8358 | (2011.01) | |
| H04N 5/445 | (2011.01) | |
| G06F 3/0481 | (2013.01) | |
| H04N 21/488 | (2011.01) | |
| H04N 21/61 | (2011.01) | |
| H04N 21/439 | (2011.01) | |
| H04N 21/435 | (2011.01) | |
| H04N 21/432 | (2011.01) | |
| H04N 21/47 | (2011.01) | |
| H04L 12/58 | (2006.01) | |
| H04N 21/258 | (2011.01) | |
| H04N 21/45 | (2011.01) | |
| G06F 3/01 | (2006.01) | |
| G06F 3/0488 | (2013.01) | |
| H04N 5/45 | (2011.01) | |
| H04N 21/4782 | (2011.01) | |
| H04N 21/2543 | (2011.01) | |
| H04N 21/441 | (2011.01) | |
| H04N 21/2187 | (2011.01) | |
| H04N 21/4415 | (2011.01) | |
| H04N 21/658 | (2011.01) | |
| H04N 21/235 | (2011.01) | |
| H04N 21/426 | (2011.01) | |
| G06F 3/0484 | (2013.01) | |
| H04N 21/414 | (2011.01) | |
| H04N 21/433 | (2011.01) | |

(52) U.S. Cl.
CPC ...... *G06F 3/04817* (2013.01); *G06F 3/04842* (2013.01); *G06F 3/04883* (2013.01); *H04L 51/32* (2013.01); *H04N 1/00448* (2013.01); *H04N 5/44* (2013.01); *H04N 5/4401* (2013.01); *H04N 5/4403* (2013.01); *H04N 5/445* (2013.01); *H04N 5/44591* (2013.01); *H04N 5/45* (2013.01); *H04N 5/50* (2013.01); *H04N 17/04* (2013.01); *H04N 21/2187* (2013.01); *H04N 21/235* (2013.01); *H04N 21/23109* (2013.01); *H04N 21/2543* (2013.01); *H04N 21/25808* (2013.01); *H04N 21/25891* (2013.01); *H04N 21/26291* (2013.01); *H04N 21/40* (2013.01); *H04N 21/414* (2013.01); *H04N 21/4221* (2013.01); *H04N 21/42204* (2013.01); *H04N 21/42207* (2013.01); *H04N 21/42222* (2013.01); *H04N 21/42225* (2013.01); *H04N 21/42684* (2013.01); *H04N 21/43* (2013.01); *H04N 21/431* (2013.01); *H04N 21/432* (2013.01); *H04N 21/4302* (2013.01); *H04N 21/433* (2013.01); *H04N 21/435* (2013.01); *H04N 21/4307* (2013.01); *H04N 21/437* (2013.01); *H04N 21/4312* (2013.01); *H04N 21/4314* (2013.01); *H04N 21/4316* (2013.01); *H04N 21/4396* (2013.01); *H04N 21/441* (2013.01); *H04N 21/442* (2013.01); *H04N 21/4415* (2013.01); *H04N 21/44204* (2013.01); *H04N 21/44213* (2013.01); *H04N 21/44222* (2013.01); *H04N 21/4532* (2013.01); *H04N 21/462* (2013.01); *H04N 21/4622* (2013.01); *H04N 21/47* (2013.01); *H04N 21/472* (2013.01); *H04N 21/475* (2013.01); *H04N 21/478* (2013.01); *H04N 21/4725* (2013.01); *H04N 21/4753* (2013.01); *H04N 21/4755* (2013.01); *H04N 21/4756* (2013.01); *H04N 21/4782* (2013.01); *H04N 21/4788* (2013.01); *H04N 21/47202* (2013.01); *H04N 21/47205* (2013.01); *H04N 21/482* (2013.01); *H04N 21/485* (2013.01); *H04N 21/488* (2013.01); *H04N 21/4821* (2013.01); *H04N 21/4826* (2013.01); *H04N 21/4828* (2013.01); *H04N 21/4858* (2013.01);

H04N 21/4882 (2013.01); H04N 21/6125 (2013.01); H04N 21/6175 (2013.01); H04N 21/6582 (2013.01); H04N 21/8126 (2013.01); H04N 21/8133 (2013.01); H04N 21/8166 (2013.01); H04N 21/8173 (2013.01); H04N 21/8358 (2013.01); H04N 21/84 (2013.01); H04N 21/85 (2013.01); H04N 21/8545 (2013.01); G06F 2203/04804 (2013.01); H04N 21/42219 (2013.01); H04N 21/4332 (2013.01); H04N 2005/4407 (2013.01); H04N 2005/4414 (2013.01); H04N 2005/4432 (2013.01)

(56) References Cited

U.S. PATENT DOCUMENTS

| | | |
|---|---|---|
| 5,701,183 A | 12/1997 | Bellemare et al. |
| 5,872,588 A | 2/1999 | Aras et al. |
| 5,964,839 A | 10/1999 | Johnson et al. |
| 6,047,319 A | 4/2000 | Olson |
| 6,075,575 A * | 6/2000 | Schein ............... H04N 5/44543 345/684 |
| 6,219,839 B1 | 4/2001 | Sampsell |
| 6,298,482 B1 | 10/2001 | Seidman et al. |
| 6,317,882 B1 | 11/2001 | Robbins |
| 6,515,968 B1 | 2/2003 | Combar et al. |
| 6,604,238 B1 | 8/2003 | Lim et al. |
| 6,661,468 B2 | 12/2003 | Alten et al. |
| 7,058,600 B1 | 6/2006 | Combar et al. |
| 7,232,073 B1 | 6/2007 | de Jong |
| 7,233,316 B2 | 6/2007 | Smith et al. |
| 7,266,726 B1 | 9/2007 | Ladd et al. |
| 7,444,659 B2 | 10/2008 | Lemmons |
| 7,577,923 B2 | 8/2009 | Beam et al. |
| 7,623,933 B2 | 11/2009 | Sarosi et al. |
| 7,694,319 B1 | 4/2010 | Hassell et al. |
| 7,698,606 B2 | 4/2010 | Ladd et al. |
| 7,805,634 B2 | 9/2010 | Balazich et al. |
| 7,822,716 B2 | 10/2010 | Lee et al. |
| 7,962,935 B2 | 6/2011 | Kurosaki et al. |
| 8,006,201 B2 | 8/2011 | Bhattacharya |
| 8,170,545 B1 | 5/2012 | Freeburne |
| 8,418,206 B2 | 4/2013 | Bryant et al. |
| 8,566,874 B2 | 10/2013 | Roberts et al. |
| 8,756,620 B2 | 6/2014 | Papish et al. |
| 8,863,198 B2 | 10/2014 | Sirpal et al. |
| 9,021,517 B2 | 4/2015 | Selim |
| 9,077,928 B2 | 7/2015 | Milano et al. |
| 9,215,393 B2 | 12/2015 | Voth |
| 9,374,546 B2 | 6/2016 | Milano |
| 2001/0001160 A1* | 5/2001 | Shoff ............... H04N 5/44543 725/51 |
| 2001/0010097 A1 | 7/2001 | Lee |
| 2002/0042920 A1 | 4/2002 | Thomas et al. |
| 2002/0092024 A1 | 7/2002 | Nagaoka et al. |
| 2002/0129363 A1 | 9/2002 | McGuire |
| 2002/0184372 A1 | 12/2002 | Ishikawa et al. |
| 2003/0018639 A1 | 1/2003 | Iyengar |
| 2003/0056216 A1 | 3/2003 | Wugofski et al. |
| 2003/0084450 A1 | 5/2003 | Thurston et al. |
| 2003/0126613 A1 | 7/2003 | McGuire |
| 2003/0151621 A1 | 8/2003 | McEvilly et al. |
| 2003/0225777 A1 | 12/2003 | Marsh |
| 2003/0233241 A1 | 12/2003 | Marsh |
| 2003/0236708 A1 | 12/2003 | Marsh |
| 2004/0044698 A1 | 3/2004 | Ebata et al. |
| 2004/0083490 A1 | 4/2004 | Hane |
| 2004/0103120 A1 | 5/2004 | Fickle et al. |
| 2004/0111742 A1 | 6/2004 | Hendricks et al. |
| 2004/0117831 A1* | 6/2004 | Ellis ............... H04N 5/44543 725/53 |
| 2004/0119815 A1 | 6/2004 | Soloff |
| 2004/0237108 A1 | 11/2004 | Drazin et al. |
| 2005/0149964 A1 | 7/2005 | Thomas et al. |
| 2005/0185933 A1 | 8/2005 | Marsh |
| 2005/0188318 A1 | 8/2005 | Tamir et al. |
| 2005/0232210 A1 | 10/2005 | Karaoguz et al. |
| 2005/0267894 A1 | 12/2005 | Camahan |
| 2006/0224695 A1 | 10/2006 | Willis |
| 2006/0280449 A1 | 12/2006 | Ogawa et al. |
| 2007/0006264 A1 | 1/2007 | Steelberg et al. |
| 2007/0028282 A1 | 2/2007 | Kooijmans et al. |
| 2007/0050733 A1 | 3/2007 | Lee et al. |
| 2007/0096939 A1 | 5/2007 | Walrath |
| 2007/0143809 A1 | 6/2007 | Chen et al. |
| 2007/0157248 A1 | 7/2007 | Ellis |
| 2007/0157249 A1 | 7/2007 | Cordray et al. |
| 2007/0186068 A1 | 8/2007 | Agrawal |
| 2007/0186267 A1 | 8/2007 | Ohde et al. |
| 2007/0283011 A1 | 12/2007 | Rakowski et al. |
| 2008/0022309 A1 | 1/2008 | Begeja et al. |
| 2008/0034363 A1 | 2/2008 | Jones |
| 2008/0074683 A1 | 3/2008 | Yanamura et al. |
| 2008/0189587 A1 | 8/2008 | Takaku |
| 2009/0112899 A1 | 4/2009 | Johnson |
| 2009/0160764 A1 | 6/2009 | Myllymäki |
| 2009/0178081 A1 | 7/2009 | Goldenberg et al. |
| 2009/0179989 A1 | 7/2009 | Bessone et al. |
| 2009/0201998 A1 | 8/2009 | Komoriya |
| 2009/0210910 A1 | 8/2009 | Smith et al. |
| 2009/0293078 A1 | 11/2009 | Pirani et al. |
| 2010/0050219 A1 | 2/2010 | Angiolillo et al. |
| 2010/0086277 A1 | 4/2010 | Craner |
| 2010/0100512 A1 | 4/2010 | Brodin et al. |
| 2010/0122284 A1 | 5/2010 | Yoon et al. |
| 2010/0154003 A1 | 6/2010 | Bi et al. |
| 2010/0161506 A1 | 6/2010 | Bosenick et al. |
| 2010/0180292 A1 | 7/2010 | Epstein et al. |
| 2010/0191727 A1* | 7/2010 | Malik ............... G06F 17/30867 707/734 |
| 2010/0229157 A1 | 9/2010 | Ergan et al. |
| 2010/0263000 A1 | 10/2010 | Newell |
| 2010/0299712 A1 | 11/2010 | Austin et al. |
| 2010/0306368 A1 | 12/2010 | Gagliardi et al. |
| 2011/0016492 A1 | 1/2011 | Morita |
| 2011/0029666 A1 | 2/2011 | Lopatecki et al. |
| 2011/0055231 A1 | 3/2011 | Huck et al. |
| 2011/0060661 A1 | 3/2011 | Chai et al. |
| 2011/0061088 A1 | 3/2011 | Rieger et al. |
| 2011/0067046 A1 | 3/2011 | Cox et al. |
| 2011/0078754 A1 | 3/2011 | Howcroft et al. |
| 2011/0084899 A1 | 4/2011 | Jung et al. |
| 2011/0093888 A1 | 4/2011 | Araki et al. |
| 2011/0107389 A1 | 5/2011 | Chakarapani |
| 2011/0119626 A1 | 5/2011 | Faenger |
| 2011/0131596 A1 | 6/2011 | Amsterdam et al. |
| 2011/0213700 A1 | 9/2011 | Sant'Anselmo |
| 2011/0219395 A1 | 9/2011 | Moshiri et al. |
| 2011/0252446 A1 | 10/2011 | Jeong et al. |
| 2011/0273552 A1 | 11/2011 | Wang et al. |
| 2011/0283318 A1 | 11/2011 | Seidel et al. |
| 2011/0296456 A1 | 12/2011 | Pandala |
| 2012/0002951 A1 | 1/2012 | Reisman |
| 2012/0026400 A1 | 2/2012 | Kang et al. |
| 2012/0054794 A1 | 3/2012 | Kim et al. |
| 2012/0054803 A1 | 3/2012 | Lee et al. |
| 2012/0069131 A1 | 3/2012 | Abelow |
| 2012/0079096 A1 | 3/2012 | Cowan et al. |
| 2012/0096264 A1 | 4/2012 | Traversat et al. |
| 2012/0099024 A1 | 4/2012 | Ryu et al. |
| 2012/0120316 A1 | 5/2012 | Lee |
| 2012/0124615 A1 | 5/2012 | Lee |
| 2012/0126790 A1 | 5/2012 | Sobotka et al. |
| 2012/0144422 A1 | 6/2012 | Han et al. |
| 2012/0147049 A1 | 6/2012 | Lee |
| 2012/0147270 A1 | 6/2012 | Kim et al. |
| 2012/0179648 A1 | 7/2012 | Loo |
| 2012/0194742 A1* | 8/2012 | Barnes ............... H04N 5/44513 348/569 |
| 2012/0210375 A1 | 8/2012 | Wong et al. |
| 2012/0210386 A1 | 8/2012 | Kim et al. |
| 2012/0221972 A1 | 8/2012 | Dougall et al. |
| 2012/0229473 A1 | 9/2012 | Tam |
| 2012/0242500 A1 | 9/2012 | Hirose |
| 2012/0257108 A1 | 10/2012 | Friedlander et al. |

(56) References Cited

U.S. PATENT DOCUMENTS

| | | |
|---|---|---|
| 2012/0260284 A1 | 10/2012 | Friedlander et al. |
| 2012/0272231 A1 | 10/2012 | Kwon et al. |
| 2012/0278725 A1 | 11/2012 | Gordon et al. |
| 2012/0304229 A1 | 11/2012 | Choi et al. |
| 2012/0331505 A1 | 12/2012 | Chun et al. |
| 2013/0014006 A1 | 1/2013 | Abellera et al. |
| 2013/0051615 A1 | 2/2013 | Lim et al. |
| 2013/0091053 A1 | 4/2013 | Park et al. |
| 2013/0152135 A1 | 6/2013 | Hong et al. |
| 2013/0160065 A1 | 6/2013 | Aso et al. |
| 2013/0174137 A1 | 7/2013 | Kim |
| 2013/0198767 A1 | 8/2013 | Wang et al. |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0291015 A1 | 10/2013 | Pan |
| 2013/0298164 A1 | 11/2013 | Moreau et al. |
| 2013/0326557 A1 | 12/2013 | Kang et al. |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052785 A1 | 2/2014 | Sirpal |
| 2014/0052786 A1 | 2/2014 | de Paz |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059491 A1 | 2/2014 | Kim et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059599 A1 | 2/2014 | Sirpal et al. |
| 2014/0059600 A1 | 2/2014 | Dourado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059605 A1 | 2/2014 | Sirpal et al. |
| 2014/0059606 A1 | 2/2014 | Selim et al. |
| 2014/0059609 A1 | 2/2014 | Duarado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0075475 A1 | 3/2014 | Sirpal et al. |
| 2014/0075476 A1 | 3/2014 | de Paz et al. |
| 2014/0075477 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim et al. |
| 2014/0109143 A1 | 4/2014 | Craner |
| 2014/0115633 A1 | 4/2014 | Selim et al. |
| 2014/0173660 A1 | 6/2014 | Correa et al. |
| 2014/0181851 A1 | 6/2014 | Givon et al. |
| 2014/0188970 A1 | 7/2014 | Madhok et al. |
| 2014/0259074 A1 | 9/2014 | Ansari et al. |
| 2014/0380414 A1 | 12/2014 | Saidi et al. |
| 2015/0156548 A1 | 6/2015 | Sirpal et al. |
| 2015/0156554 A1 | 6/2015 | Sirpal et al. |
| 2015/0163537 A1 | 6/2015 | Sirpal et al. |
| 2015/0172765 A1 | 6/2015 | Shoykher et al. |
| 2015/0189390 A1 | 7/2015 | Sirpal et al. |
| 2015/0201147 A1 | 7/2015 | Sirpal et al. |
| 2015/0208135 A1 | 7/2015 | Sirpal et al. |
| 2016/0119675 A1 | 4/2016 | Voth et al. |

FOREIGN PATENT DOCUMENTS

| | | |
|---|---|---|
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2487922 | 8/2012 |
| WO | WO 01/06784 | 1/2001 |
| WO | WO 02/080552 | 10/2002 |
| WO | WO 03/044755 | 5/2003 |
| WO | WO 2012/073027 | 6/2012 |
| WO | WO 2012/094247 | 7/2012 |

OTHER PUBLICATIONS

International Preliminary Report on Patentability for International (PCT) Patent Application No. PCT/US13/36678, dated Feb. 26, 2015 8 pages.

International Search Report and Written Opinion for International (PCT) Patent Application No. PCT/US2013/055344, dated Mar. 11, 2014 8 pages.

International Preliminary Report for International (PCT) Patent Application No. PCT/US2013/055344, dated Apr. 2, 2015 7 pages.

International Search Report and Written Opinion for International (PCT) Patent Application No. PCT/US2013/055345, dated Dec. 6, 2013 7 pages.

International Preliminary Report for International (PCT) Patent Application No. PCT/US2013/055345, dated Jun. 25, 2015 6 pages.

International Search Report and Written Opinion for International (PCT) Patent Application No. PCT/US13/55371, dated Nov. 8, 2013 7 pages.

International Preliminary Report on Patentability for International (PCT) Patent Application No. PCT/US13/55371, dated Jun. 25, 2015 6 pages.

International Search Report and Written Opinion for International (PCT) Patent Application No. PCT/US2013/055312, dated Dec. 5, 2013 8 pages.

International Search Report and Written Opinion for International (PCT) Patent Application No. PCT/US2013/055312, dated Jun. 25, 2015 8 pages.

International Search Report and Written Opinion for International (PCT) Patent Application No. PCT/US13/55374, dated Nov. 12, 2013 8 pages.

International Preliminary Report on Patentability for International (PCT) Patent Application No. PCT/US13/55374, dated Jun. 25, 2015 7 pages.

International Search Report and Written Opinion for International (PCT) Patent Application No. PCT/US13/55542, dated Mar. 10, 2014 9 pages.

(56) References Cited

OTHER PUBLICATIONS

International Preliminary Report on Patentability for International (PCT) Patent Application No. PCT/US13/55542, dated Jun. 25, 2015 8 pages.
International Search Report and Written Opinion for International (PCT) Patent Application No. PCT/US13/55315, dated Jan. 24, 2014 9 pages.
International Preliminary Report on Patentability for International (PCT) Patent Application No. PCT/US13/55315, dated Jun. 25, 2015 8 pages.
International Search Report and Written Opinion for International (PCT) Patent Application No. PCT/US2013/055317, dated Dec. 2, 2013 9 pages.
International Preliminary Report on Patentability for International (PCT) Patent Application No. PCT/US2013/055317, dated Jun. 25, 2015 8 pages.
International Search Report and Written Opinion for International (PCT) Patent Application No. PCT/US2013/055318, dated Jan. 9, 2014 10 pages.
International Preliminary Report on Patentability for International (PCT) Patent Application No. PCT/US2013/055318, dated Jun. 25, 2015 9 pages.
International Search Report and Written Opinion for International (PCT) Patent Application No. PCT/US2013/055319, dated Mar. 11, 2014 7 pages.
International Preliminary Report on Patentability for International (PCT) Patent Application No. PCT/US2013/055319, dated Jun. 25, 2015 6 pages.
International Search Report and Written Opinion for International (PCT) Patent Application No. PCT/US2013/055321, dated Dec. 6, 2013 9 pages.
International Preliminary Report on Patentability for International (PCT) Patent Application No. PCT/US2013/055321, dated Jun. 25, 2015 9 pages.
International Search Report and Written Opinion for International (PCT) Patent Application No. PCT/CN2013/081630, dated Nov. 21, 2013 11 pages.
International Preliminary Report on Patentability for International (PCT) Patent Application No. PCT/CN2013/081630, dated Apr. 2, 2015 6 pages.
Official Action for U.S. Appl. No. 14/407,601 , dated Apr. 22, 2016 12 pages.
Official Action for U.S. Appl. No. 13/968,652, dated Dec. 5, 2014 25 pages.
Official Action for U.S. Appl. No. 13/968,652, dated Apr. 17, 2015 17 pages.
Official Action for U.S. Appl. No. 13/968,652, dated Oct. 15, 2015 14 pages.
Official Action for U.S. Appl. No. 13/968,681, dated Feb. 1, 2016 17 pages.
Official Action for U.S. Appl. No. 13/968,709, dated Nov. 14, 2014 17 pages.
Official Action for U.S. Appl. No. 13/968,709, dated Feb. 23, 2015 13 pages.
Official Action for U.S. Appl. No. 13/968,709, dated Aug. 19, 2015 11 pages.
Notice of Allowance for U.S. Appl. No. 13/968,709, dated Feb. 12, 2016 9 pages.
Official Action for U.S. Appl. No. 13/968,610, dated Apr. 30, 2014 11 pages.
Official Action for U.S. Appl. No. 13/968,610, dated Aug. 19, 2014 13 pages.
Official Action for U.S. Appl. No. 13/968,610, dated Dec. 31, 2014 7 pages.
Notice of Allowance for U.S. Appl. No. 13/968,610, dated Feb. 24, 2015 5 pages.
Official Action for U.S. Appl. No. 13/968,732, dated May 27, 2014 12 pages.
Official Action for U.S. Appl. No. 13/968,732, dated Dec. 26, 2014 13 pages.
Official Action for U.S. Appl. No. 13/968,732, dated Sep. 4, 2015 14 pages.
Official Action for U.S. Appl. No. 13/969,777, dated Jun. 25, 2014 9 pages.
Official Action for U.S. Appl. No. 13/969,777, dated Jan. 8, 2015 11 pages.
Official Action for U.S. Appl. No. 13/969,777, dated Apr. 15, 2015 11 pages.
Official Action for U.S. Appl. No. 13/969,777, dated Oct. 5, 2015 12 pages.
Official Action for U.S. Appl. No. 13/968,618, dated Feb. 3, 2016 16 pages.
Official Action for U.S. Appl. No. 13/968,625, dated Jun. 26, 2016 18 pages.
Official Action for U.S. Appl. No. 14/867,967, dated May 25, 2016 18 pages.
Official Action for U.S. Appl. No. 13/968,630, dated Jul. 31, 2014 9 pages.
Official Action for U.S. Appl. No. 13/968,630, dated Nov. 19, 2014 11 pages.
Official Action for U.S. Appl. No. 13/968,630, dated Mar. 27, 2015 15 pages.
Notice of Allowance for U.S. Appl. No. 13/968,630, dated Mar. 27, 2015 5 pages.
Official Action for U.S. Appl. No. 13/968,638, dated Jan. 4, 2016 8 pages.
Official Action for U.S. Appl. No. 13/968,644, dated Mar. 11, 2016 18 pages.
Official Action for U.S. Appl. No. 14/418,971, dated Oct. 8, 2015 9 pages.
Official Action for U.S. Appl. No. 14/418,971, dated May 5, 2016 11 pages.

* cited by examiner

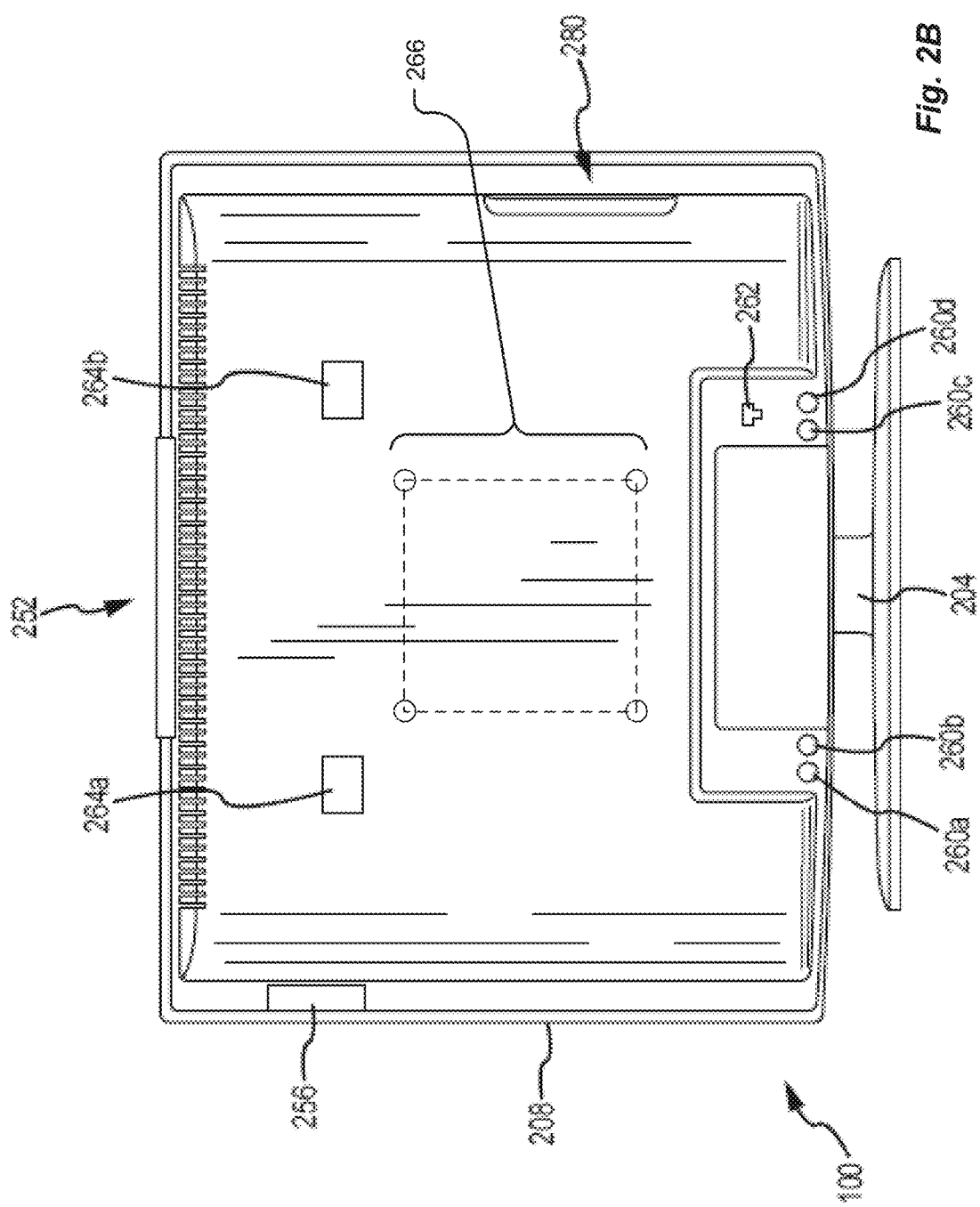

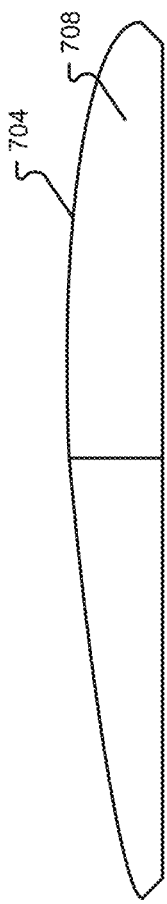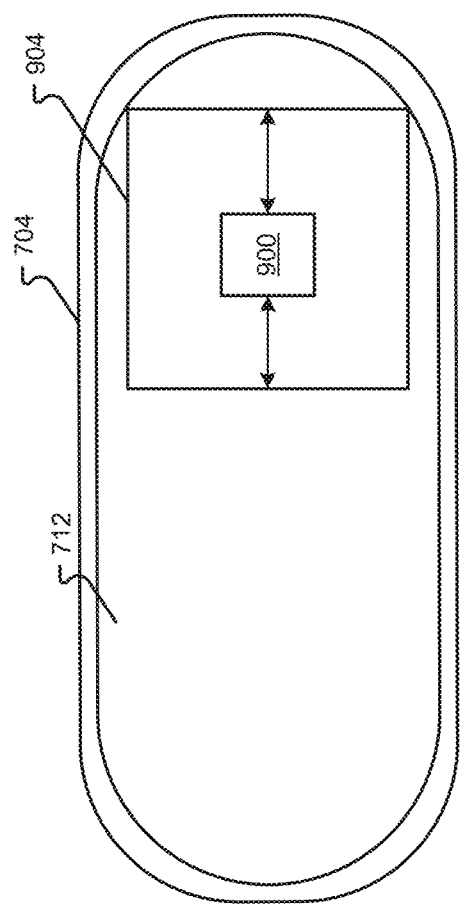

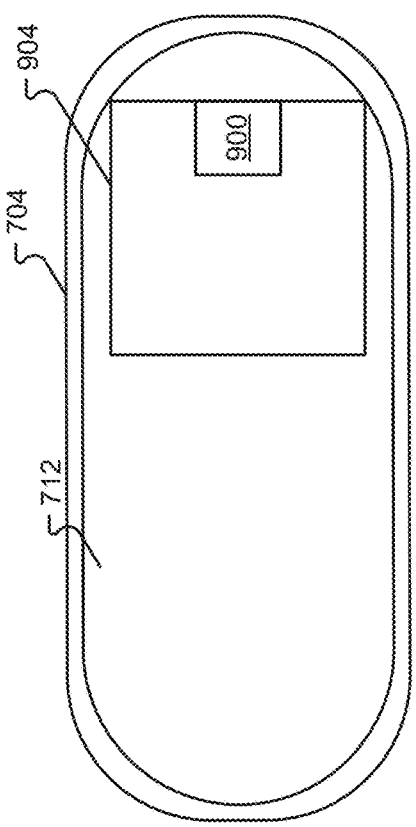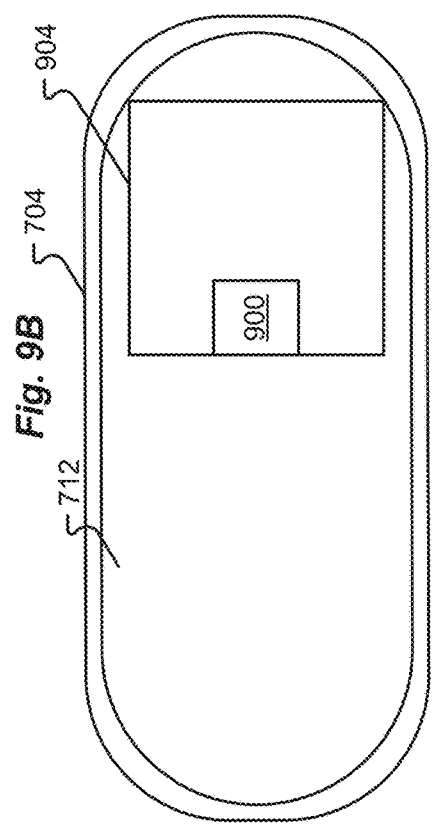

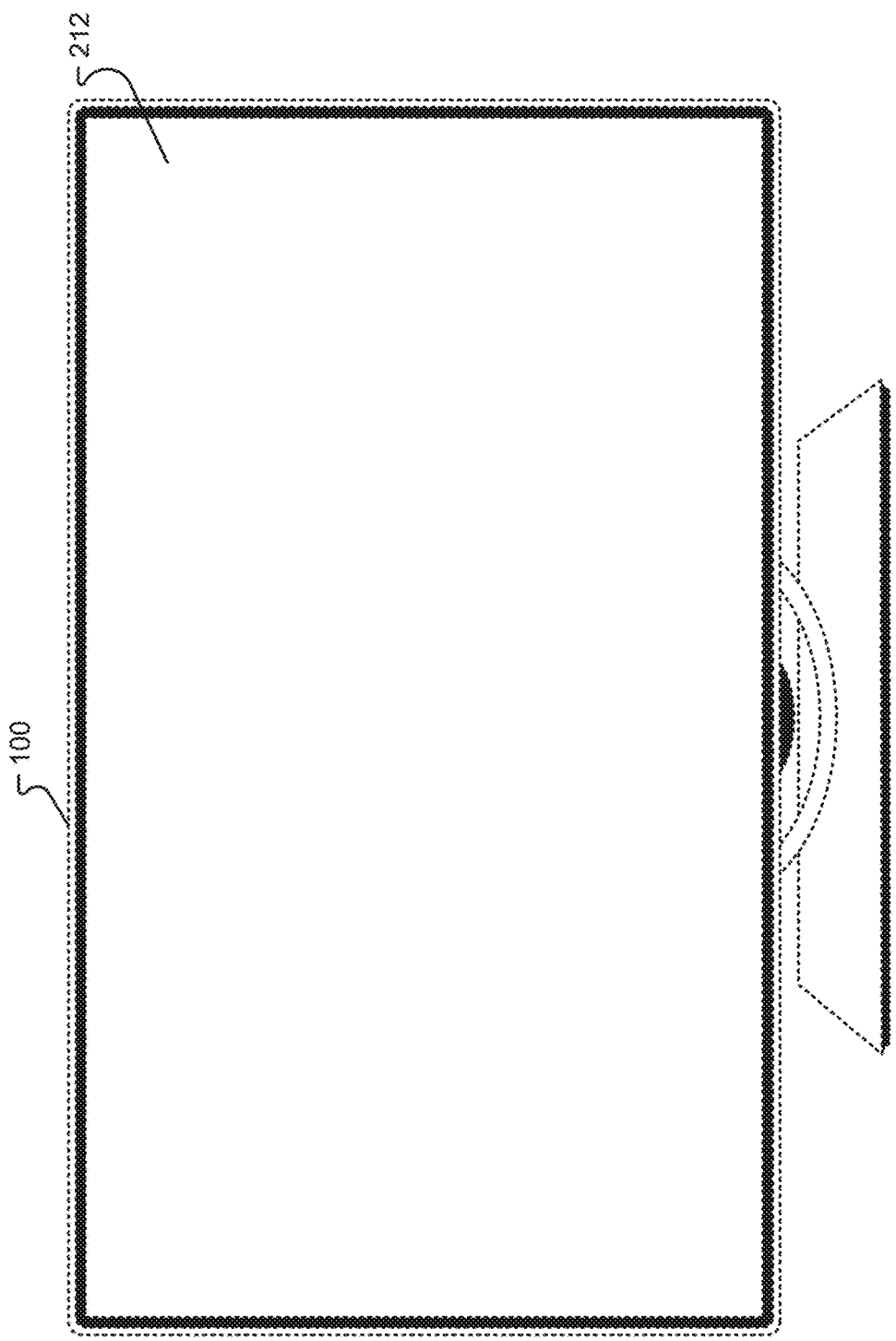

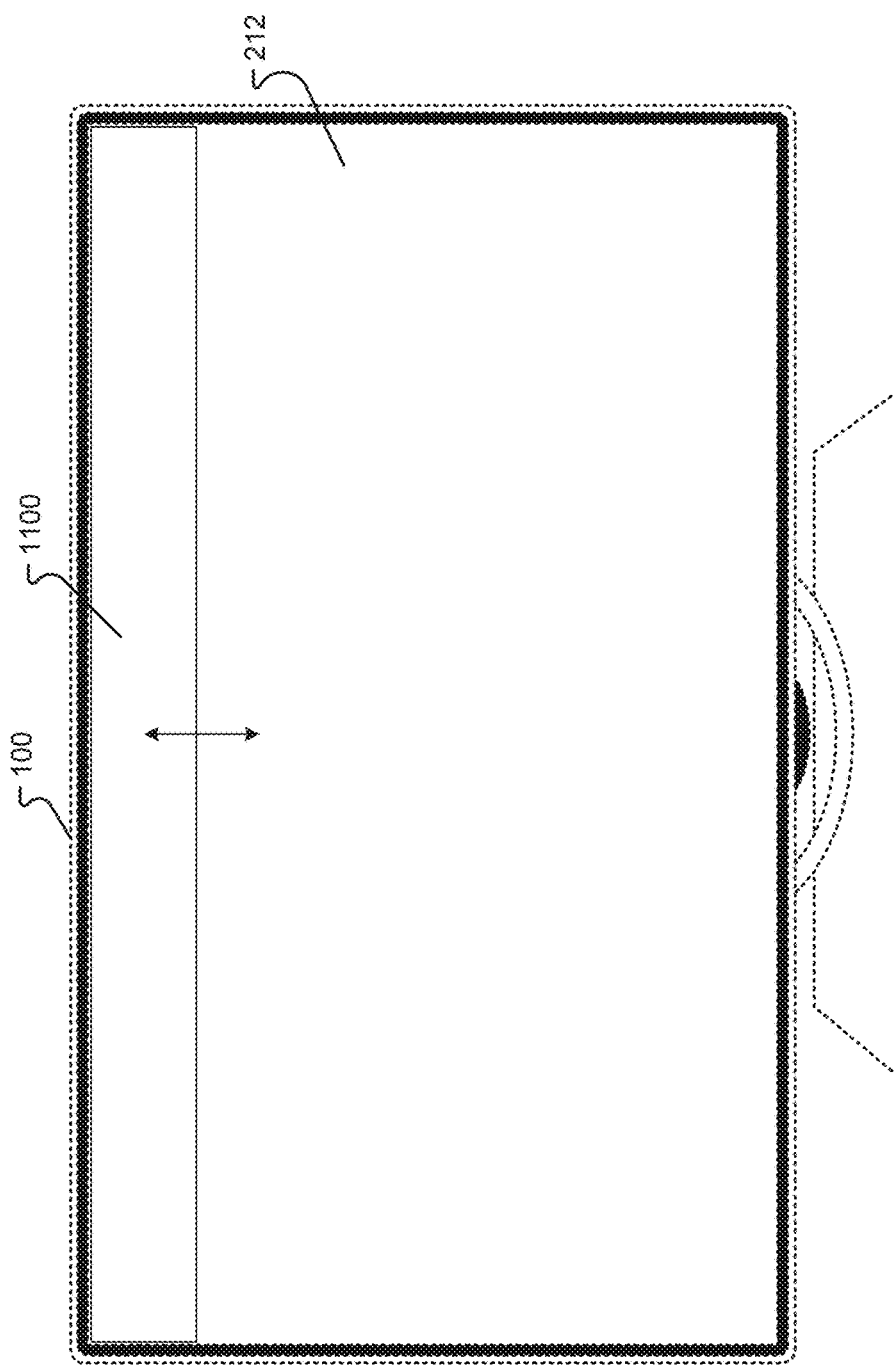

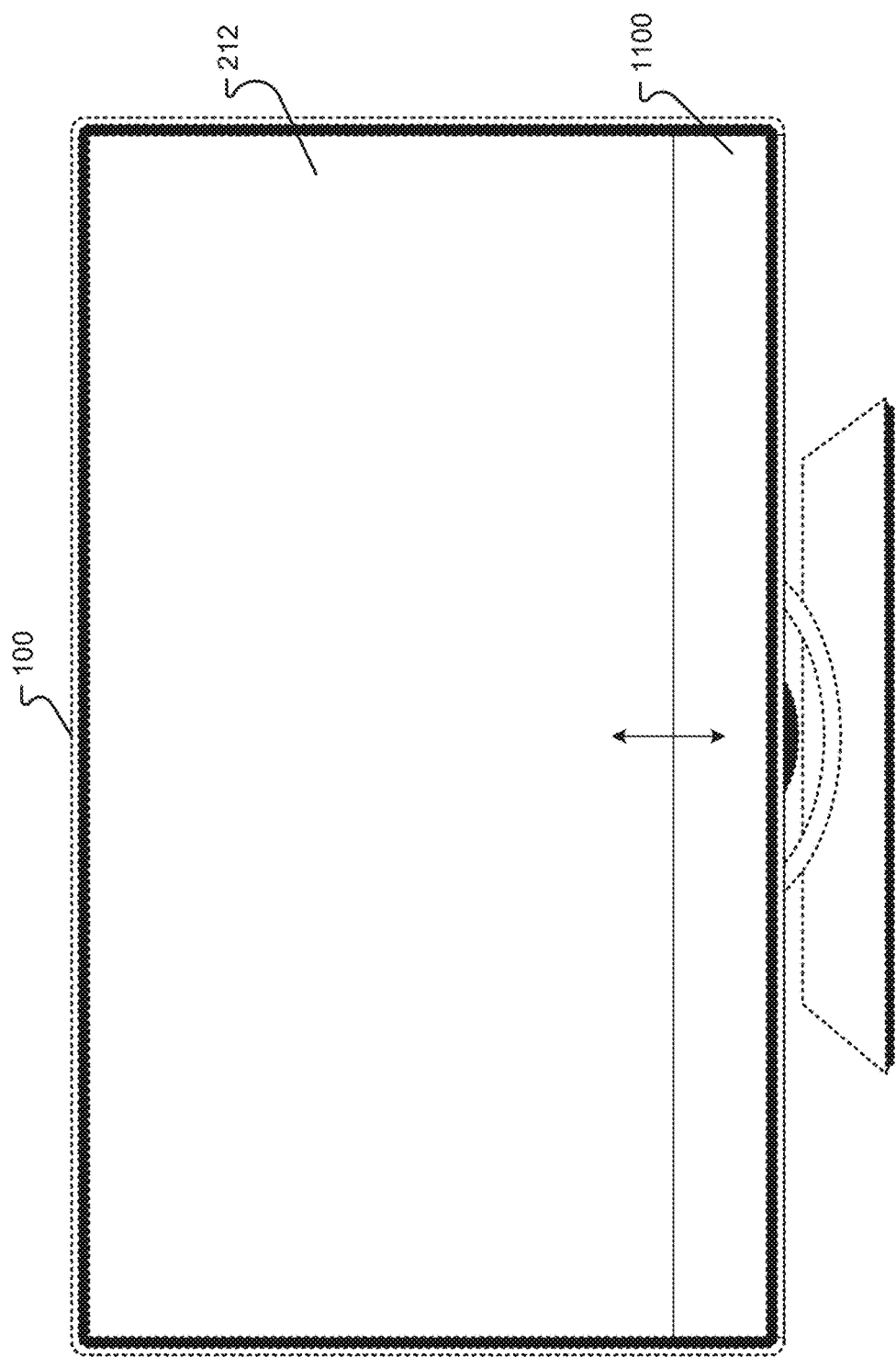

APPLICATION PANEL MANAGER

CROSS REFERENCE TO RELATED APPLICATION

The present application is a continuation of and claims priority to U.S. patent application Ser. Nos. (1) 13/968,652, filed on Aug. 16, 2013, entitled "Application Panel Manager"; (2) 13/968,709, filed on Aug. 16, 2013, "Location-Based Context for UI Components"; (3) 13/968,681, filed on Aug. 16, 2013, entitled "Silo Manager"; (4) 13/968,732, filed on Aug. 16, 2013, entitled "Applications Generating Statistics for User Behavior"; and (5) 13/969,777, filed on Aug. 19, 2013, entitled "Library and Resources for Third Party Apps for SmartTV", each of which claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A first exemplary aspect is directed toward:

1. A method of managing an application panel on an intelligent TV comprising:
    detecting a request to invoke the application panel;
    detecting one or more of displayed content on the intelligent TV and context information;
    determining information to display in the application panel based on the one or more of displayed content on the intelligent TV and the context information; and
    displaying the application panel on a display of the intelligent TV including the determined information.

2. The method of aspect 1, wherein the application panel hovers above background content and is partially transparent.

3. The method of aspect 2, further comprising continuing to display active background content.

4. The method of aspect 2, wherein the background content is Live TV, on demand content, media center content, applications or content from other inputs.

5. The method of aspect 4, wherein the application panel is dynamically updated based on the background content.

6. The method of aspect 1, further comprising determining and providing one or more sub-categories of information in the application panel.

7. The method of aspect 1, further comprising determining and providing one or more sub-categories of selectable information in the application panel.

8. The method of aspect 1, wherein the application panel includes executable portions.

9. The method of aspect 1, wherein the application panel includes an information portion, a new portion, a recommended portion, a genre portion, an electronic program guide, a category portion, a favorites portion and a search portion.

10. A non-transitory computer readable information storage media having stored thereon instructions, that when executed by one or more processors, cause to be performed the method steps in aspect 1.

A second exemplary aspect is directed toward:

11. A system to manage an application panel on an intelligent TV comprising:
    a processor adapted to detect a request to invoke the application panel;
    a panel controller adapted to detect one or more of displayed content on the intelligent TV and context information;
    a silo application adapted to determine information to display in the application panel based on the one or more of displayed content on the intelligent TV and the context information; and
    a display controller adapted to display the application panel on a display of the intelligent TV including the determined information.

12. The system of aspect 11, wherein the application panel hovers above background content and is partially transparent.

13. The system of aspect 12, wherein active background content is displayed.

14. The system of aspect 12, wherein the background content is Live TV, on demand content, media center content, applications or content from other inputs.

15. The system of aspect 14, wherein the application panel is dynamically updated based on the background content.

16. The system of aspect 11, further comprising a content presentation service adapted to determine and provide one or more sub-categories of information in the application panel.

17. The system of aspect 11, a content presentation service adapted to determine and provide one or more sub-categories of selectable information in the application panel.

18. The system of aspect 11, wherein the application panel includes executable portions.

19. The system of aspect 11, wherein the application panel includes an information portion, a new portion, a recommended portion, a genre portion, an electronic program guide, a category portion, a favorites portion and a search portion.

A third exemplary aspect is directed toward:

20. A system that manages an application panel on an intelligent TV comprising:
means for detecting a request to invoke the application panel;
means for detecting one or more of displayed content on the intelligent TV and context information;
means for determining information to display in the application panel based on the one or more of displayed content on the intelligent TV and the context information; and
means for displaying the application panel on a display of the intelligent TV including the determined information.

A fourth exemplary aspect is directed toward:

1. A method of managing one or more silos on an intelligent TV comprising:
detecting a request to access a silo, the silo representing an application resident on either the intelligent TV or remotely;
detecting whether another silo is already active on the intelligent TV;
transitioning, using a sliding effect, to displaying the silo;
enabling content associated with the silo; and
displaying the silo on a display of the intelligent TV.

2. The method of aspect 1, wherein the silo corresponds to Live TV, on demand content, media center content, applications or content from other inputs.

3. The method of aspect 1, wherein available silos are displayed in a strip or grid.

4. The method of aspect 3, further comprising shrinking the another silo into the strip or the grid and expanding a selected silo from the strip or the grid to full screen.

5. The method of aspect 1, further comprising maintaining an order of a plurality of silos displayed in a strip or a grid.

6. The method of aspect 1, further comprising providing an indication of a selected silo.

7. The method of aspect 1, further comprising displaying a placeholder image during the transitioning.

8. The method of aspect 1, further comprising enabling dynamic content within a displayed silo.

9. The method of aspect 1, wherein the silo displays selectable content and the silo includes one or more subcategories of information.

10. A non-transitory computer readable information storage media having stored thereon instructions, that when executed by one or more processors, cause to be performed the method steps in aspect 1.

A fifth exemplary aspect is directed toward:

11. A system to manage one or more silos on an intelligent TV comprising:
a processor adapted to detect a request to access a silo, the silo representing an application resident on either the intelligent TV or remotely;
a silo manager adapted to detect whether another silo is already active on the intelligent TV;
a silo transition controller adapted to transition, using a sliding effect, to displaying the silo;
a user interface application adapted to enable content associated with the silo and display the silo on a display of the intelligent TV.

12. The system of aspect 11, wherein the silo corresponds to Live TV, on demand content, media center content, applications or content from other inputs.

13. The system of aspect 11, wherein available silos are displayed in a strip or grid.

14. The system of aspect 13, wherein the another silo is shrunk silo into the strip or the grid and a selected silo is expanded from the strip or the grid to full screen.

15. The system of aspect 11, wherein an order of a plurality of silos displayed in a strip or a grid is maintained.

16. The system of aspect 11, further comprising a notification panel that provides an indication of a selected silo.

17. The system of aspect 11, wherein a placeholder image is displayed during the transitioning.

18. The system of aspect 11, wherein dynamic content is enabled within a displayed silo.

19. The system of aspect 11, wherein the silo displays selectable content and the silo includes one or more subcategories of information.

A sixth exemplary aspect is directed toward:

20. A system to manage one or more silos on an intelligent TV comprising:
means for detecting a request to access a silo, the silo representing an application resident on either the intelligent TV or remotely;
means for detecting whether another silo is already active on the intelligent TV;
means for transitioning, using a sliding effect, to displaying the silo;
means for enabling content associated with the silo; and
means for displaying the silo on a display of the intelligent TV.

A seventh exemplary aspect is directed toward:

1. A method of managing a panel on an intelligent TV comprising:
detecting a location of the panel and one or more of: displayed content on the intelligent TV and context information;
determining information to display in the panel based at least on the location of the panel; and
displaying the panel on a display of the intelligent TV including the determined information.

2. The method of aspect 1, wherein the panel hovers above background content and is partially transparent.

3. The method of aspect 2, further comprising continuing to display active background content.

4. The method of aspect 2, wherein the background content is Live TV, on demand content, media center content, applications or content from other inputs.

5. The method of aspect 4, wherein the panel is dynamically updated based on the location and background content.

6. The method of aspect 1, further comprising determining and providing one or more sub-categories of information in the panel.

7. The method of aspect 1, further comprising determining and providing one or more sub-categories of selectable information in the panel.

8. The method of aspect 1, wherein the panel includes executable portions.

9. The method of aspect 1, wherein the location of the panel is top, bottom, left side or right side.

10. A non-transitory computer readable information storage media having stored thereon instructions, that when executed by one or more processors, cause to be performed the method steps in aspect 1.

An eighth exemplary aspect is directed toward:

11. A system to manage a panel on an intelligent TV comprising:
a panel controller adapted to detect a location of the panel and one or more of: displayed content on the intelligent TV and context information;
a silo application adapted to determine information to display in the panel based at least on the location of the panel; and
a display controller adapted to display the panel on a display of the intelligent TV including the determined information.

12. The system of aspect 11, wherein the panel hovers above background content and is partially transparent.

13. The system of aspect 12, wherein active background content is displayed.

14. The system of aspect 12, wherein the background content is Live TV, on demand content, media center content, applications or content from other inputs.

15. The system of aspect 14, wherein the panel is dynamically updated based on the background content.

16. The system of aspect 11, further comprising a content presentation service adapted to determine and provide one or more sub-categories of information in the panel.

17. The system of aspect 11, a content presentation service adapted to determine and provide one or more sub-categories of selectable information in the panel.

18. The system of aspect 11, wherein the panel includes executable portions.

19. The system of aspect 11, wherein the location of the panel is top, bottom, left side or right side.

A ninth exemplary aspect is directed toward:

20. A system that manages a panel on an intelligent TV comprising:
detecting a location of the panel and one or more of: displayed content on the intelligent TV and context information;
determining information to display in the panel based at least on the location of the panel; and
displaying the panel on a display of the intelligent TV including the determined information.

The present disclosure can provide a number of advantages depending on the particular aspect, embodiment, and/or configuration. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p—1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p—1280×720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may include one or more of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112, (f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 2B includes a second view of an embodiment of an intelligent television;

FIG. 8 is a side view of an embodiment of a remote control;

FIG. 9A is a bottom view of an embodiment of a remote control with a joystick in a neutral position;

FIG. 9B is a bottom view of an embodiment of a remote control with the joystick in a lower position;

FIG. 9C is a bottom view of an embodiment of a remote control with the joystick in an upper position;

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
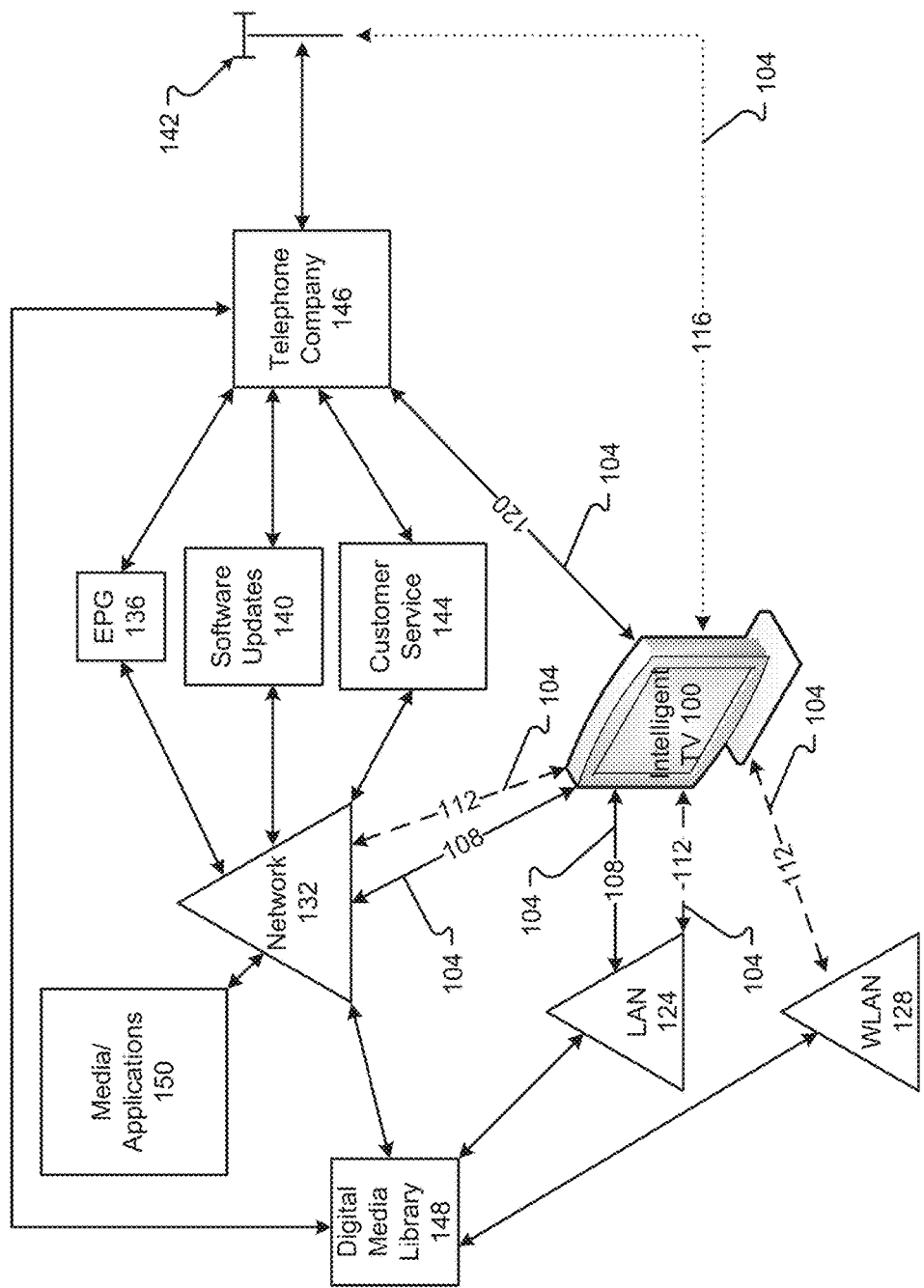
FIG. 1A includes a first view of an embodiment of an environment or a intelligent television.
Figure 1B:
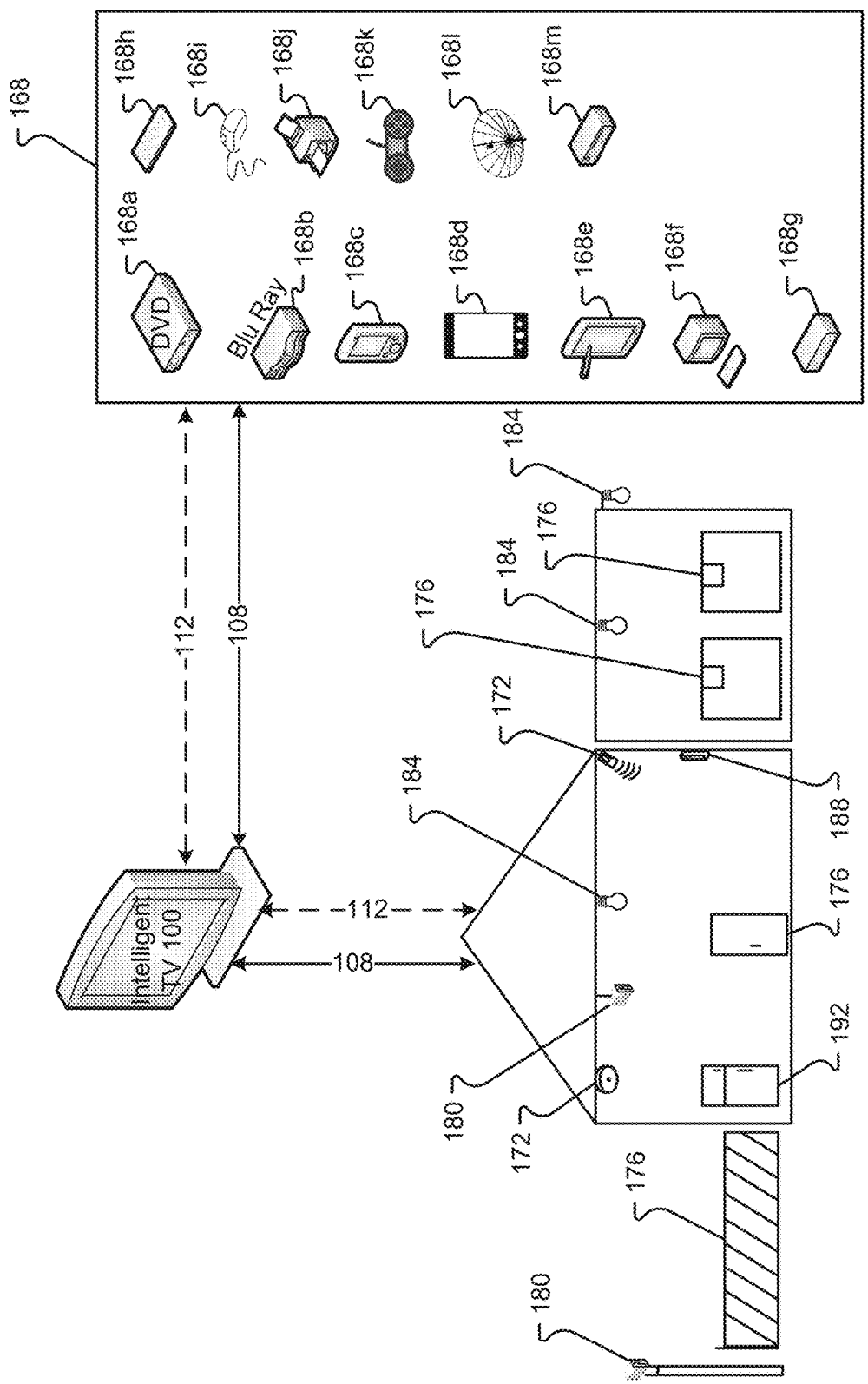
FIG. 1B includes a second view of an embodiment of an environment or a intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
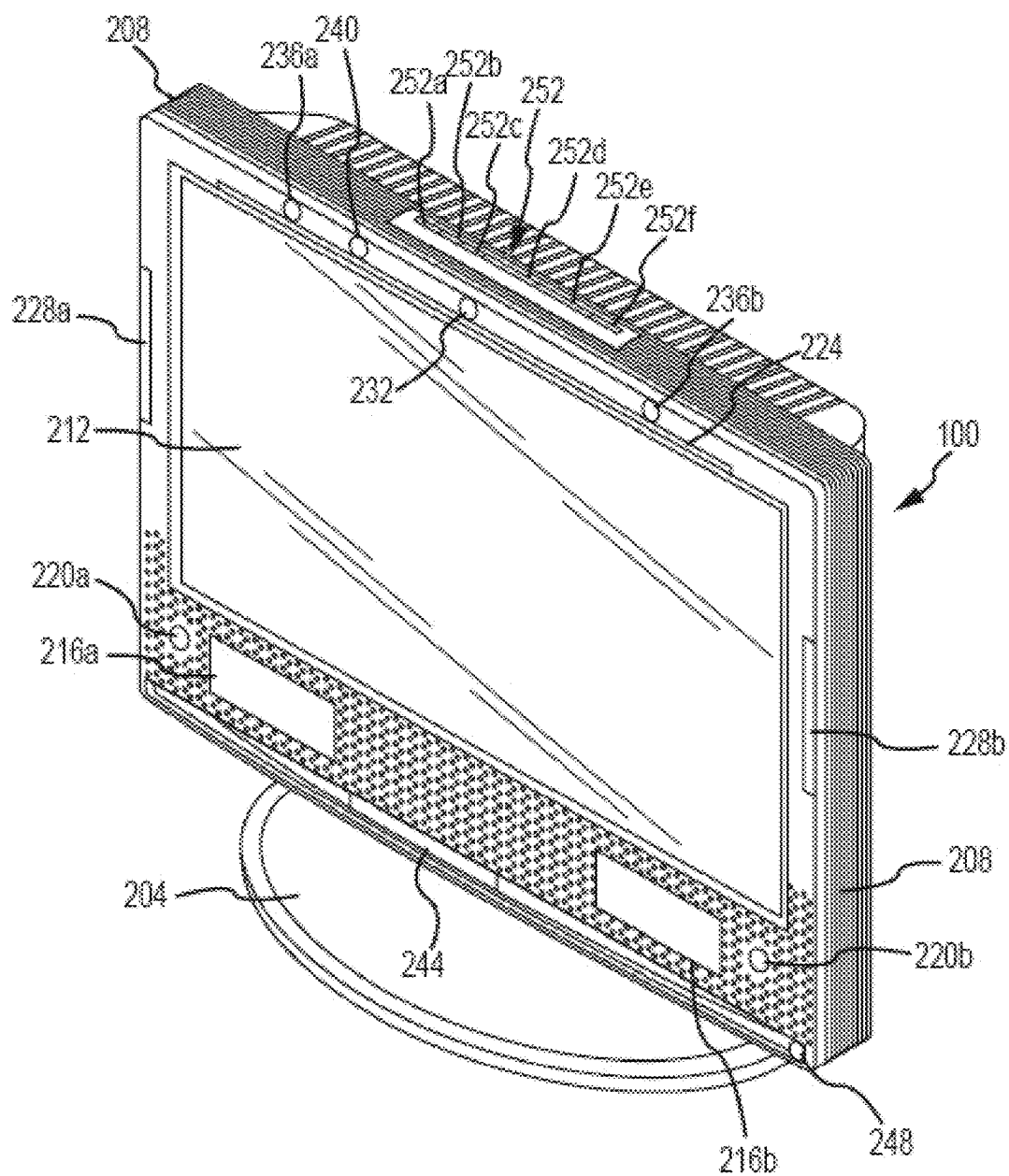
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
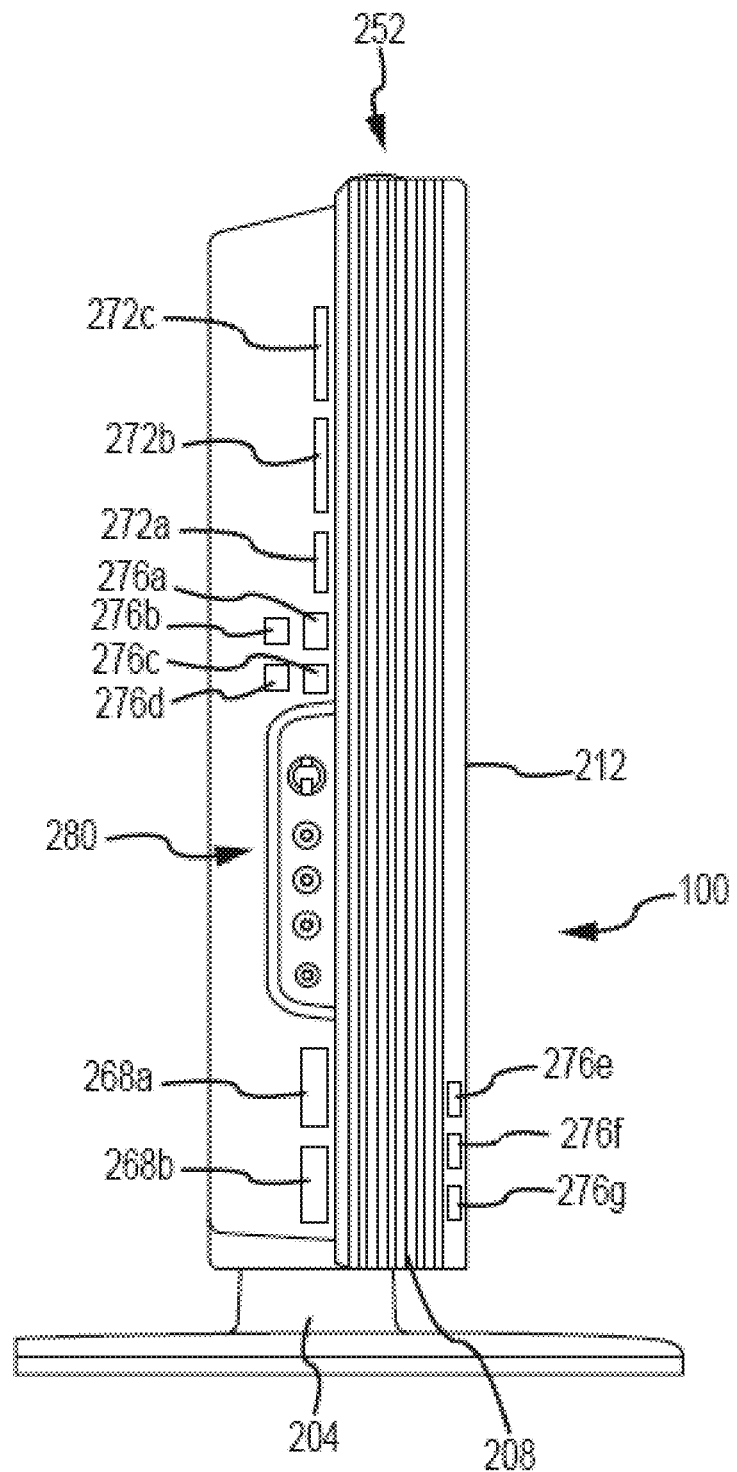
FIG. 2C includes a third view of an embodiment of an intelligent television.
Figure 2D:
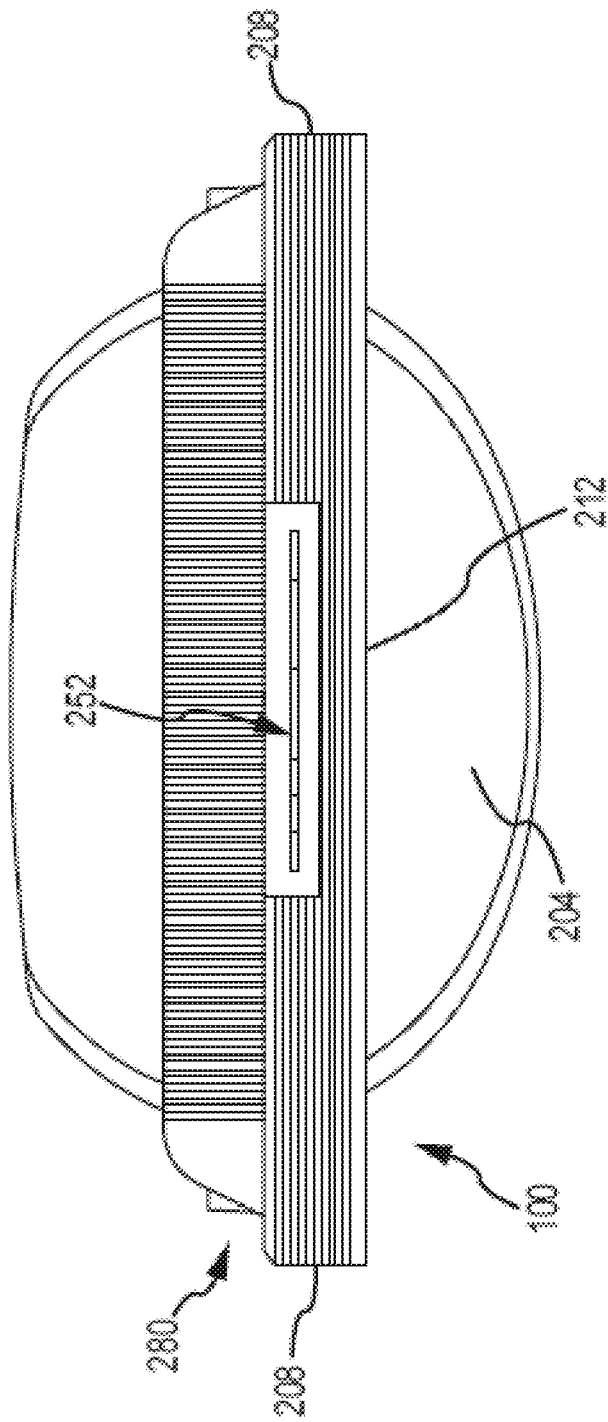
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
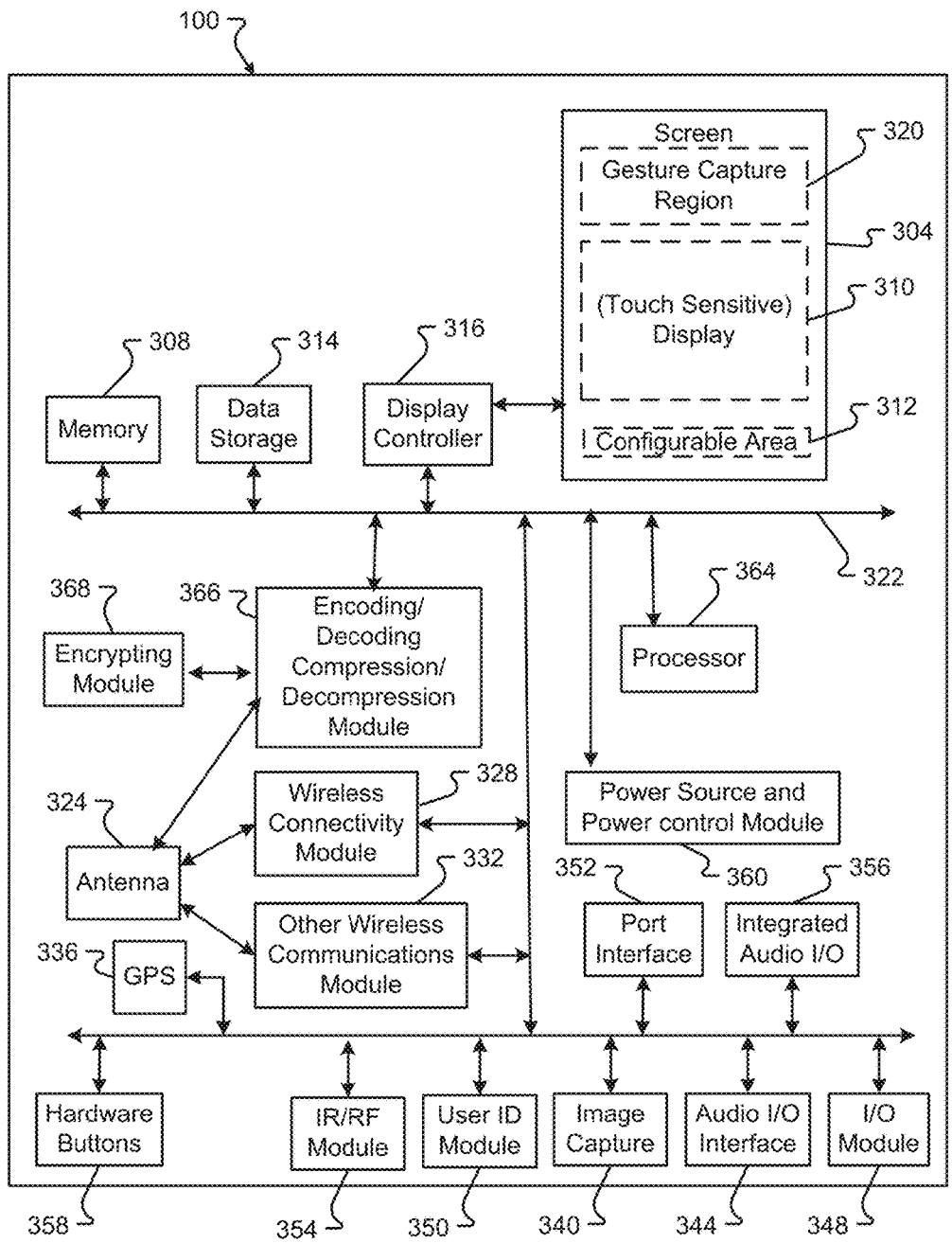
FIG. 3 is a block diagram of an embodiment of the hardware of the intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC to DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
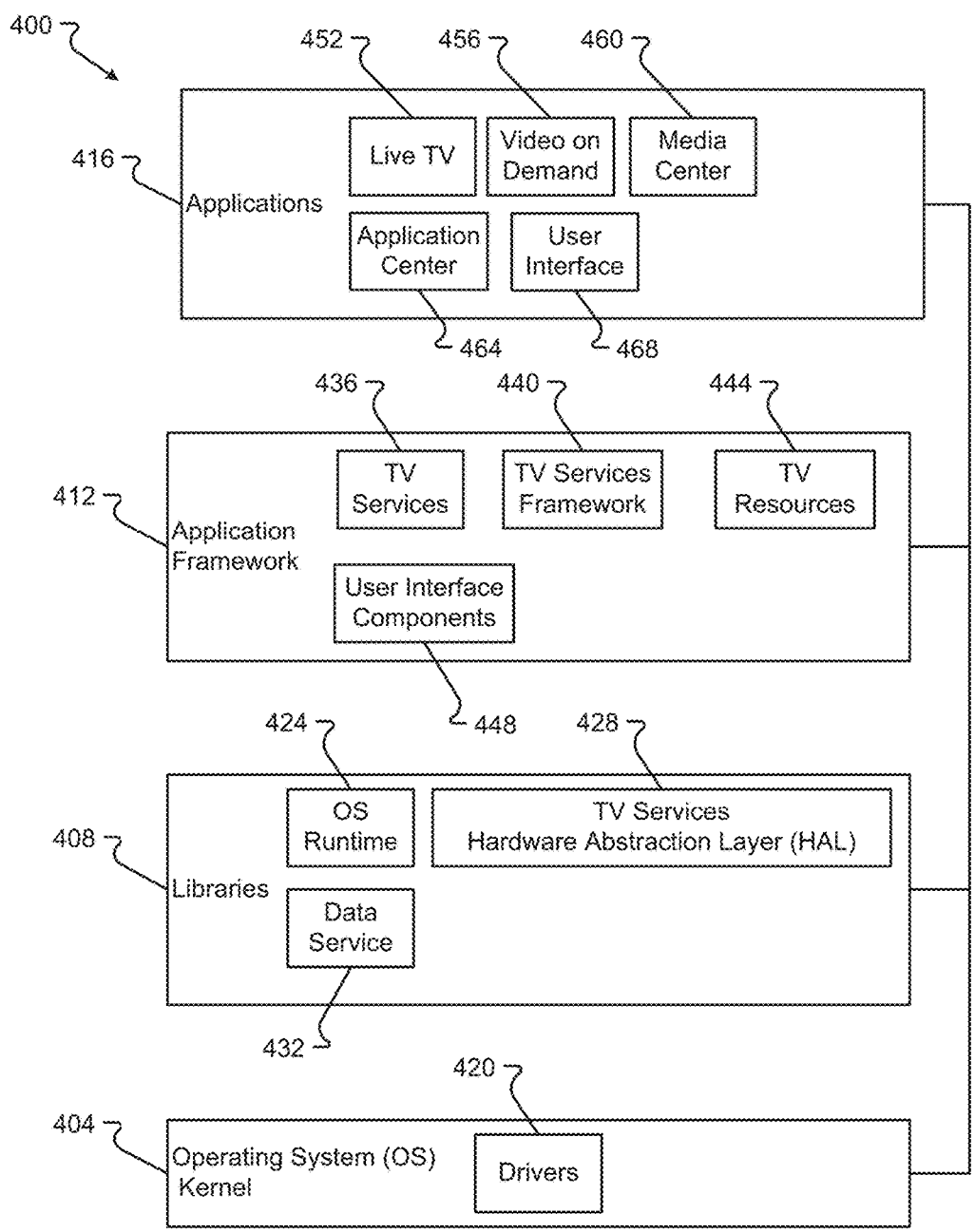
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
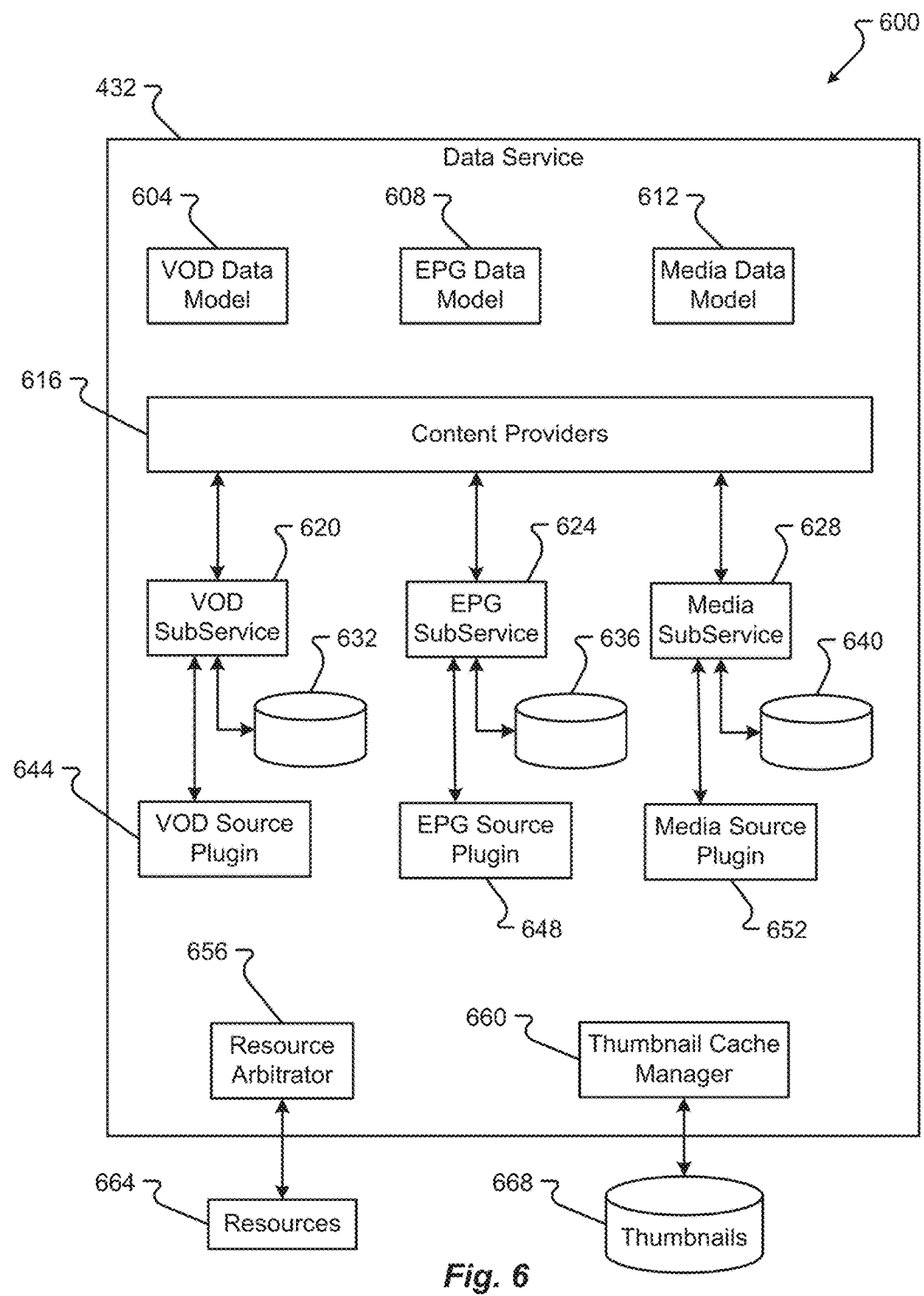
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application, 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
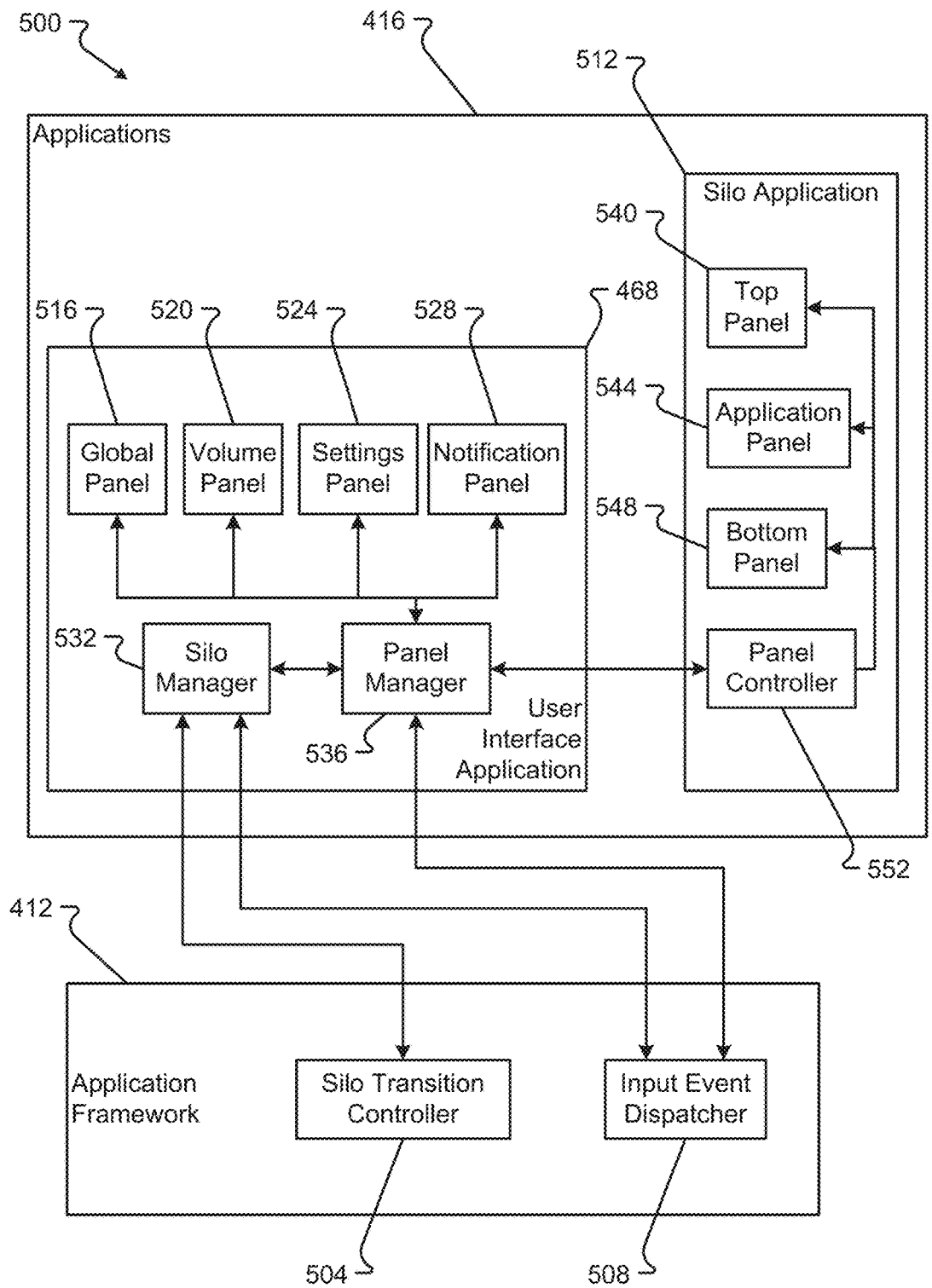
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservice 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further the thumbnail cache manager 660 may extract or retrieve that information from the thumbnails database 668 to provide to one of the data subservices 620, 624, 628.

Figure 13:
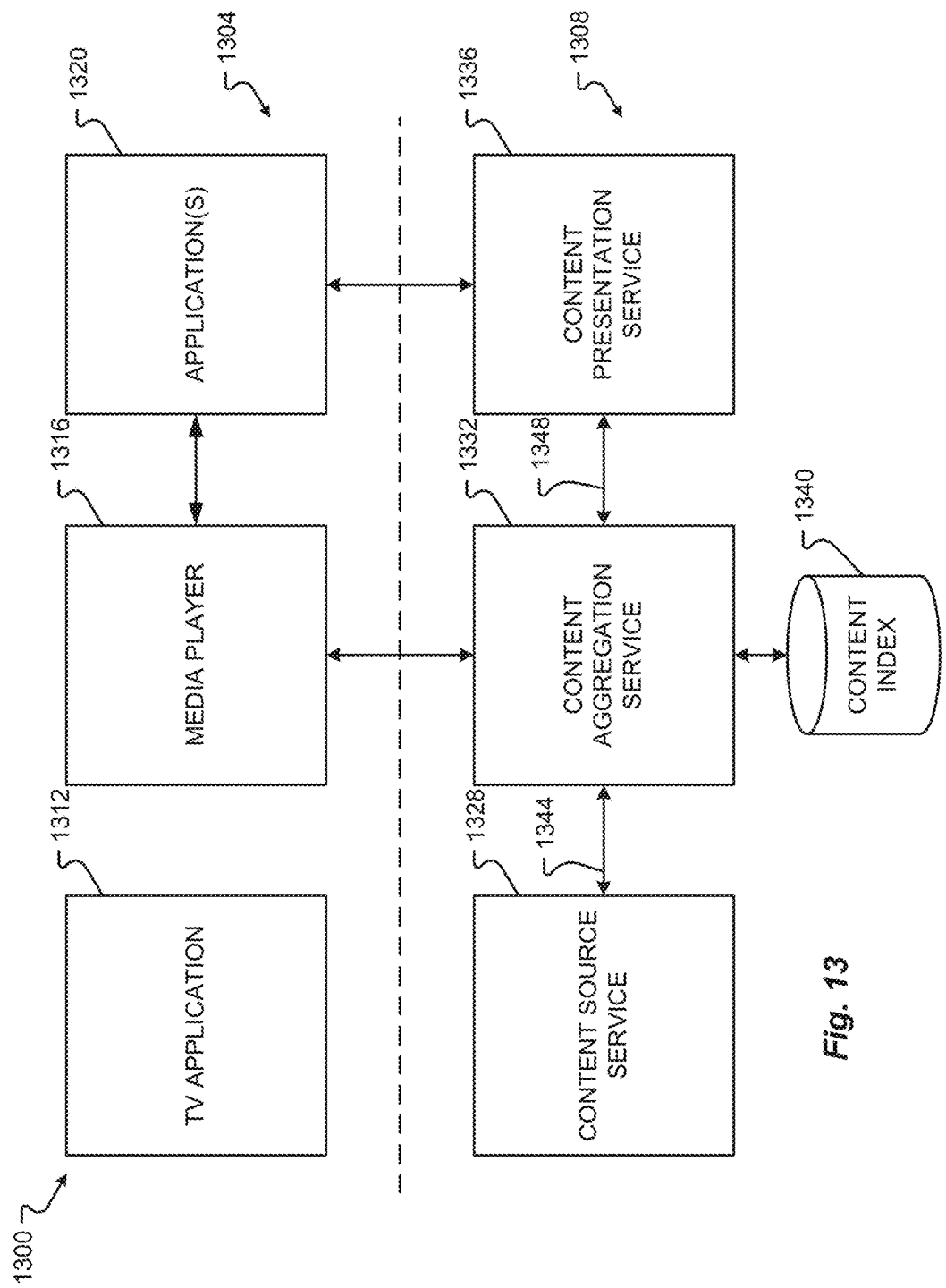
FIG. 13 is a block diagram of an embodiment of a content data service.

An exemplary content aggregation architecture 1300 is shown in FIG. 13. The architecture can include a user interface layer 1304 and a content aggregation layer 1308 and 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
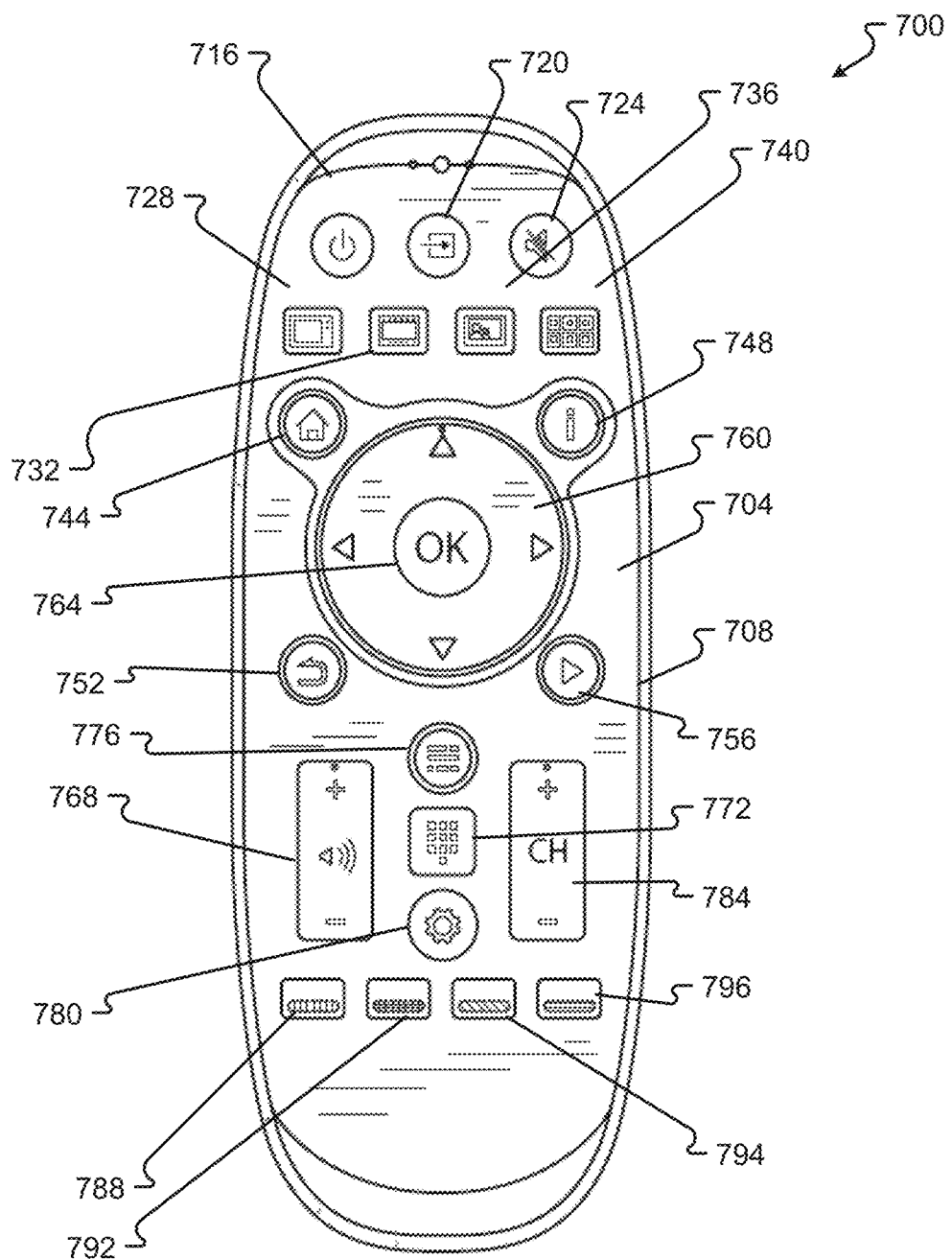
FIG. 7 is a plan view of an embodiment of a handheld remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s). When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
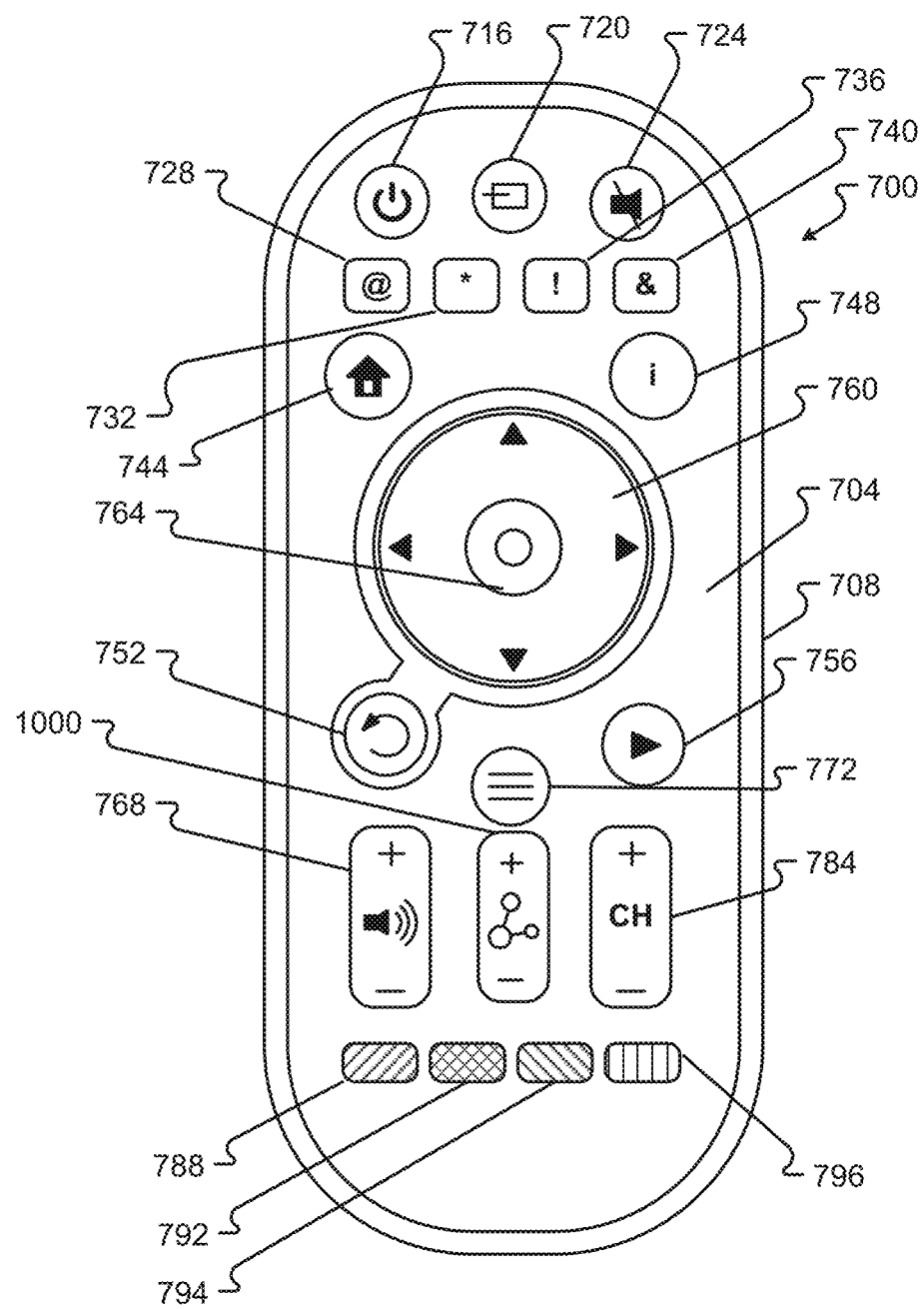
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™ or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
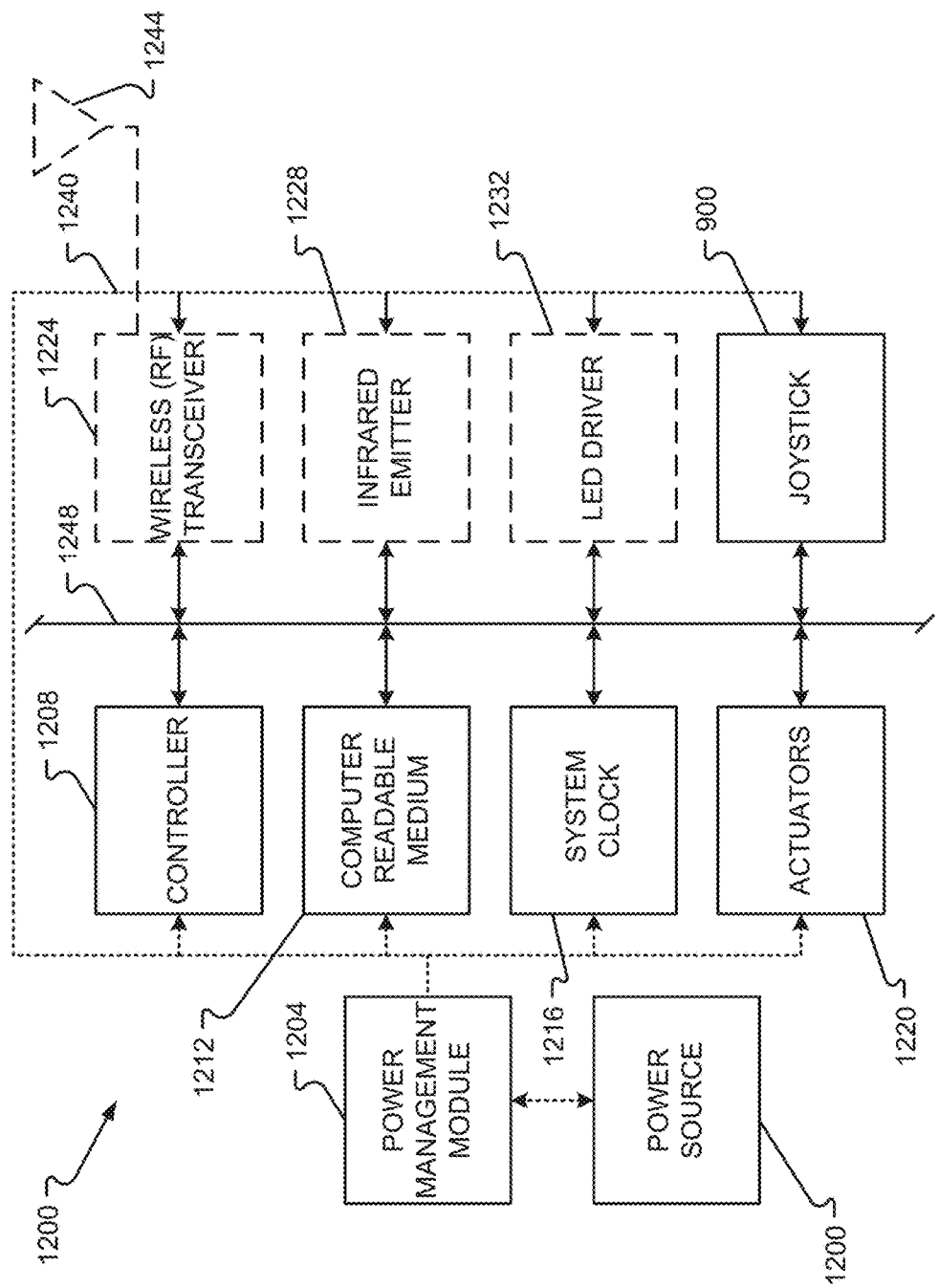
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

As discussed in relation to FIG. 5, the silo manager 532, panel manager 536, and related components, manage and control one or more of the global panel 516, volume panel 520, settings panel 524, notification panel 528, as well as silo applications 512, such as a top panel 540, application panel 544, and bottom panel 548, with co-operation of the panel controller 552.

Figure 14:
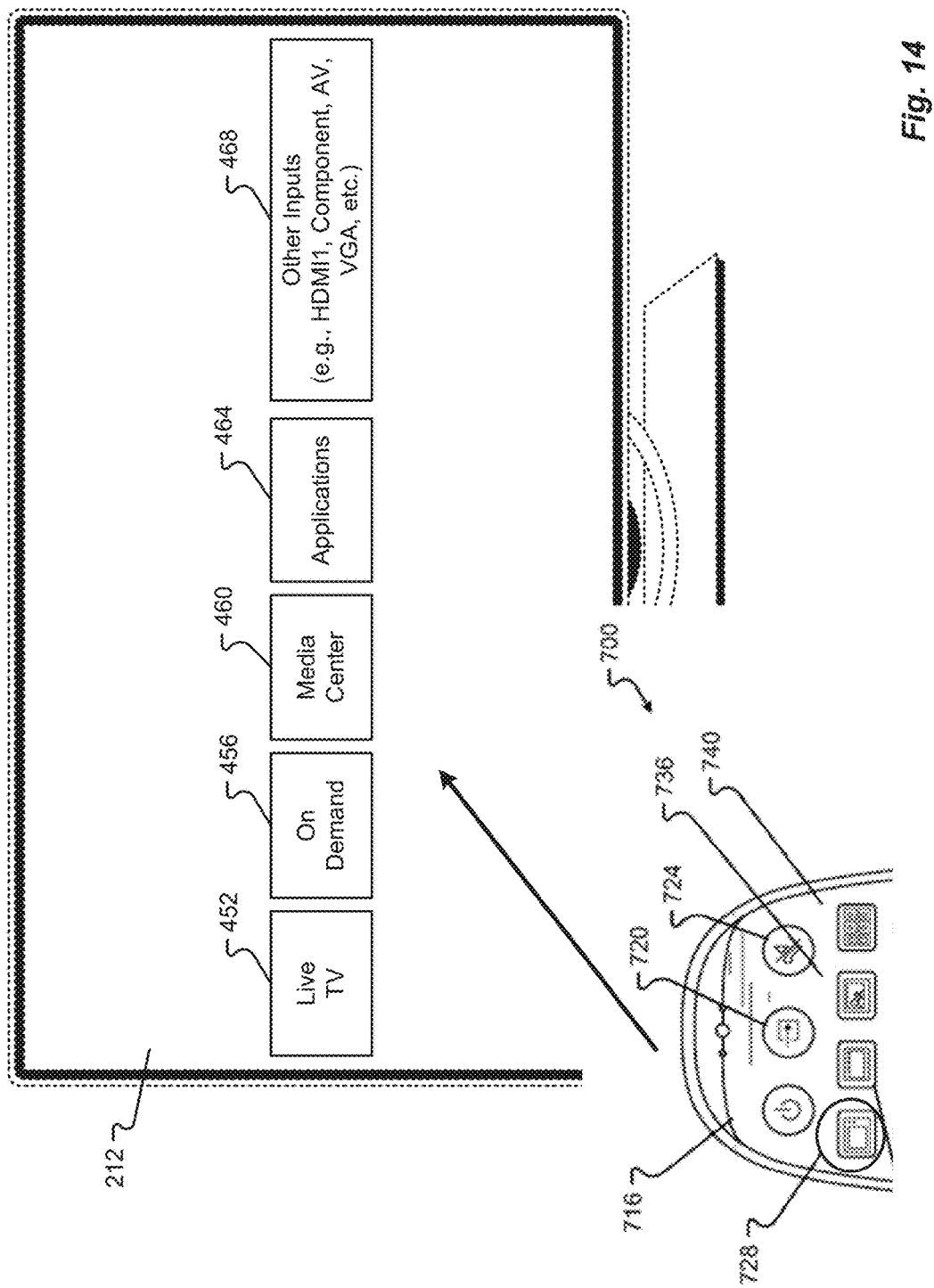
FIG. 14 illustrates exemplary silos.

In accordance with one exemplary embodiment, the system user interface can be the locus of control for the silo applications 512 and various panel systems as discussed herein. Because of this, the system user interface application 468 can also be the consumer of any non-application-specific keys on the remote control, and, for example, also the hard keys on the Intelligent TV 100 itself. As discussed above, the silo can be envisioned as an application, such as Live TV, media center, or the like. In accordance with one exemplary embodiment, and as illustrated in FIG. 14, the silos form a horizontal "strip," which is visualized to the user during silo transitions. As will be appreciated, and while an exemplary embodiment is discussed in relation to this horizontal strip, it should be appreciated that other orientations of the various silos can be used with equal success. For example, the silos can be vertical in nature, can be in a grid, or in general in any other format or orientation. Moreover, an exemplary embodiment will be illustrated in terms of specific transitions between the various silos, it should be appreciated that any type of transition or transition effect could be used as the user switches from one silo to another. Some exemplary types of transitions include cutting, mixing, dissolving, cross-fading, fading, wiping, and digital effects such as color replacement, animated effects, pixelization, focus drops, lighting effects, etc.

A silo transition can be initiated by a remote control button press, such as switching to Live TV from media center by pressing the Live TV button 728 on, for example, the remote control. The exemplary resultant visual effect involves "zooming down" whatever is being presented as the current screen image, having it slide rapidly left or right to a zoomed down image of the target silo, and then "zooming up" the requested silo's image to make it the current image. In accordance with one exemplary embodiment, the silos are fixed in a horizontal order, and if a silo transition would bypass one or more silos to get to the target silo, a single placeholder image can be displayed during the transition. Alternatively, silos that are being bypassed can be shown in, for example, a reduced size state, greyed-out, in black-and-white, with transparency, or the like.

In an effort to improve responsiveness, and in accordance with one exemplary embodiment, silo transitions can be implemented in framework-level code controlled by the silo transition controller 504. As discussed, the silo manager 532 is able to capture the silo-related input events, determine the necessary transition, and command the silo transition controller to perform the necessary visual effects. The silo manager 532 can also configure the silo transition controller 504 with the necessary information about the applications which are to be considered "silos," and their order, to facilitate the necessary screen captures. The silo manager 532 can also interact with the panel manager 536 to inform the panel manager 536 when a silo transition is requested, so that visible panels can be commanded to disappear (or appear), and the various notifications received that the panels are gone so that the silo transition can commence.

In accordance with another exemplary embodiment, the panel manager 536 manages various panels, here, the two exemplary primary panels being the global panel and the application panel. In accordance with one exemplary embodiment, the global panel slides in from an edge, such as the left edge of the screen, when the global panel button is pressed either on a remote control or Intelligent TV itself. The application panel, which can also slide in from an edge, such as the right edge of the screen, is displayed when the application panel button is pressed on either the remote control or the Intelligent TV itself.

In accordance with one exemplary embodiment, the global panel can always be available, and allows access to the same controls, regardless of the underlying content being displayed, whereas the application panel changes dynamically according to one or more of: content and the current context of the underlying content being displayed, which application is being displayed, which screen in the application is being displayed, which video on demand feature is selected, etc., as shown hereinafter. In addition to these exemplary panels, there are also top panels and bottom panels. These top and bottom panels can slide in (or use another transition to appear/disappear) from the top or bottom, for example, and are also under the control of the panel controller/panel manager and related components. However, other system panels can also be displayed, such as the volume panel, which controls volume and sound settings, and the setting panel, which controls general settings of any aspect of the Intelligent TV or remote control.

With any one or more of these panels, an exemplary embodiment coordinates their entrance and exit from the screen, at the appropriate time and for the appropriate reason. For example, it would be perfectly reasonable to adjust the volume while the global panel is being displayed, so the volume panel should be allowed to "float" over the top of the global panel. On the other hand, having both the global and application panels displayed at the same time makes less sense, so when one is called for while the other is being displayed, the other one can optionally be controlled to disappear.

The role of the panel manager 536, in accordance with one exemplary embodiment, is to coordinate all of the panel behavior in the system. Since several of the panels are not within the system user interface application, but rather within the silo applications, the panel controller 552 can be used to act as an intermediary between applications and the panel manager 536. In particular, when the application panel button is pressed, the panel manager 536 can first ensure that any currently displayed panels are removed, as appropriate, before informing the current silo applications panel controller 552 that the application panel should be displayed. Conversely, when the global panel button is pressed, the panel manager 536 can command the current silo applications panel controller 552 to remove any panels, such as the application panel or top or bottom panels, which it can do, and then inform the panel manager 536 that they are gone, so the display of the global panel can begin. And, as mentioned above, when the silo manager 532 is about to trigger a silo transition, all panels can first be removed, which is coordinated by the panel manager 536. The signaling mechanisms used can be a new "intent type" with suitably defined extras to indicate the commands and the notifications.

As discussed, the main application and application components present in the exemplary system are referred to as silos. In accordance with one exemplary embodiment, the basic functionality is provided by an abstract base class. Each silo can cooperate with the overall experience by invoking the silo manager 532 every time the corresponding event is received. This behavior can be provided in every application by extending this silo class. The silo manager 532 can be an activity that coordinates the changes between the different silos. Silo manager 532 can coordinate the change and also provide the visual feedback by playing, for example, an animation that changes from one silo to another. The use of a third activity to change from silo-to-silo can optionally be utilized to handle an impossibility of providing the required animation only by standard Android activity exit and enter animations.

As discussed, the panels are user-interface components that have the ability of appearing, for example, sliding in, from one of the sides of the screen. They can also disappear to, for example, the same side using a sliding out motion. In accordance with one exemplary embodiment, on the left hand side is presented the global panel, on the right hand side the application panel, the top panel from the top (which can be used by Live TV) and the bottom panel from the bottom of the screen (which can be used by both media player and Live TV). While the exemplary embodiments discussed herein will be described in relation to this orientation, it should be appreciated that other orientations are possible, and any of the panels discussed herein can be provided from any side(s) of the screen. In accordance with one exemplary embodiment, where the panel appears, and/or how the panel appears, can be controlled via the settings menu. In general, and in accordance with one exemplary embodiment, the application panel is displayed every time the application requests the application panel be displayed through some of the defined events. The activity can be presented in full screen, and can have a transparent background so that the previous activity can be seen through it. This combined with the enter and exit animation can give the illusion of a panel sliding in and out. This application panel can provide a context and content aware view into the application and displayed content. This provides a unified experience across all silos, such as Live TV, on-demand, media center, and applications. This particular exemplary configuration provides the following exemplary benefits: Quick access to core functionality, unobtrusive design allowing the active video to always be in view, consistent user experience across all silos, and focused contextual content.

Moreover, the application panel can support the following functionality: A means to open and close the panel, the ability to automatically close the global panel if it is visible when the user opens the application panel, a means to populate tabs within the panel, with the tabs being for one or more of the following: displaying detailed information about the content, displaying content libraries, collections, and subcollections, displaying content views or those tagged as favorite, searching for content, providing a means to navigate between tabs, providing a means for the user to navigate through the content within tabs, providing a means for the user to enter data into the tab, if appropriate and allowed, providing a means for the user to select content from the tab, and providing a means for the application to react appropriately to hot key press events.

FIGS. 14 through 52 illustrate some of the above features in greater detail. As discussed, although the following exemplary functionality will be described in relation to certain transitions, effects, and methods of displaying the various panels, it should be appreciated that other transitions, effects, and methods of displaying comparable information can be used without affecting the underlying operation of the systems discussed herein.

More specifically, FIG. 14 illustrates an exemplary display screen 212 with five silos or applications. Here, and in accordance with one exemplary embodiment, the applications layer 416 includes one or more of a Live TV application 452, a video on demand application 456, a media center application 460, an applications center application 464, and a user interface application 468. The Live TV application 452 can provide Live TV from one or more different signal sources. For example, the Live TV application 452 can provide TV content from input received from a cable box, over-air broadcasts, from satellite services, or other types of Live TV services or service providers. The Live TV application 452 may also present a multimedia presentation or video and audio presentation of the live television signal on the display of the Intelligent TV 100.

The video on demand application 456 can provide for video from different storage sources. Unlike Live TV application 452, the video-on-demand 456 provides for display of videos or other content that are accessed from some memory source. The source of the video on demand can be associated with the user or with the Intelligent TV, or some other type of service, and may be not collocated with the Intelligent TV 100. For example, the video on demand 456 may be provided from a library stored in a cloud, from a local disk storage that contains stored video programs, from a local disk associated with a computer, or from some other source.

The media center application 460 can provide applications for different types of media presentation. For example, the media center 460 can provide for displaying pictures or audio that is different from, but still accessible by the user, and different from Live TV or video on demand. The media center 460 can allow for the access of different sources to obtain the media and display of such media on the Intelligent TV 100. These media can include, for example, pictures, music, or in general be directed to any content that is accessible by the Intelligent TV 100, which is not accessible by either the Live TV application 452 or video-on-demand 456. The application center 464 allows for the provision, storage and use of applications. An application can be a game, a productivity application, or in general any application associated with one or more of the Intelligent TV, a computer system, or other device. Similarly, these applications can be operated with the Intelligent TV 100, with the applications 464 obtaining the content from one or more different sources, storing them locally, or portions of them locally, and then executing those types of applications for use on the Intelligent TV 100.

Figure 15:
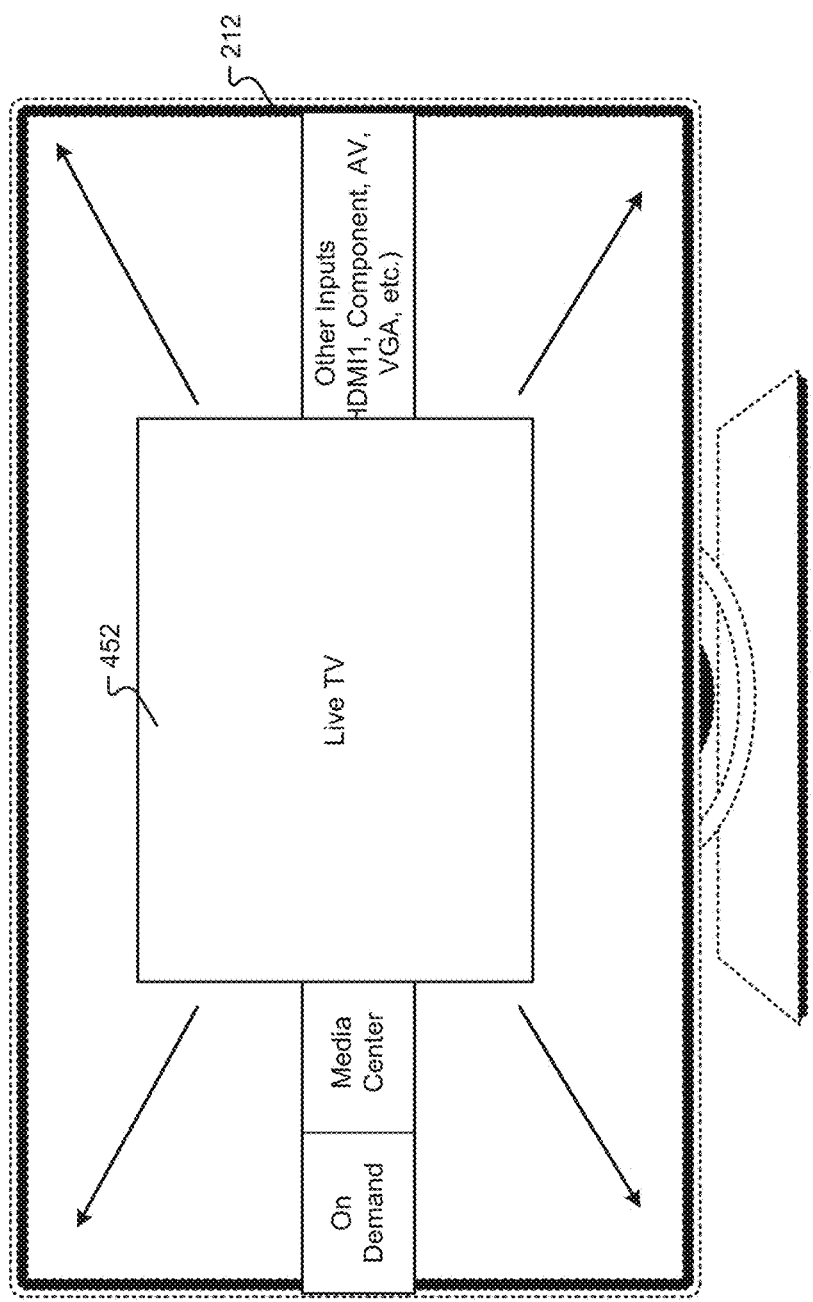
FIG. 15 illustrates the displaying of a selected silo.

Here, the user using the remote control 700, can select one or more of the various applications that are displayed on display screen 212. For example, if a user selects, the button 728 (Live TV) as illustrated in FIG. 15, the Live TV application comes into focus, and is enlarged to fill or partially fill display screen 212.

Figure 16:
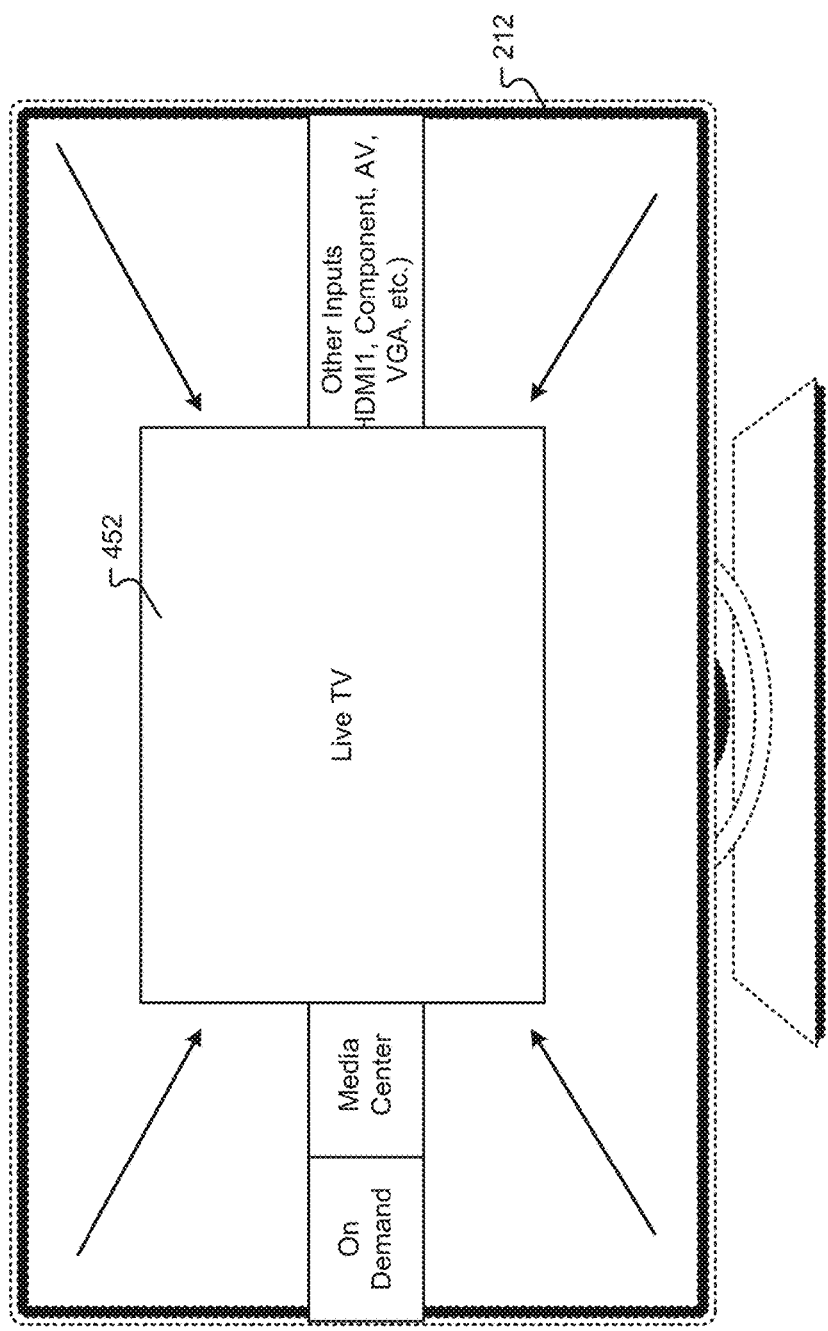
FIG. 16 illustrates the commencement of switching to a different silo.
Figure 17:
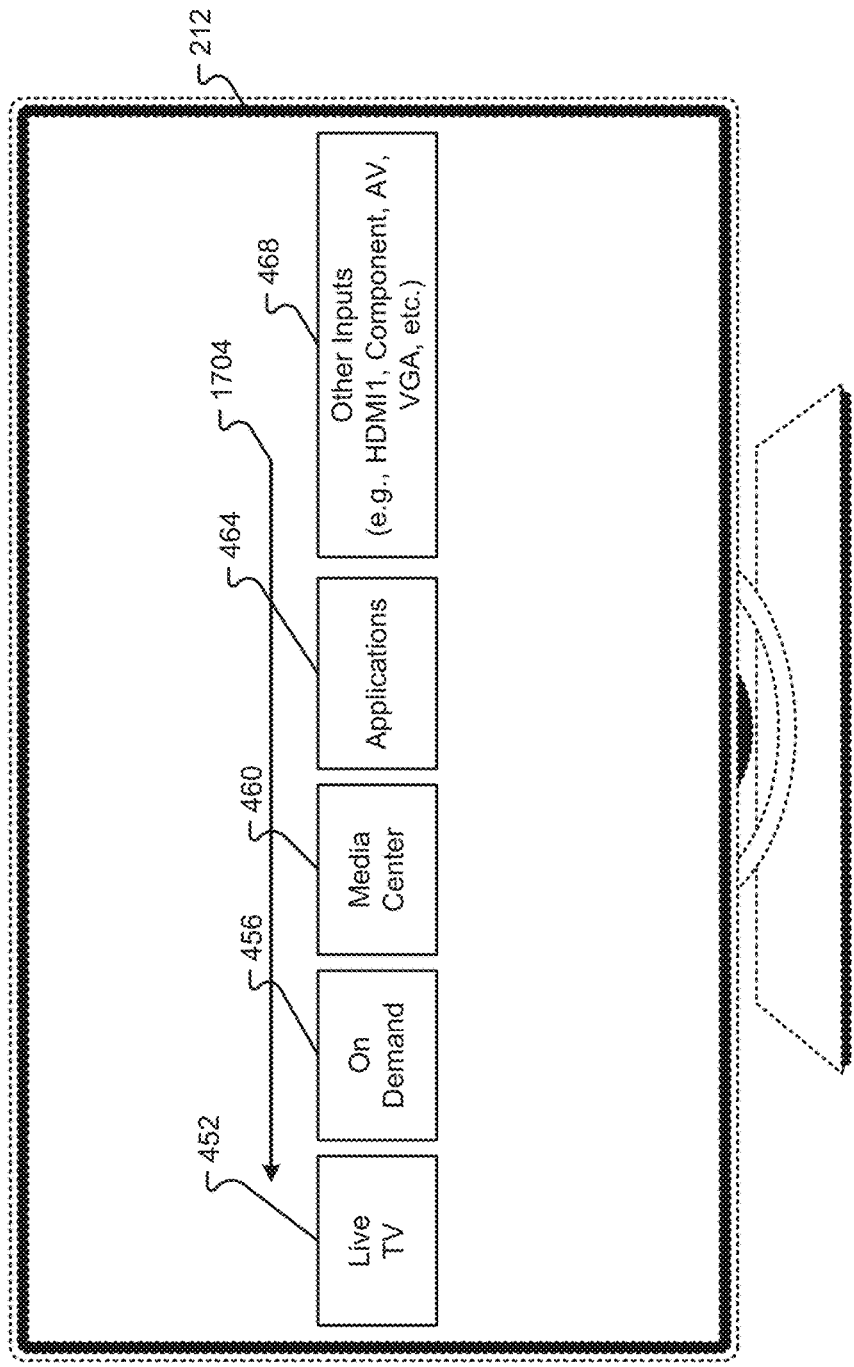
FIG. 17 illustrates the transition to a different silo.
Figure 18:
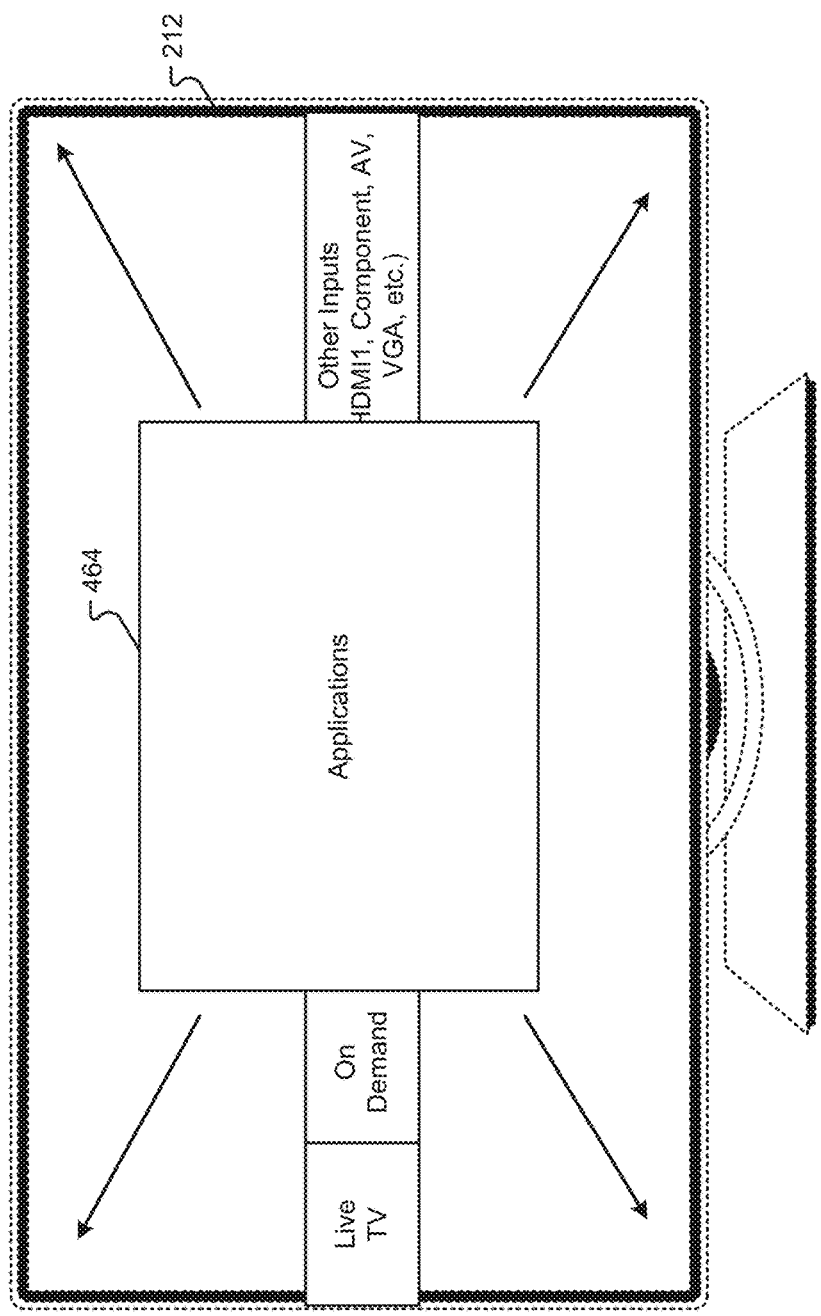
FIG. 18 illustrates the displaying of a second silo.

FIGS. 16-18 illustrate the transition to another silo or application, here from the Live TV application 452 to the applications silo 464. For example, and commencing in FIG. 16, upon the user selecting applications 464 on the remote control 700, the Live TV application 452 is minimizing, in FIG. 16, the applications for Live TV 452, on-demand 456 and media center 460 are scrolled to the left in FIG. 17 as denoted by directional arrow 1704, with in FIG. 18 application 464 being enlarged to fill all or a portion of display screen 212. As discussed, these transitions can occur gracefully with, for example, applications in the background of FIG. 18 being faded out or otherwise obfuscated by application 464, with focus switching to application to 464 because of the request of the user.

FIGS. 16a-49 illustrate exemplary screen captures that illustrate not only exemplary content that can be shown in association with each of the above-mentioned applications, but also the behavior of the panels, and specifically in greater detail the behavior of the global panel and application panel.

Figure 16A:
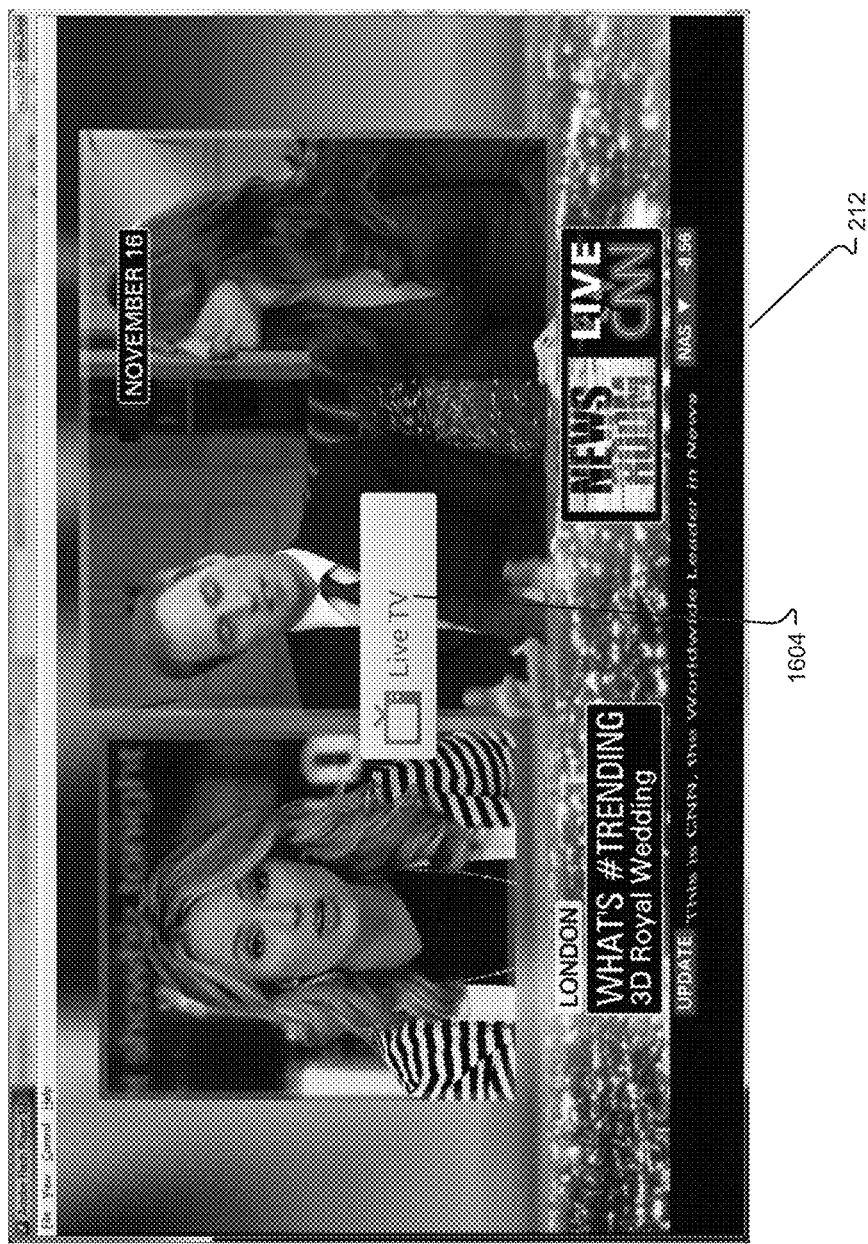
FIG. 16A illustrates Live TV.
Figure 19:
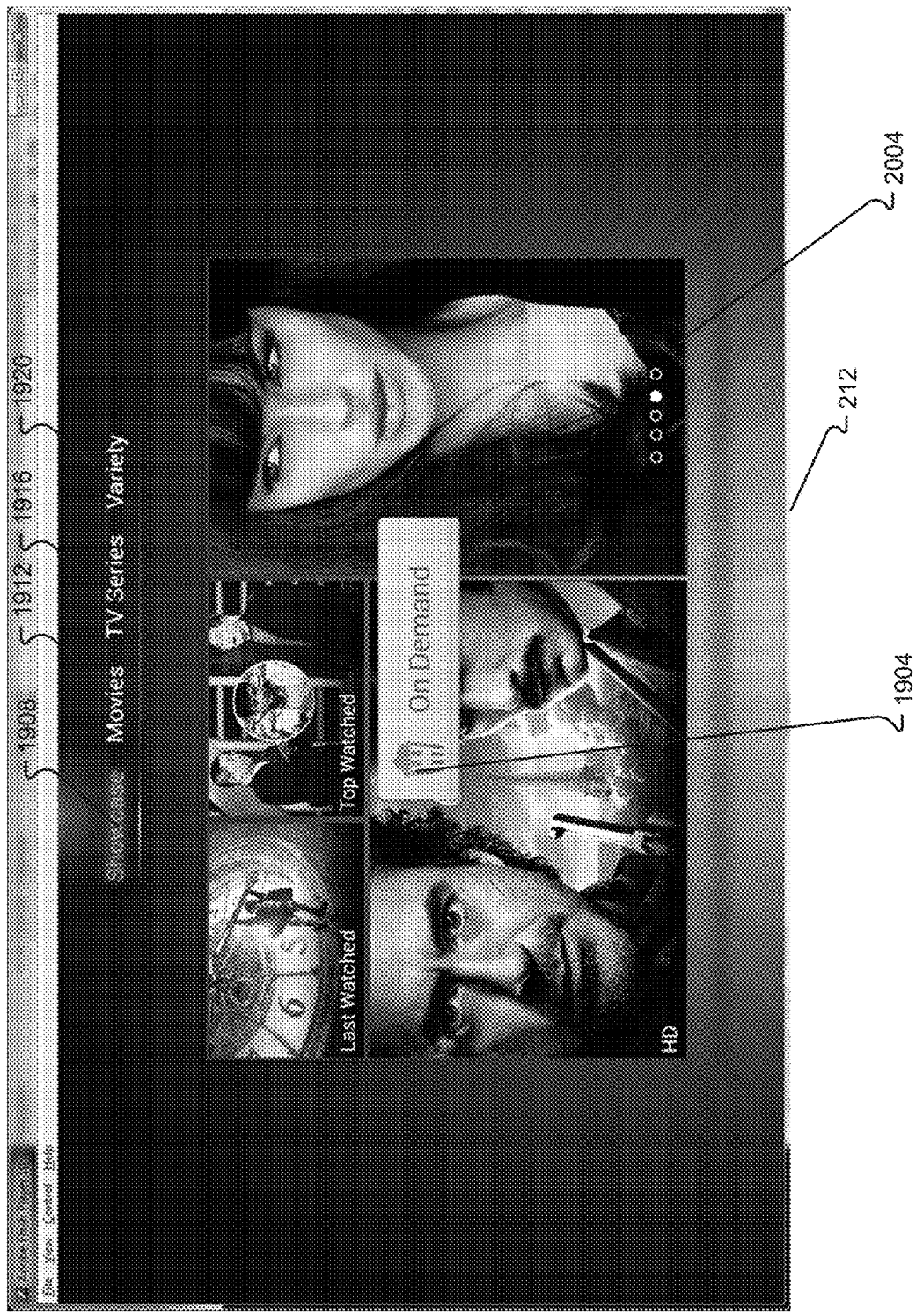
FIG. 19 illustrates On Demand.
Figure 20:
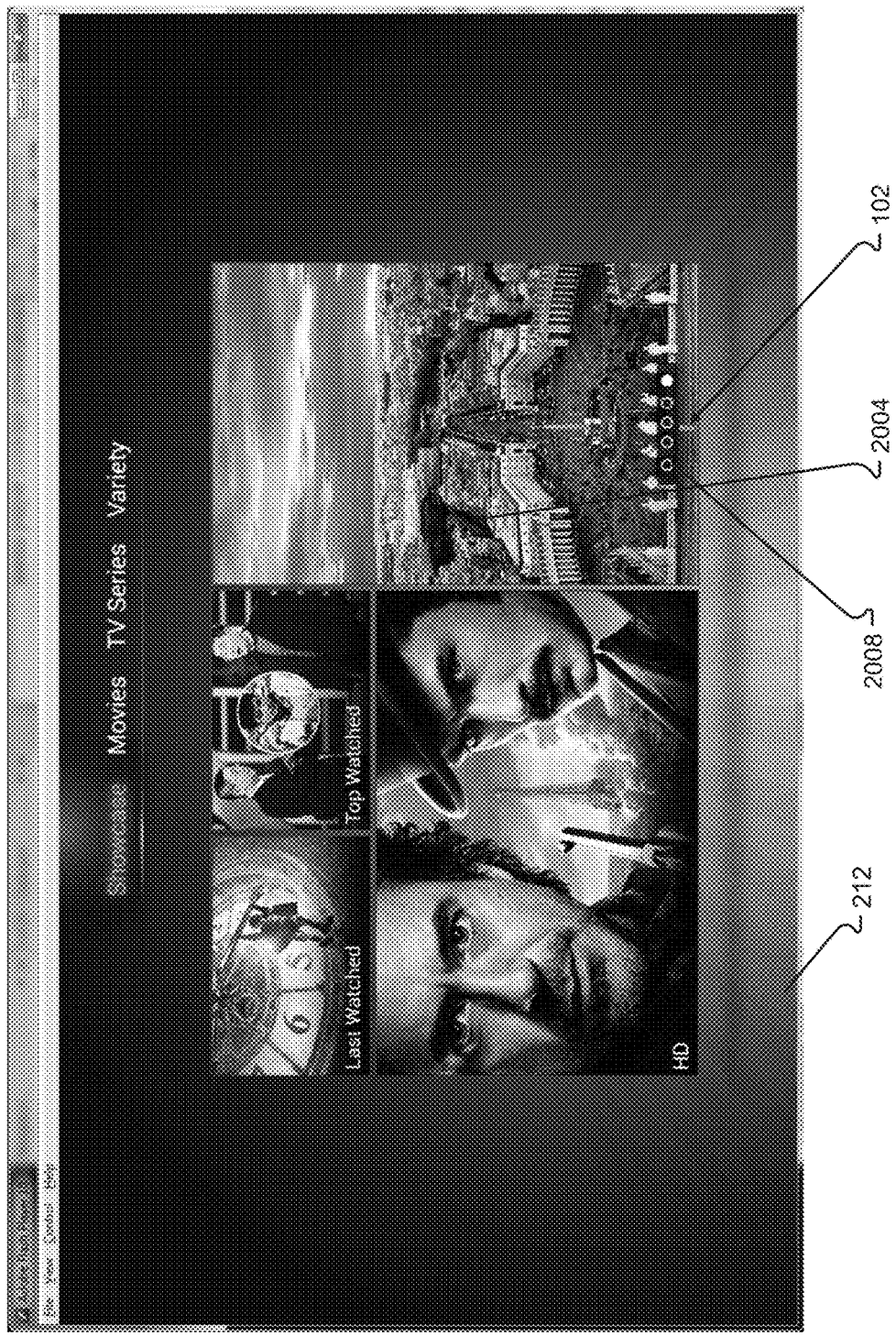
FIG. 20 illustrates dynamic content.

FIG. 16a illustrates an exemplary display screen 212 showing Live TV content. Here, and optionally, an indicator 1604 can be provided that illustrates which content is being shown on the display screen 212. Here, the user has selected Live TV, and therefore the indicator 1604 shows that Live TV is being shown on the display screen 212. This indicator can fade away after a predetermined amount of time. The user can then select, using up and down indicators, various channels in the Live TV application. Similarly, for on demand, as illustrated in FIGS. 19 and 20, indicator 1904 can be presented illustrating that the user has selected the on demand application for display in display screen 212. The on demand application can have various sub-applications/directories/categories/sub-categories, and in accordance with one exemplary embodiment, they include showcase 1908, movies 1912, TV series 1916 and variety 1920, that all contain certain types of on-demand media. The user can select these various subcategories using, for example, buttons on the remote control. Moreover, the on-demand application can include information such as the last watched on demand feature, the top watched on demand feature, HD content, as well as, as illustrated in FIG. 20, dynamic content 2004 that is selectable. Here, dynamic content 2004 presents snapshot previews that switch between various on-demand media presentations that are available for selection by the user. The user, again using the remote control, can "hover over" any of the on-demand media types being presented, and then via pressing of the enter button, can select that particular content. With the exemplary dynamic content 2004 in FIG. 20, there are five selections of dynamic content illustrated by the five circles 2008. The media associated with dynamic content that is currently being displayed is selected when the user presses, for example, the enter button or select button on the remote control while hovering over the dynamic content.

Similarly, in the movies subcategory, various subcategories can be presented in the display 212 such as all movies, favorite movies, top watched movies, recommended movies, new movies, and optionally one or more windows that display dynamic content similarly to that as in the showcase category. For example, this dynamic content window can have a revolving selection of movies that can be displayed based on one or more of predicted interest of the user, settings information, recommendations from a service provider, or the like.

With the TV series subcategory, and similar to the movies subcategory, various subcategories can further exist that include all TV series, favorite TV series, top watched TV series, recommended TV series, new TV series, and similarly a dynamic window that includes other TV series. In a like manner, the variety subcategory can include favorites, top watched, recommended, new, dynamic variety content, as well as an "all" subcategory. As with the other windows or displays, the user can scroll between these various categories and navigate the various screens using, for example, the directional arrows and select or enter button on the remote control.

Figure 21:
FIG. 21 illustrates the media center.

FIG. 21 illustrates an exemplary media center interface that is displayed on display screen 212. As with the other exemplary embodiments, indicator 2104 can be provided to the user indicating that they have selected the media center. The media center application includes further subcategories including a showcase subcategory 2108, a my videos subcategory 2112, a my photos subcategory 2116, and a my devices subcategory 2120. Showcase subcategory 2108 can, as illustrated in FIG. 21, include further subcategories, here being "all media", "recently added", "most viewed", "last viewed", and stored content from one or more sources, here being a video of Kira at school, photos from an Italy trip, and pictures of Kira's birthday. Again, the user using a remote control can hover over and select any of these media types for presentation. My videos subcategory 2112 can include, for example, favorites, recently added, all videos, last viewed, most viewed, as well as perhaps view of titles and dynamic content. Similarly, the my photos subcategory 2116 can include further subcategories including all photos, most viewed, last viewed, favorites, recently added, thumbnails/selectable links for accessing one or more folders of photographs, as well as, for example, icons pointing to photographs stored on a remote device, such as a camera, another computer, or some other storage location. Again, with the user selecting one of these categories, the content associated therewith can be displayed. With my devices subcategory 2120, this can also include further subcategories including all devices, an SD card, a USB device, one or more computers, and in general can have selectable icons corresponding to any of the storage devices the Intelligent TV 100 has access to.

Figure 22:
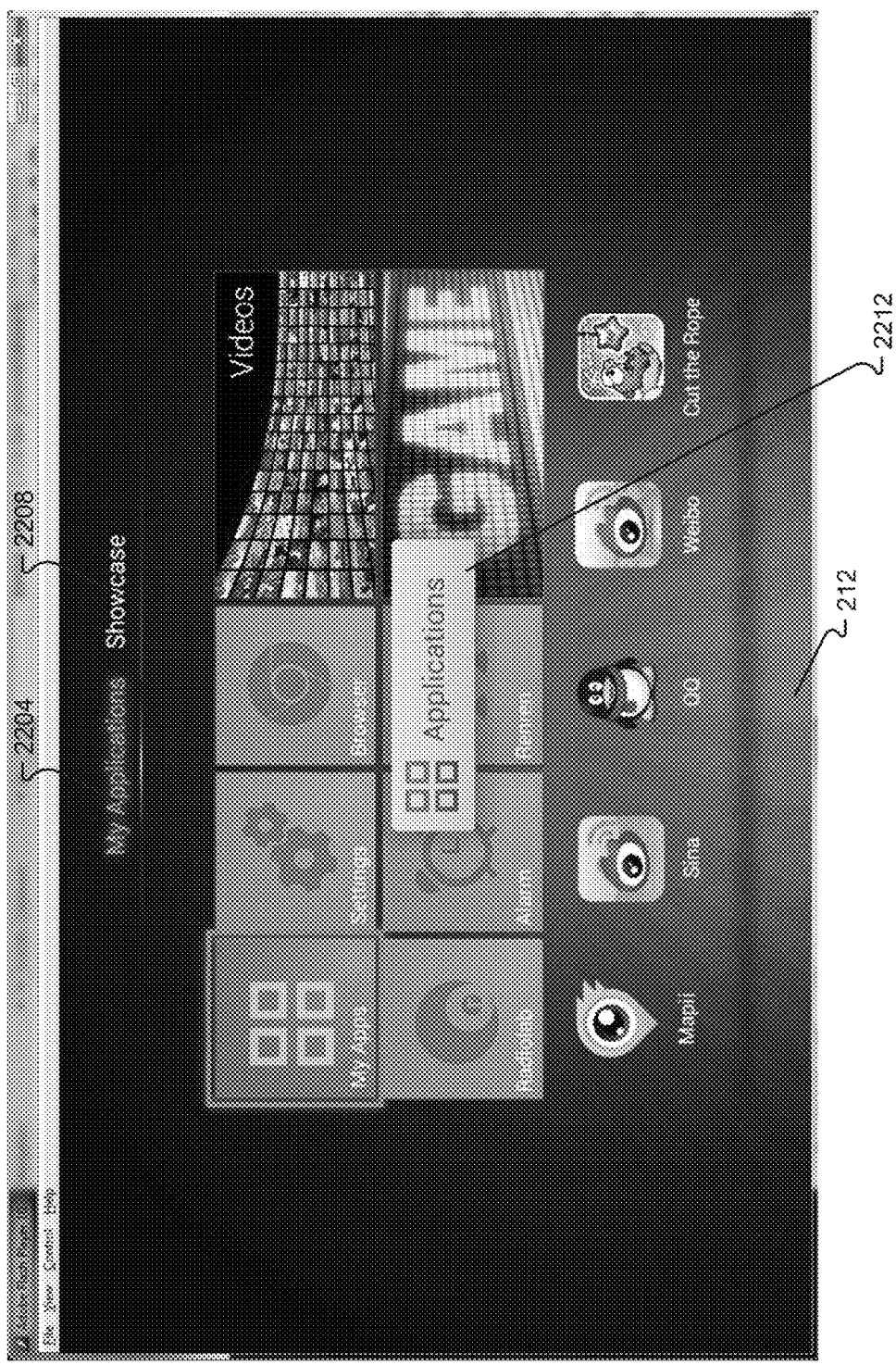
FIG. 22 illustrates an application silo.

FIG. 22 illustrates exemplary application 464 on display screen 212. Here, an indicator 2212 is provided indicating the user has selected application 464, with various applications being displayed on display screen 212 such as my apps, settings, browser, and other applications. Similar to the other silos, application 464 can include one or more subdirectories, here, my application 2204 and showcase 2208. Showcase 2208 subdirectory can include, for example, recommended, most popular, top ranked, as well as dynamic content as previously discussed.

Figure 23:
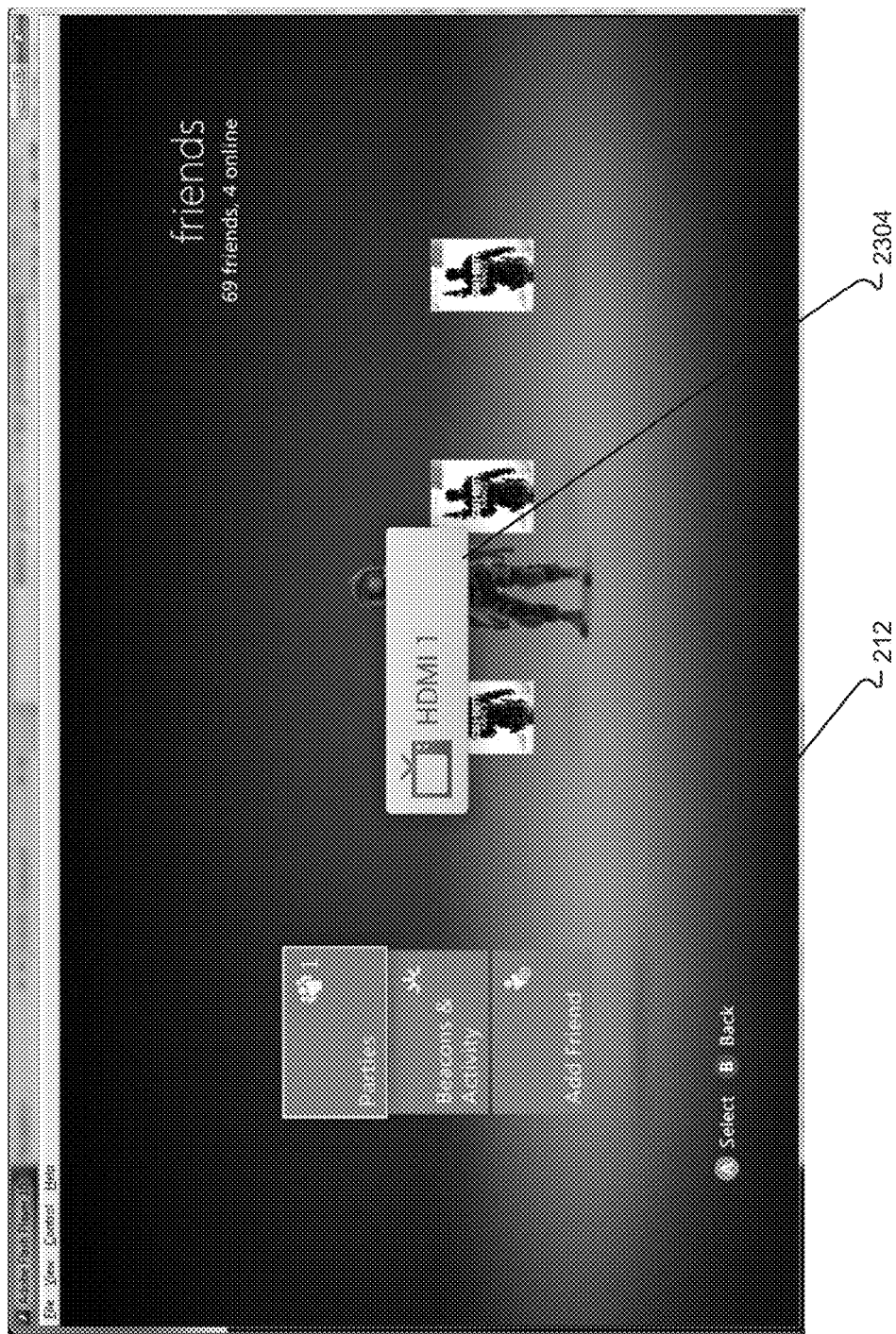
FIG. 23 illustrates an other input.

FIG. 23 illustrates the "other input" 468 on display screen 212. An indicator 2304 can be provided indicating the user has selected as other input HDMI 1 as a source. With any of the sources that are selected, the content associated with that source can be displayed in one or more of a static and dynamic manner. Here, the exemplary HDMI 1 source is associated with an online game the user is participating in.

Figure 24:
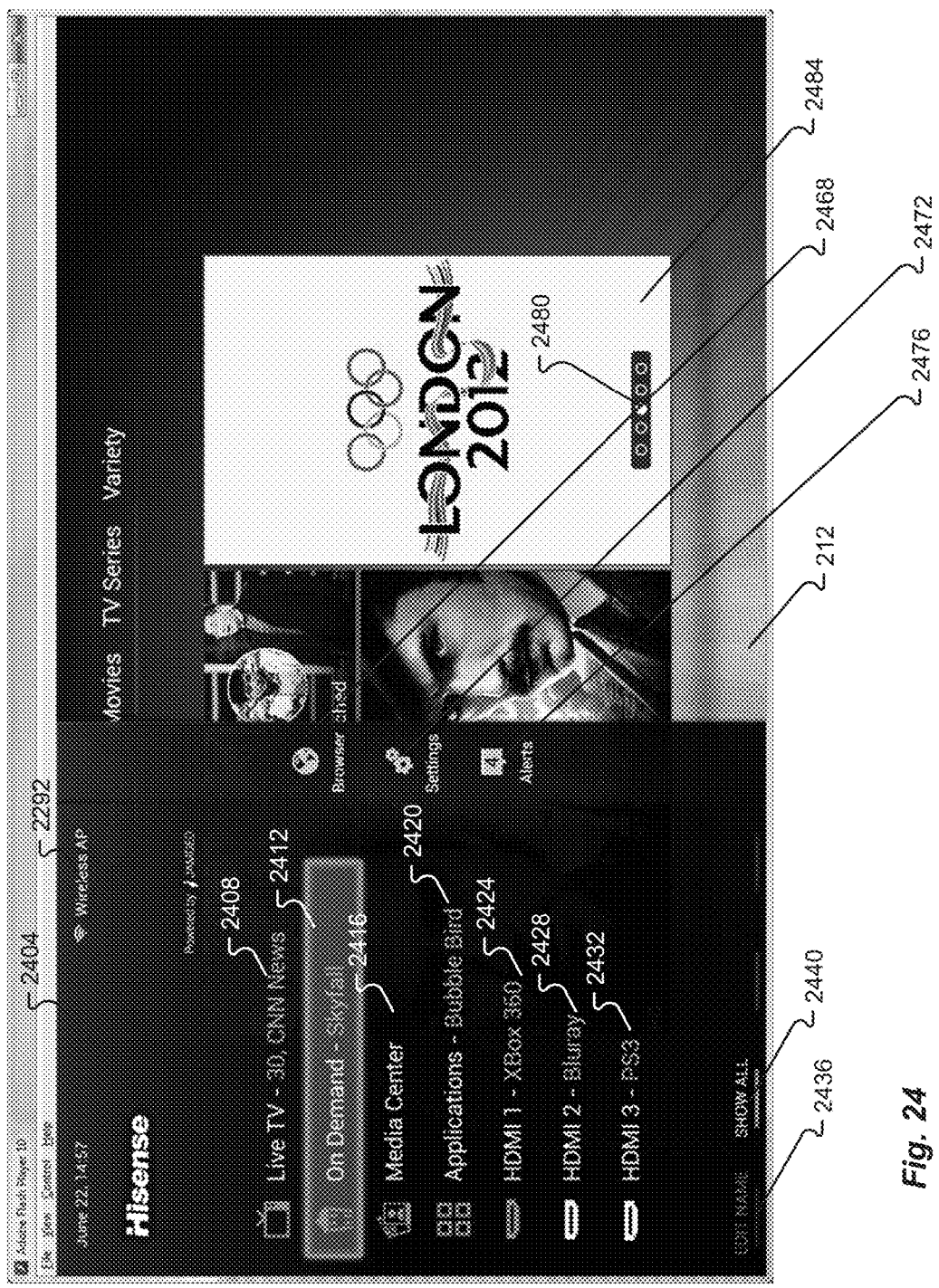
FIG. 24 illustrates the global panel.
Figure 25:
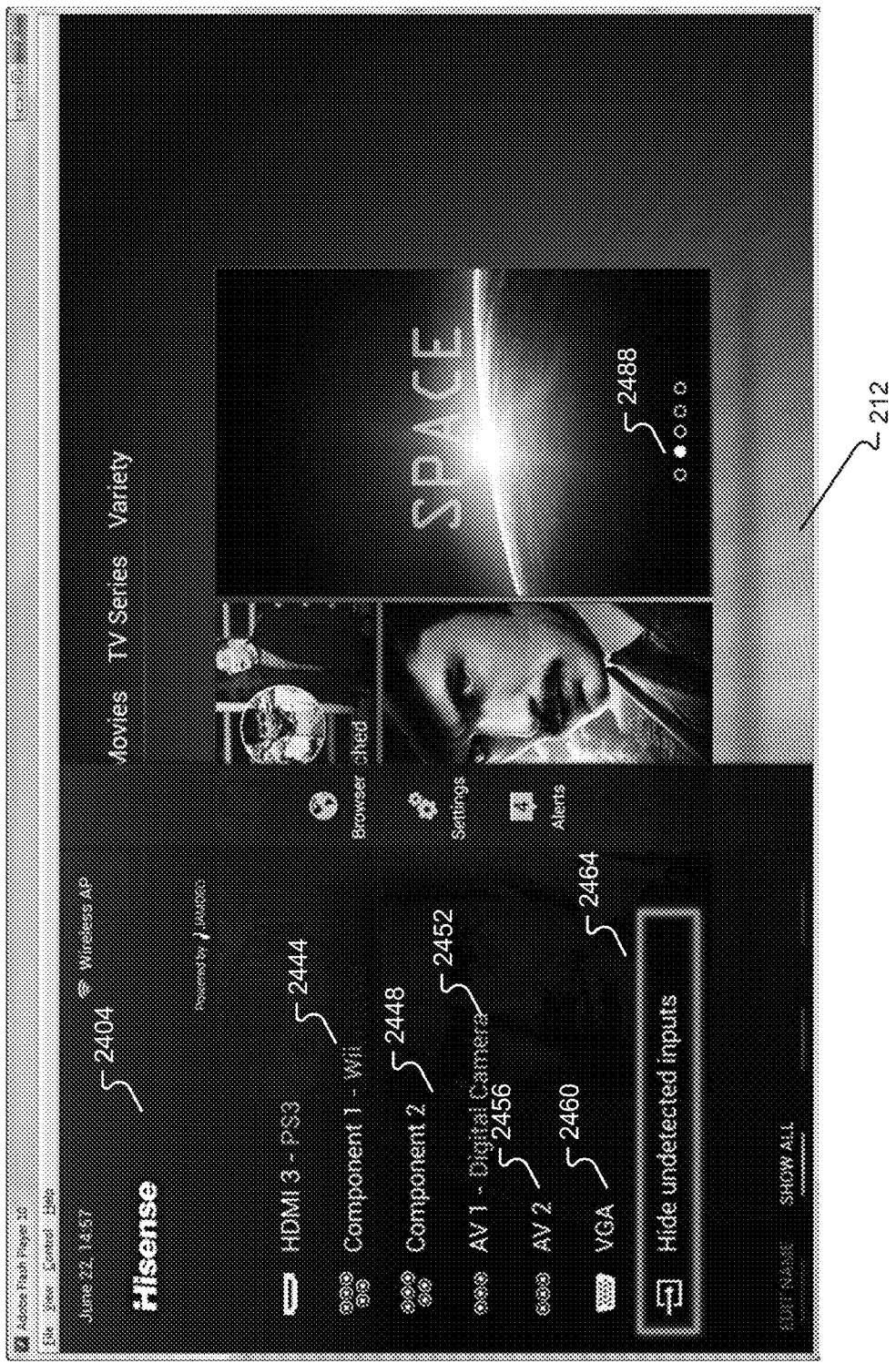
FIG. 25 illustrates the global panel.

FIGS. 24 and 25 illustrate an exemplary embodiment of the global panel. Here, the global panel is illustratively shown on the left-side of the screen, and in this particular instance, the global panel is shown in conjunction with the on demand application 456.

In accordance with one exemplary embodiment, the global panel 2404 includes various types of information, illustratively shown, and the various types of input and content available. Additional information can also be shown, such as wireless access point information 2492. In accordance with this exemplary embodiment, global panel 2404 is shown in a partially transparent manner "above" the on demand content shown on display screen 212. The global panel 2404 includes various information including, for example, Live TV information 2408, on demand information 2412, media center information 2416, application information 2420, HDMI 1 information 2424, HDMI 2 information 2428, HDMI 3 information 2432, and as shown in FIG. 25, the second portion of the global panel that is accessible via, for example, a scrolling down function, component 1 information 2444, component 2 information 2448, AV 1 information 2452, AV 2 information 2456, VGA information 2460, as well as an option to hide undetected inputs 2464. With each of these types of information, further information can be provided such as, for example, what type of content is currently associated with that source. Here, Live TV 2408 is shown and is channel 30, CNN news, and 2412 on demand is shown as being associated with the feature skyfall. In addition, the global panel can provide quick access to one or more of a browser via selectable input 2468, to settings via selectable input 2472, and to alert 2476 that can provide, for example, alerts based on what a user has elected to be alerted to.

In accordance with one exemplary embodiment, and even though the global panel 2404 has been selected, the information in the background screen, here the "on demand" content, can continue to be "live" even though it is in the background. In accordance with this exemplary embodiment, and as seen in FIG. 24, in the dynamic content window 2480, an advertisement for the London 2012 Olympics is being shown. However, as indicated by the circle in 2484 moving from the third position to the second position in FIG. 25, the dynamic content 2488 is shown which is an advertisement for a "Space" feature. Thus, even while the global panel is shown, the underlying content associated with the selected application, such as Live TV 452, on demand 426, media center 460, applications 464, and other inputs 468, can continue to be "active" and still partially visible in the background.

FIGS. 26-30 illustrate a first exemplary embodiment of the application panel associated with Live TV. As discussed above, the application panel is dynamic and can optionally change based on one or more of context and content of the underlying application being viewed, as well as the location, such as which silo, the panel is associated with, and whether the panel is on a top, bottom, left or right-hand side of the display. Furthermore, the application panel can include various subcategories of information, with the number and type of the subcategories also being dynamic based on the underlying context or content being viewed by the user. In accordance with the embodiments in FIGS. 26-30, the user has selected to watch Live TV 452 and therefore the application panel 2604 has been populated based on this selection. As seen in this sequence of figures, the application panel 2604 has various subcategories including information (info) 2608, electronic program guide (EPG) 2612, categories 2616, favorites 2620, and search 2624, all are which selectable via, for example, a button on the remote control.

Figure 26:
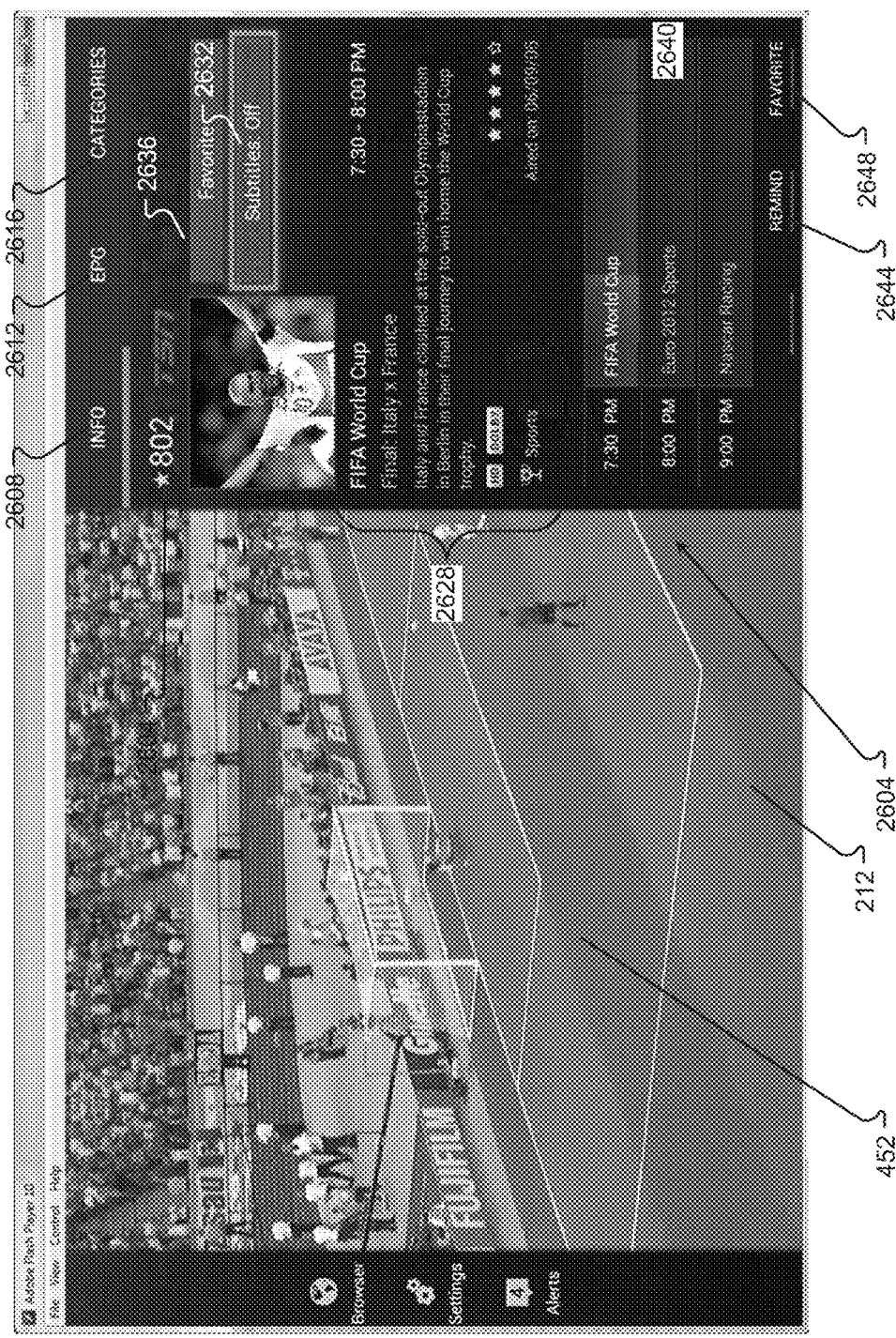
FIG. 26-47 illustrates various embodiments of the application panel.

For the info subcategory 2608 is illustrated in FIG. 26, information about the current Live TV selection can be shown. For example, information about the Live TV selection can be shown in portion 2628, upcoming programs in section 2640, the button to select the content as favorite 2632, a button to toggle subtitles 2632, and, for example, a button to place a reminder 2644, and a button to mark the show as a favorite 2648.

Figure 27:
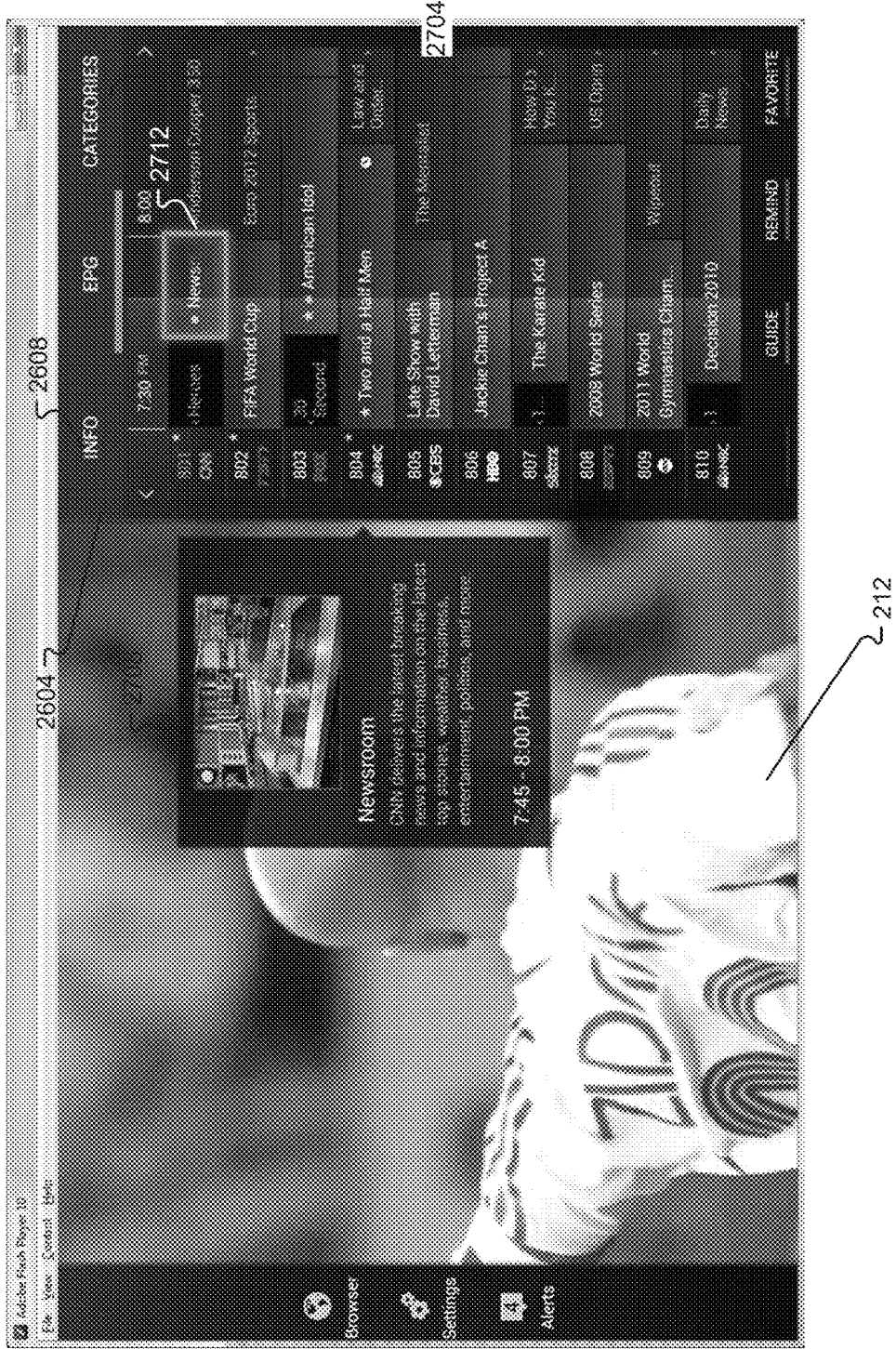

Upon selection of the electronic program guide subcategory 2604, the application panel is updated as illustrated in FIG. 27. Here, the electronic program guide is shown in section 2704 with, for example, popup 2708 optionally showing a preview of the content associated with that channel. Here, since channel 801 is highlighted as shown by box 2712, the popup 2708 provides a preview and optional information about that particular highlighted program. The popup 2708 can include, for example, an inset window showing the content that is currently being shown on channel 801, as well as information such as a program overview and start and end times for the program.

Figure 28:
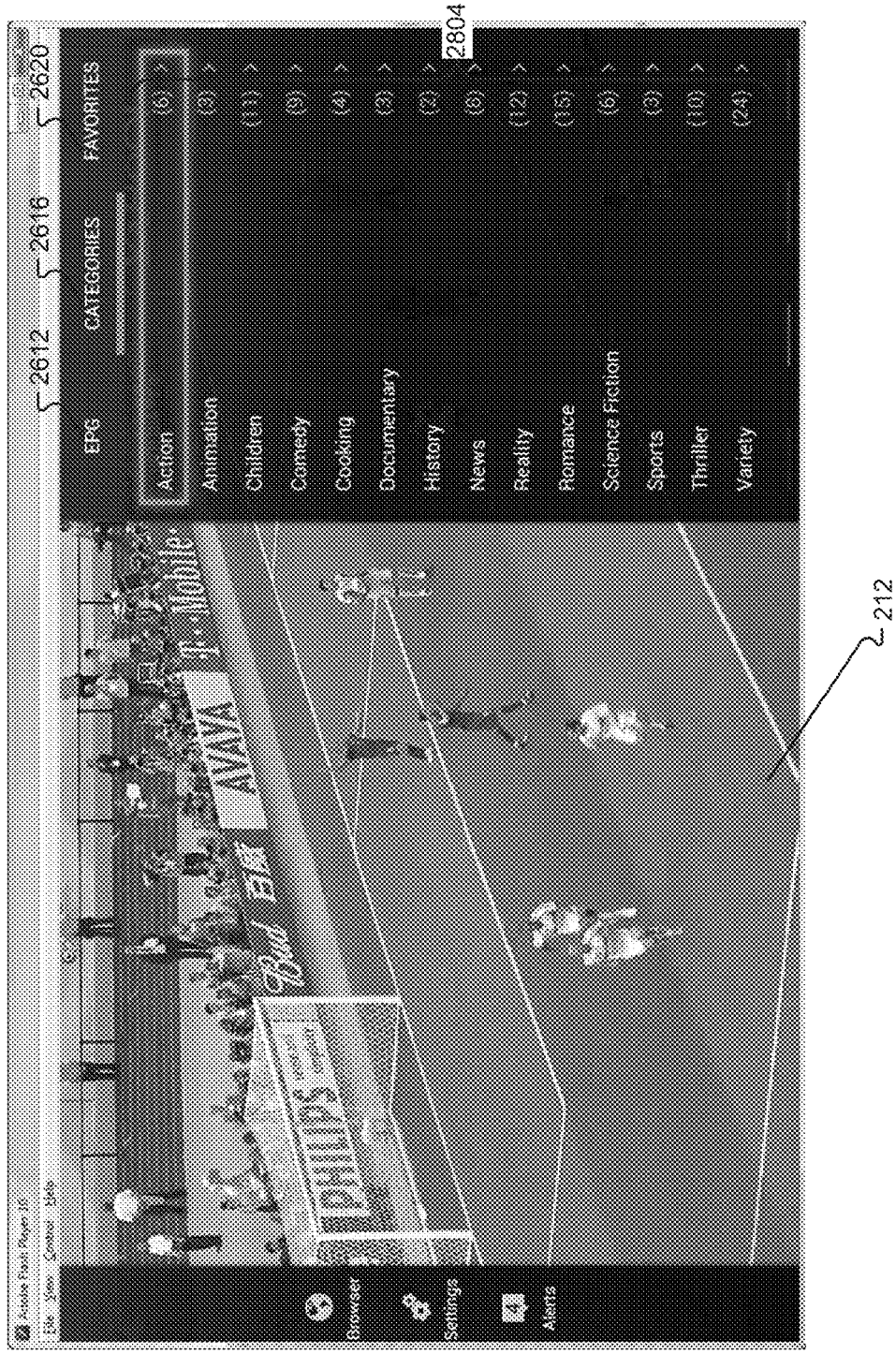

Upon selection of the category submenu 2612, as illustrated in FIG. 28, the application panel changes to show various categories of Live TV 2804 that are available for viewing. Upon selection of any of these categories, further information can be provided about the types of content that are available in that particular category. Here, "action" has been selected, and if a user were to select action via the remote control with the press of the enter button, all content associated with the action category (here being six titles) could be viewed and, upon the pressing of an enter button, selected for viewing.

Figure 29:
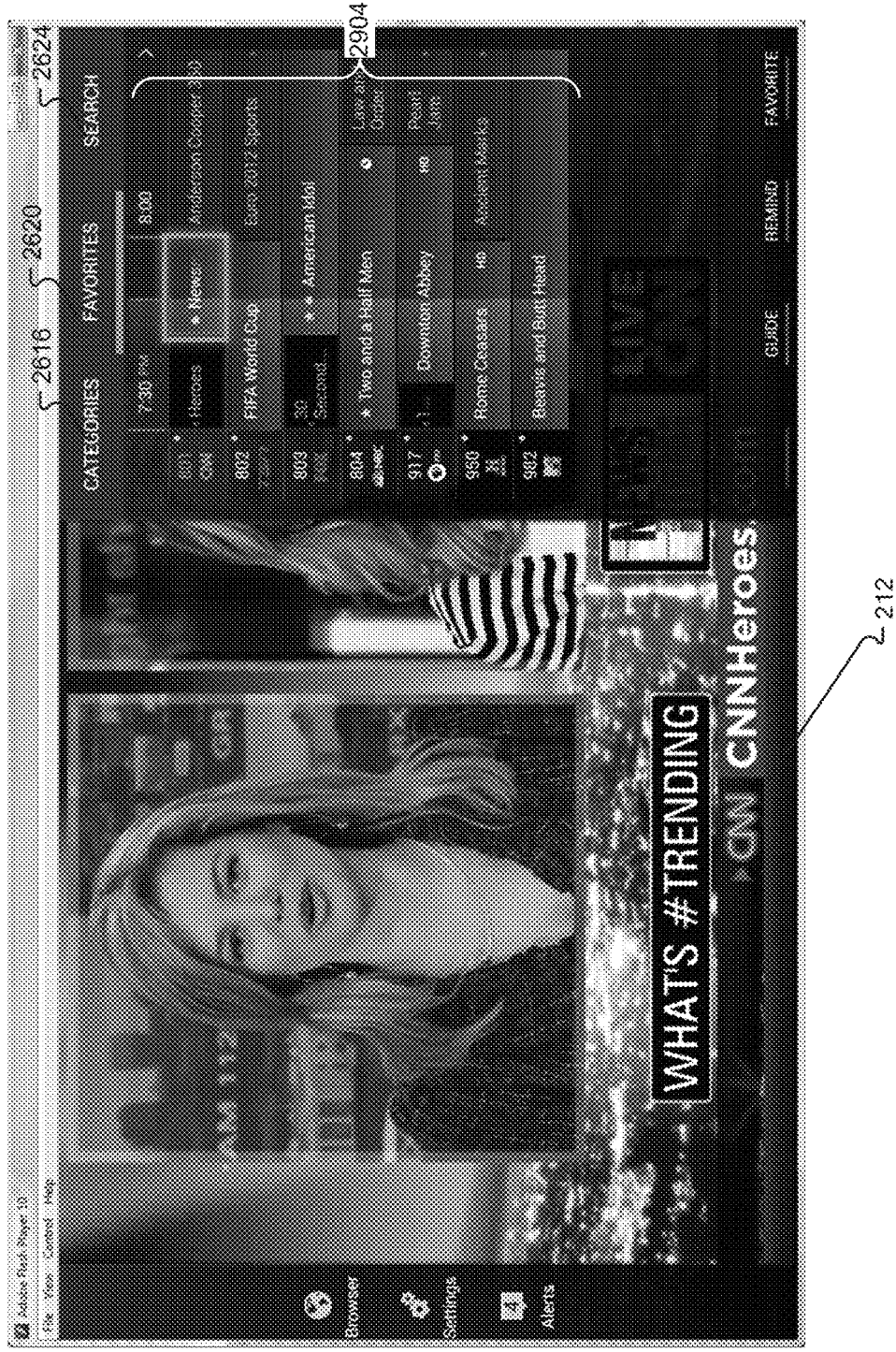
Figure 30:
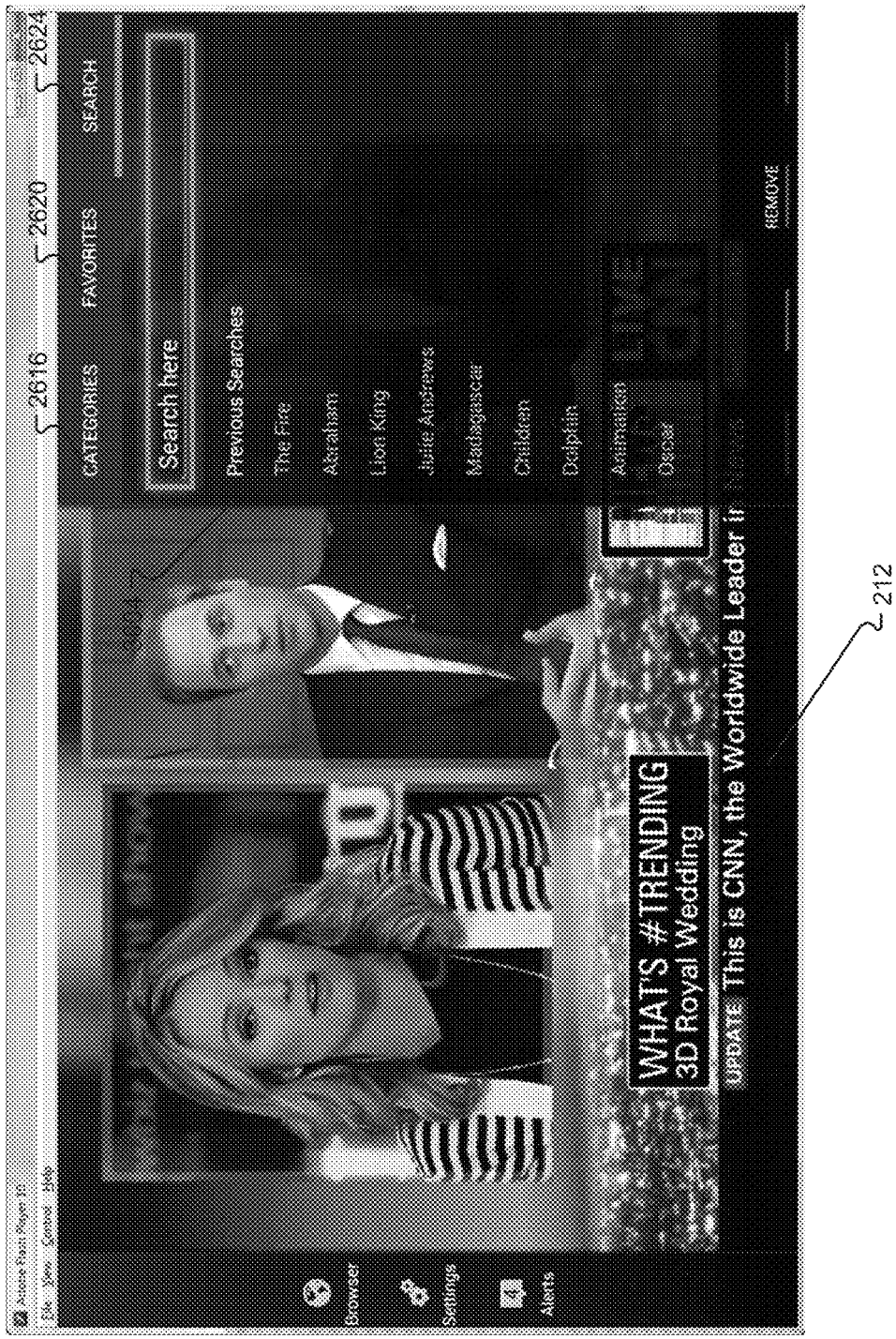

FIG. 29 illustrates the favorite's subcategory 2620. Here, in portion 2904, the various favorites that the user has selected are shown and are selectable to, for example, allow the user to quickly tune to any of their favorite Live TV channels. FIG. 30 illustrates the exemplary application panel search subfeature 2624. Here, a search window can be provided ("Search Here") that allows a search to be entered in the field, with previous searches 3004 optionally being shown which are selectable and executable, via, for example, the remote control. Various other buttons can also be provided to, for example, remove searches from the list. In accordance with one optional exemplary embodiment, a keypad (not shown) could also be provided that allows the user to select on the screen the various letters for entry into the "search here" field.

FIGS. 31-37 illustrate an exemplary embodiment of the application panel that is associated with the on demand application 456. In accordance with this exemplary embodiment, the application panel 3104 has subcategories, here: information subcategory 3108, news category 3112, recommended subcategory 3116, genre subcategory 3120, favorite subcategory 3124, and search subcategory 3128. As with the application panel described above, content, and optionally dynamic content, can be shown behind the application panel 3104 with the application panel 3104 being, for example, transparent or semitransparent. Similarly, on demand information shown in the background can be dynamic, with one or more of the portions of content therein changing, for example, see FIG. 31 where "London 2012" is being advertised and FIG. 37 where an advertisement is presented in the dynamic content space for a "space" feature.

Figure 31:
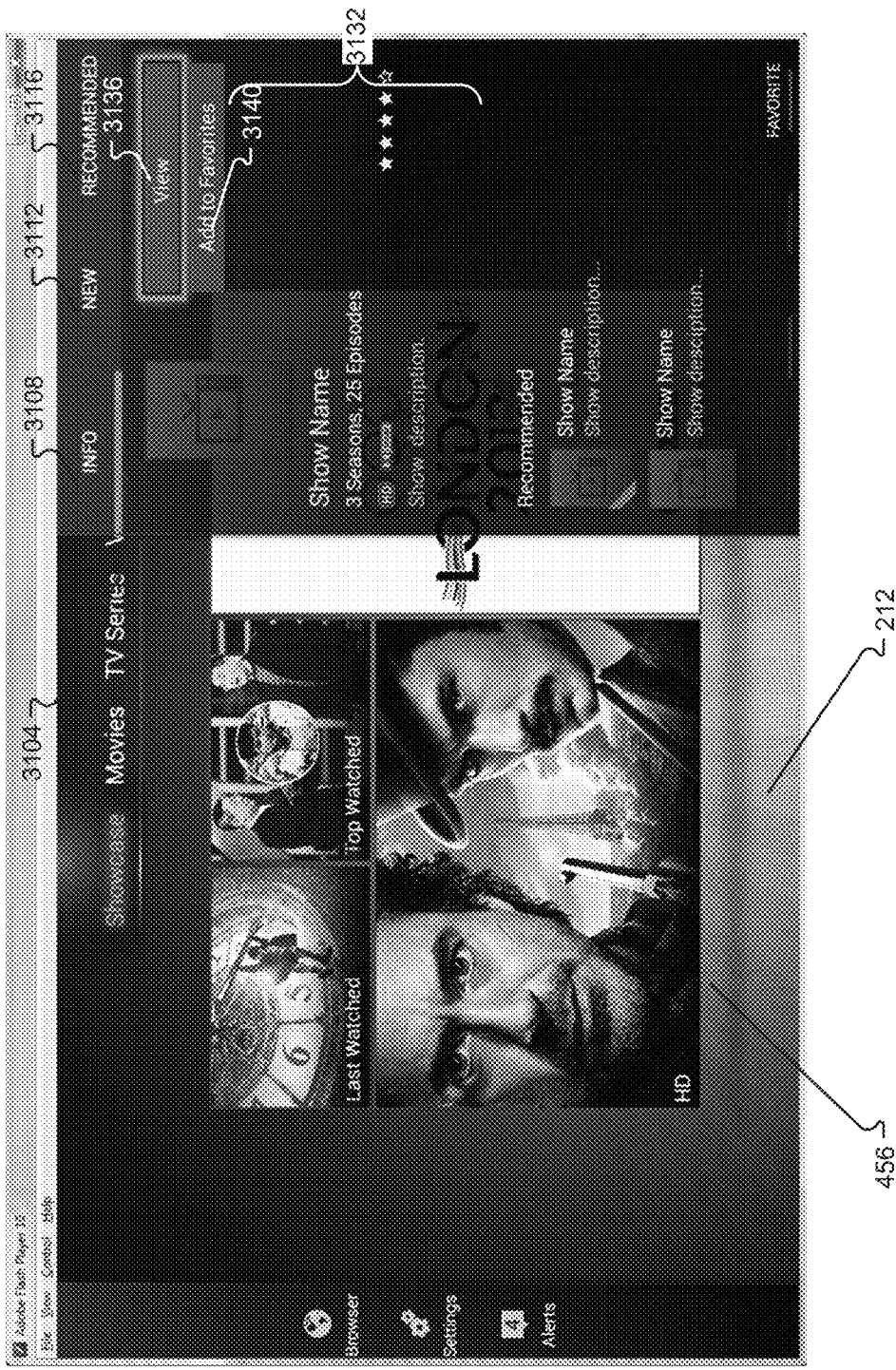

As illustrated in FIG. 31, an exemplary embodiment of the information subcategory 3108 is shown. Here, information about the currently being viewed show is shown in section 3132 with information such as, the number of seasons, episodes, whether or not it's in high definition ("HD"), whether or not is has Dolby® stereo, and, for example, how many stars it is rated as. A button 3140 can optionally provide an "add to favorites" option, and, in the bottom portion of the pane, other recommended shows shown.

Figure 32:
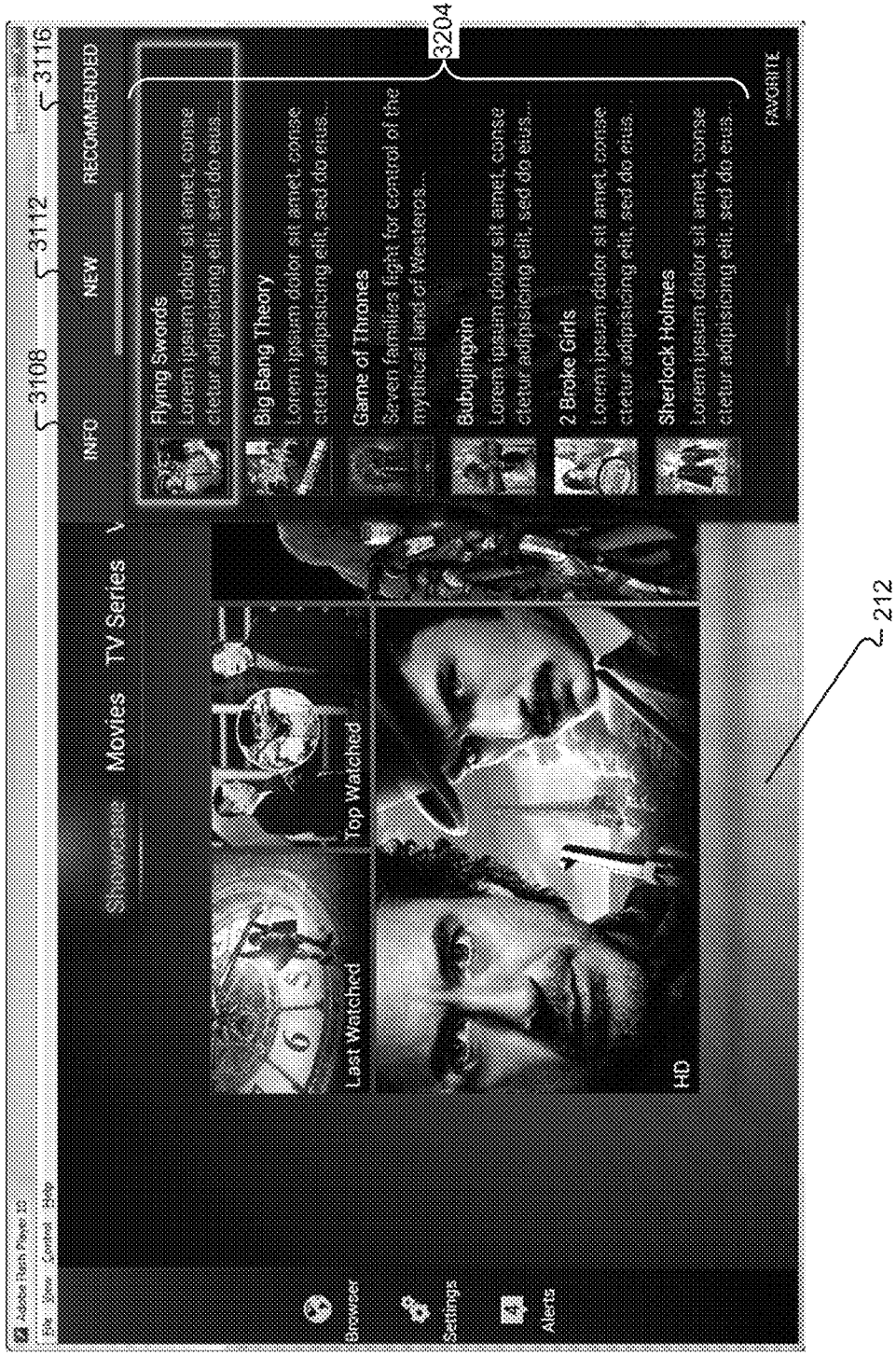
Figure 33:
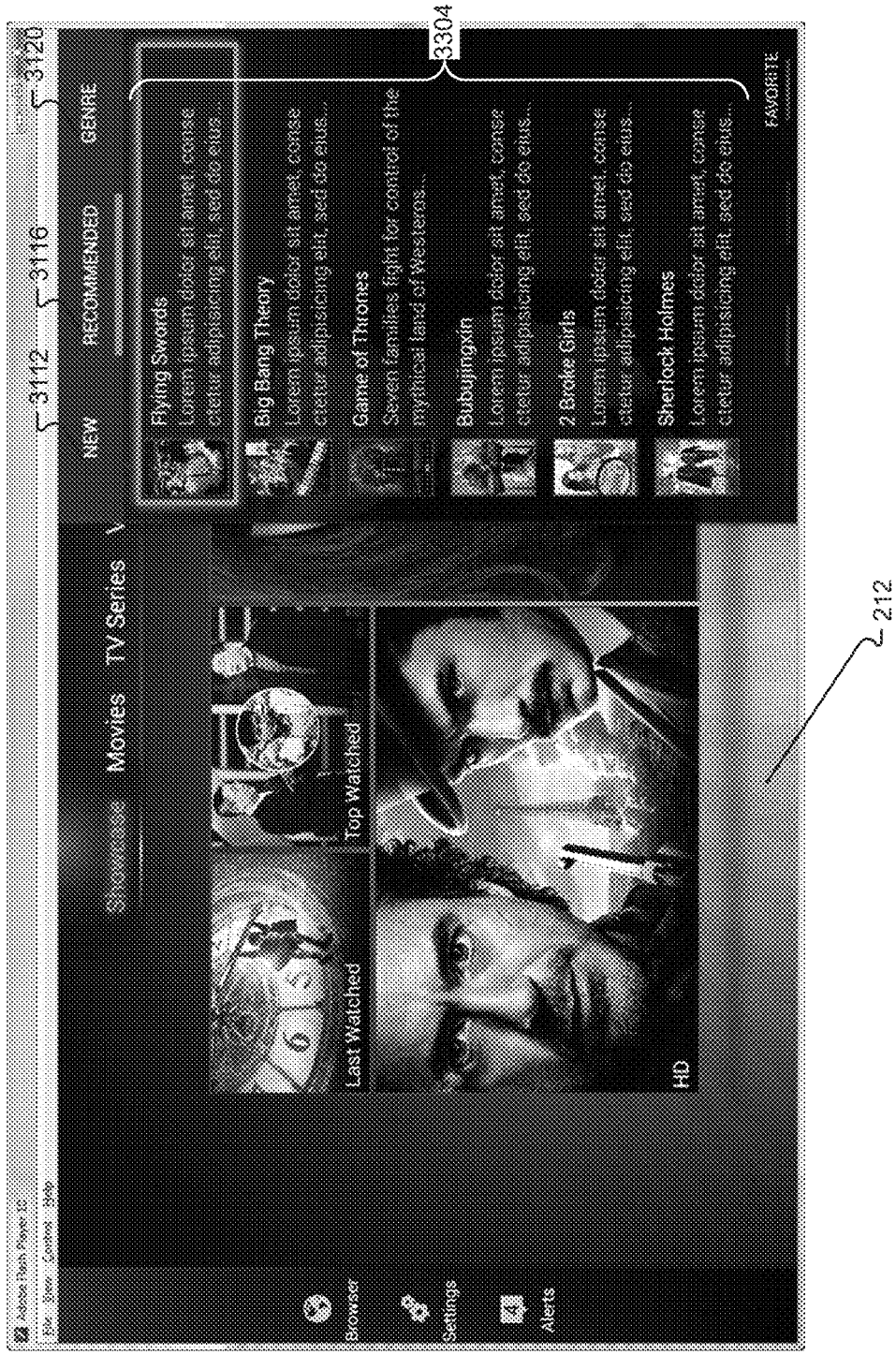

FIG. 32 illustrates in greater detail the new subcategory 3112. In this subcategory, in portion 3204 newly available content can be listed. In FIG. 33, there is a recommendation portion 3304 that shows the number of recommendations based, for example, on one or more of users viewing habits, recommendations from a content supplier, recommendations from the user's friends, or the like.

Figure 34:
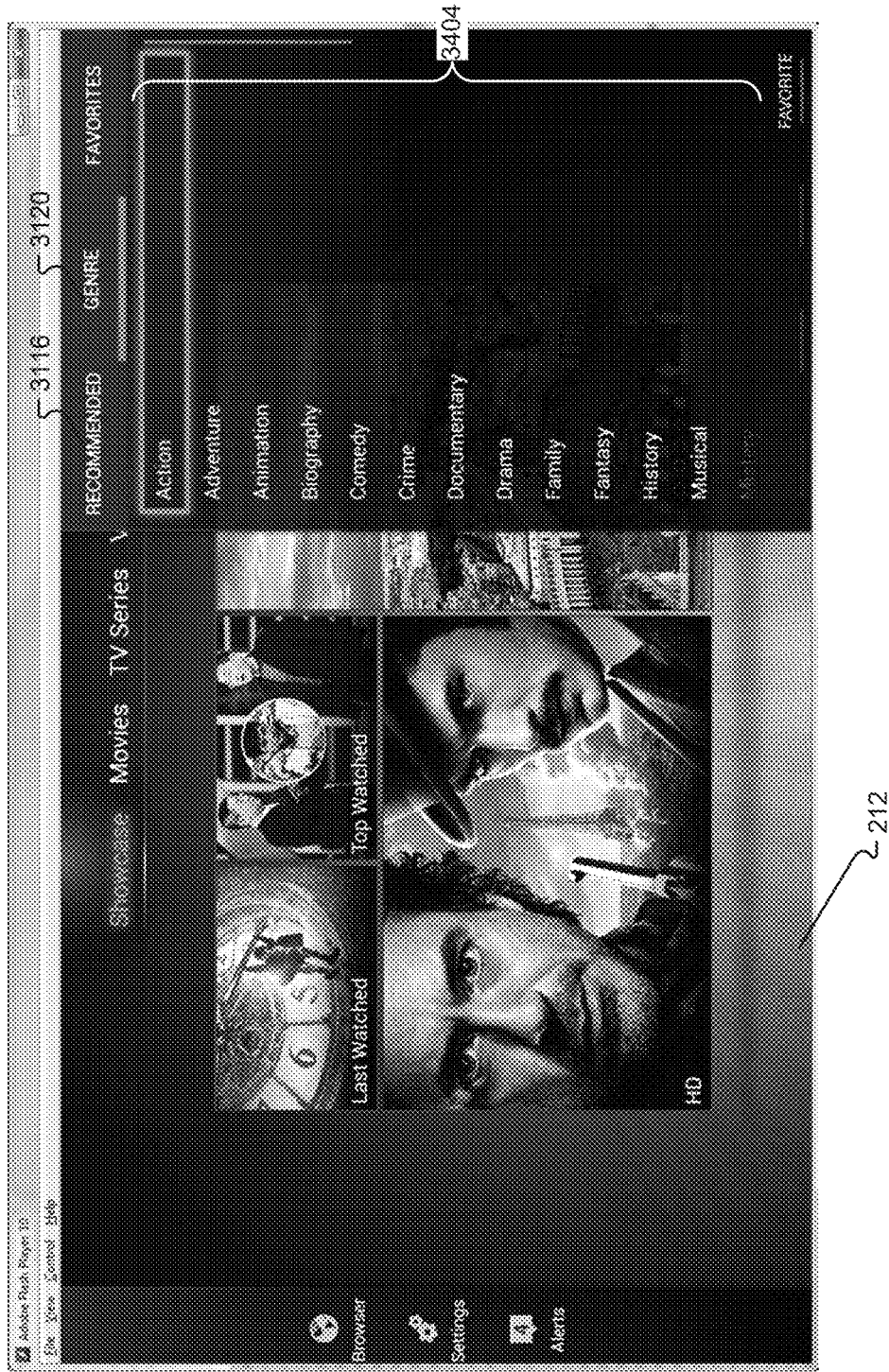

FIG. 34 illustrates in greater detail the genre subcategory 3120. The genre subcategory includes a plurality of different genres in portion 3404, with one or more of these genres capable of being drilled down into to view on demand content associated with that genre. As with the other embodiments, genre can be selected via, for example, an enter button which in turn would then display the on demand selections available for the genre.

Figure 35:
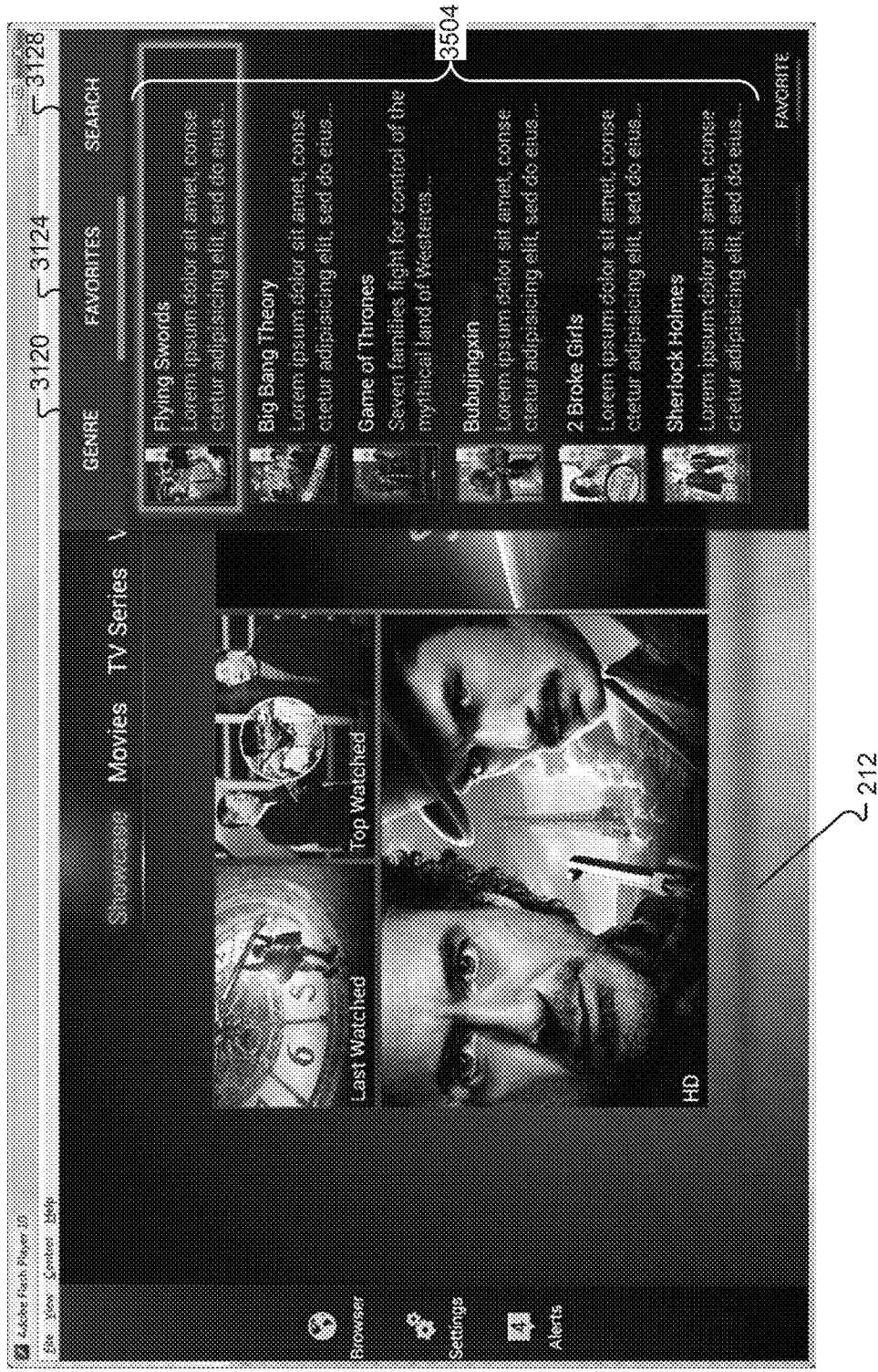
Figure 36:
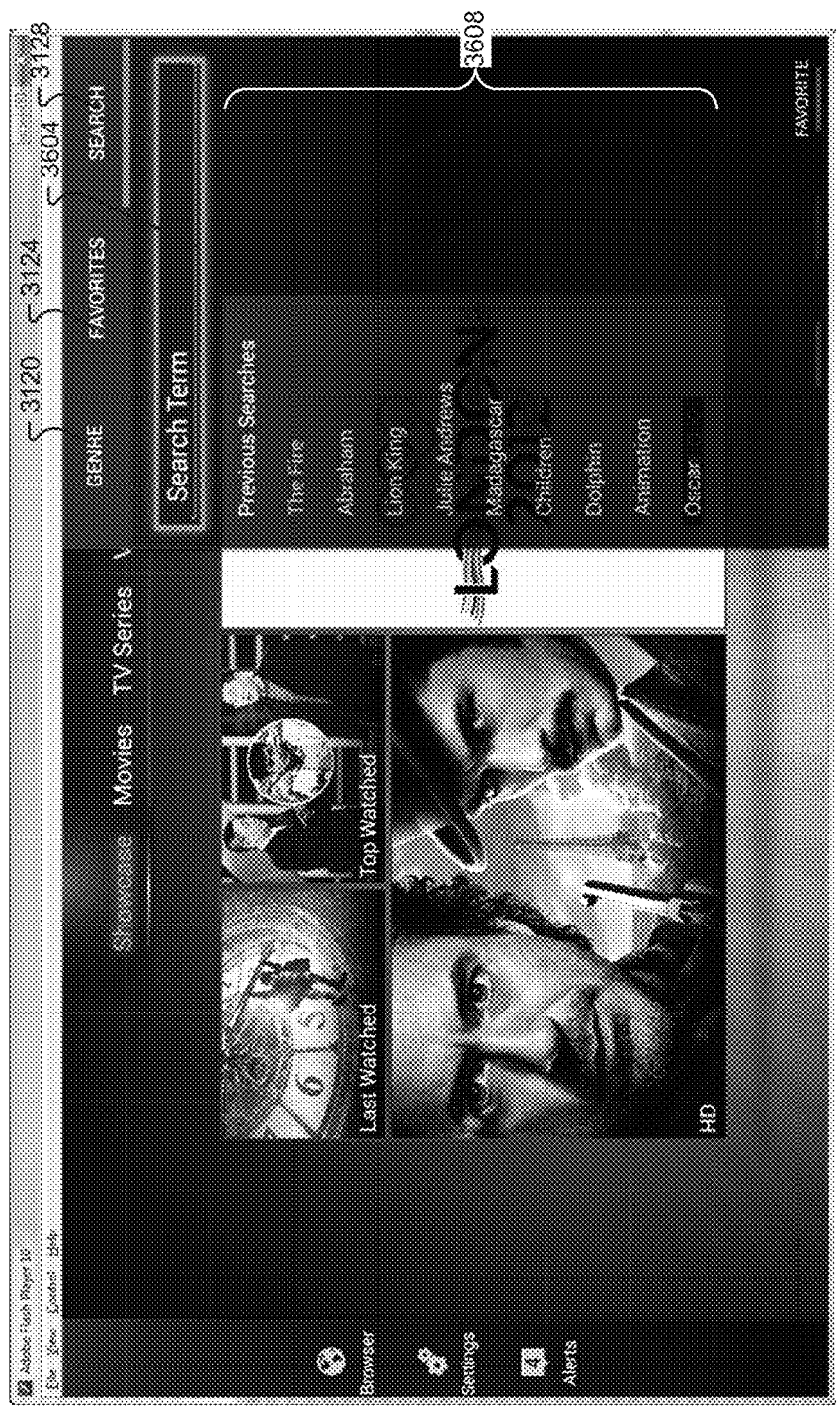

FIG. 35 illustrates in greater detail the favorite's subcategory 3124. Here, in portion 3504, the user's favorites are shown with each of them being selectable for playback. FIG. 36 illustrates an exemplary embodiment of the search subcategory 3128. As before, a field is provided where a user can enter a search term 3604, as well as optionally one or more previous searches shown in portion 3608. A user can either a search term or scroll through the previous searches, selecting one, for execution of the search.

Figure 37:
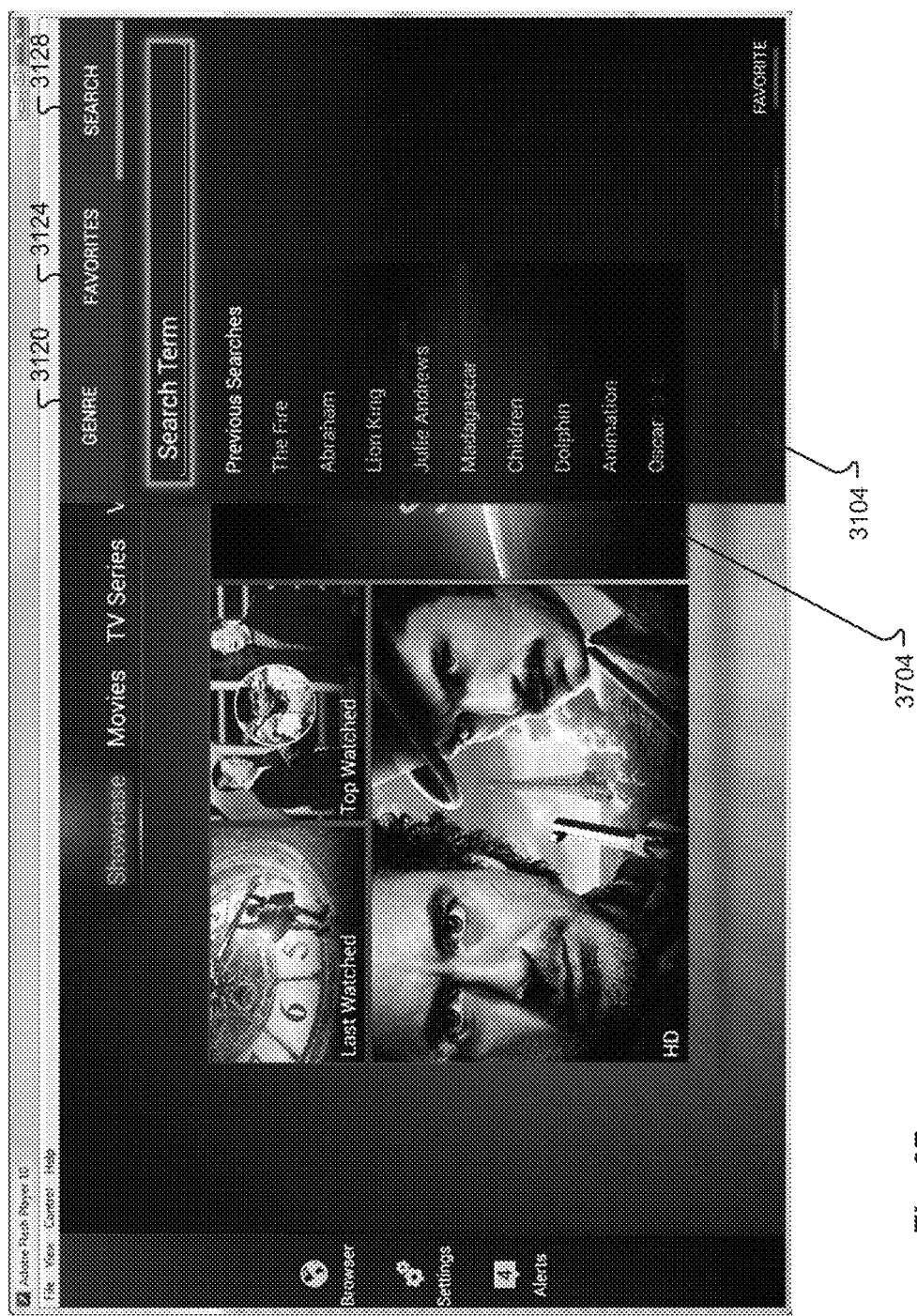

FIG. 37 illustrates the exemplary dynamic content that is being provided "behind" the application panel. As discussed, this dynamic content 3704 can change in the background while a user is perusing or navigating information in the application panel 3104.

FIGS. 38-43 illustrate an exemplary embodiment of the application panel 3800 that is associated with media center 460. In accordance with this exemplary embodiment, there are also a number of subcategories of information within the application panel including, for example, information subcategory 3804, new subcategory 3808, last viewed subcategory 3812, most viewed subcategory 3816, favorites subcategory 3820, and search subcategory 3824. As will be appreciated, since the media center 460 has different subcategories itself, e.g., showcase, my videos, my photos, and my devices, the application panel can change based on each of those subcategories. By way of illustration, the application panel associated with the showcase subcategory of the media center 460 is illustrated in FIGS. 38-43.

Figure 38:
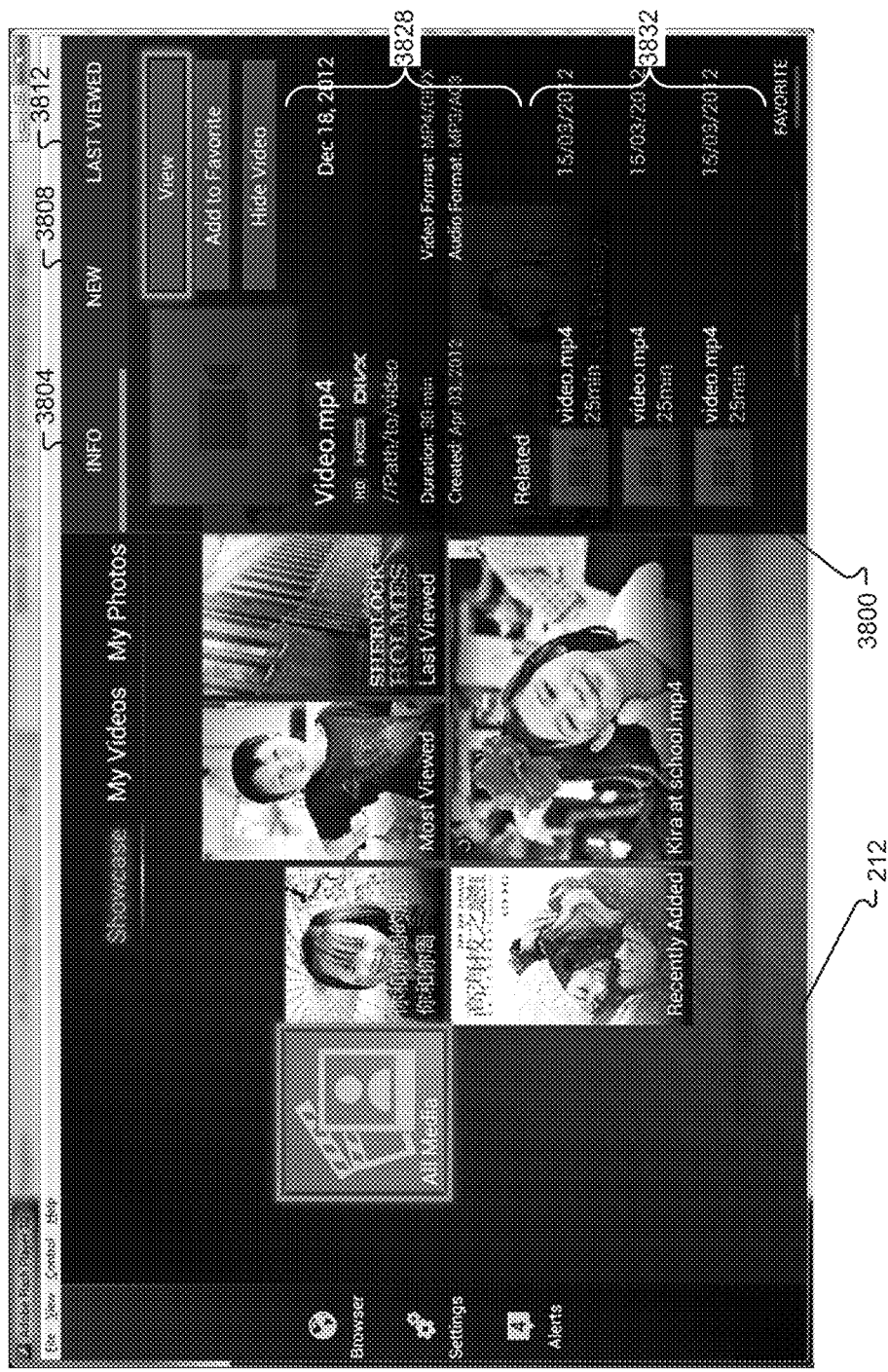

In FIG. 38 the application panel 3800 includes an information portion 3828 that includes, for example, information about a selected video, including, for example, the path to the video, the type of video, whether or not it is in HD, DIVX® or Dolby® certified, the duration of the video, creation date, video format, audio format, or in general any information associated with the video. As with the other application panels, there can optionally be provided a button to add the video to favorites or hide the video if desired by a user. Moreover, there can be a related portion 3832 that shows videos or other content that is related to the selected video, here, "video.mp4."

Figure 39:

FIG. 39 illustrates an exemplary embodiment of the new subcategory 3808. Here, newly listed content in the media center 460 is shown in portion 3904. Information associated with the new content can include, for example, duration, date information, or in general any information associated with the content presented therein, e.g., metadata.

Figure 40:
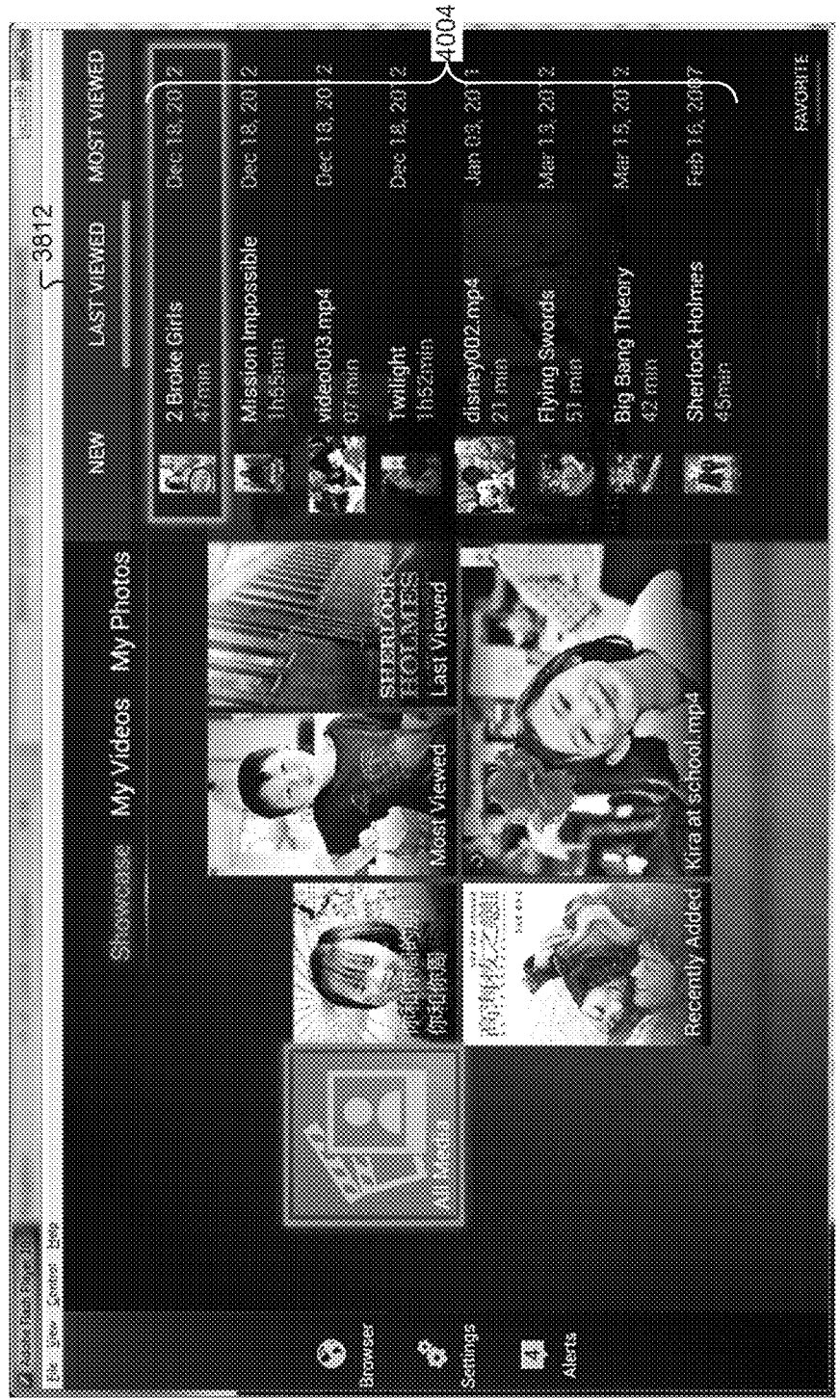
Figure 41:
Figure 42:
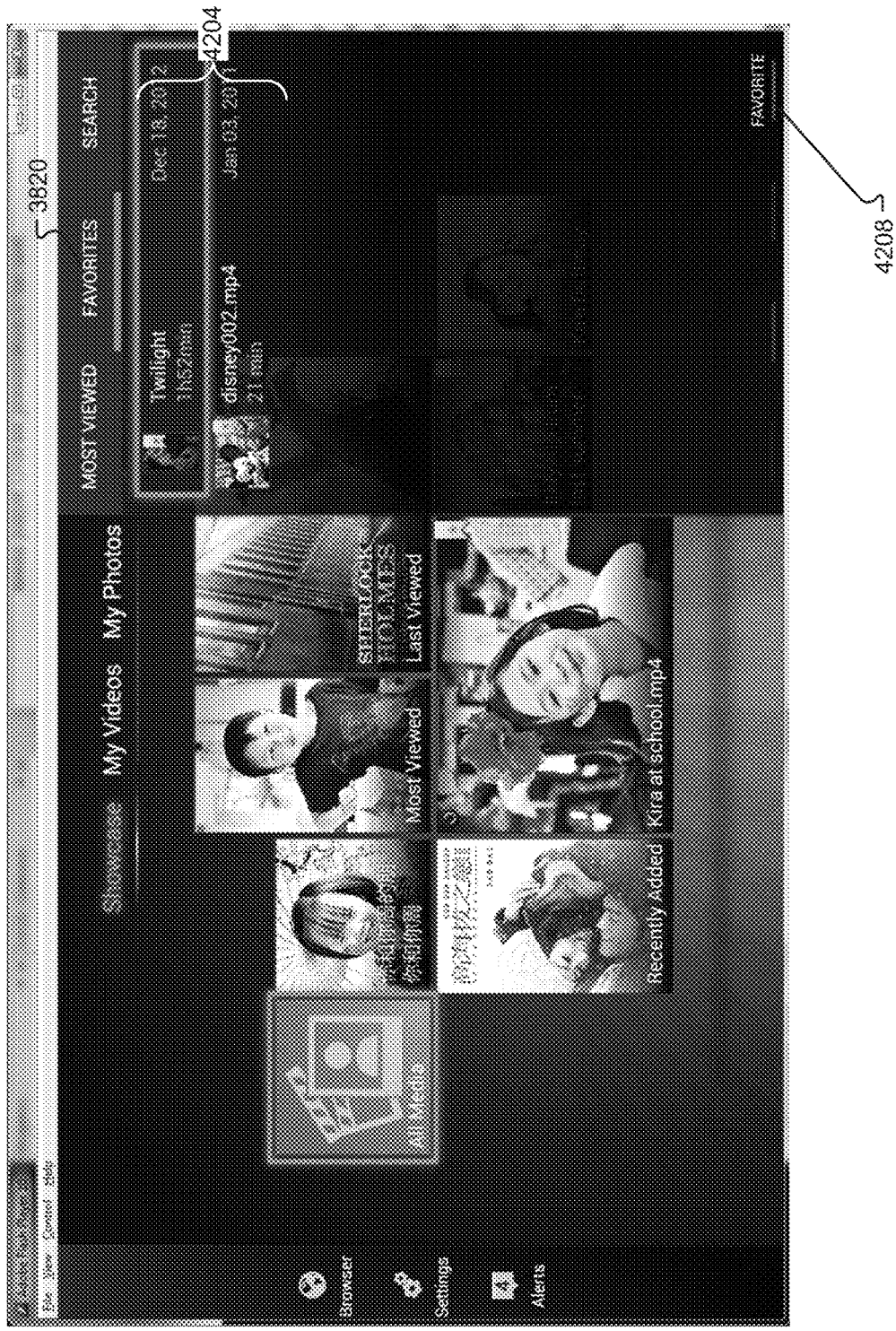
Figure 43:
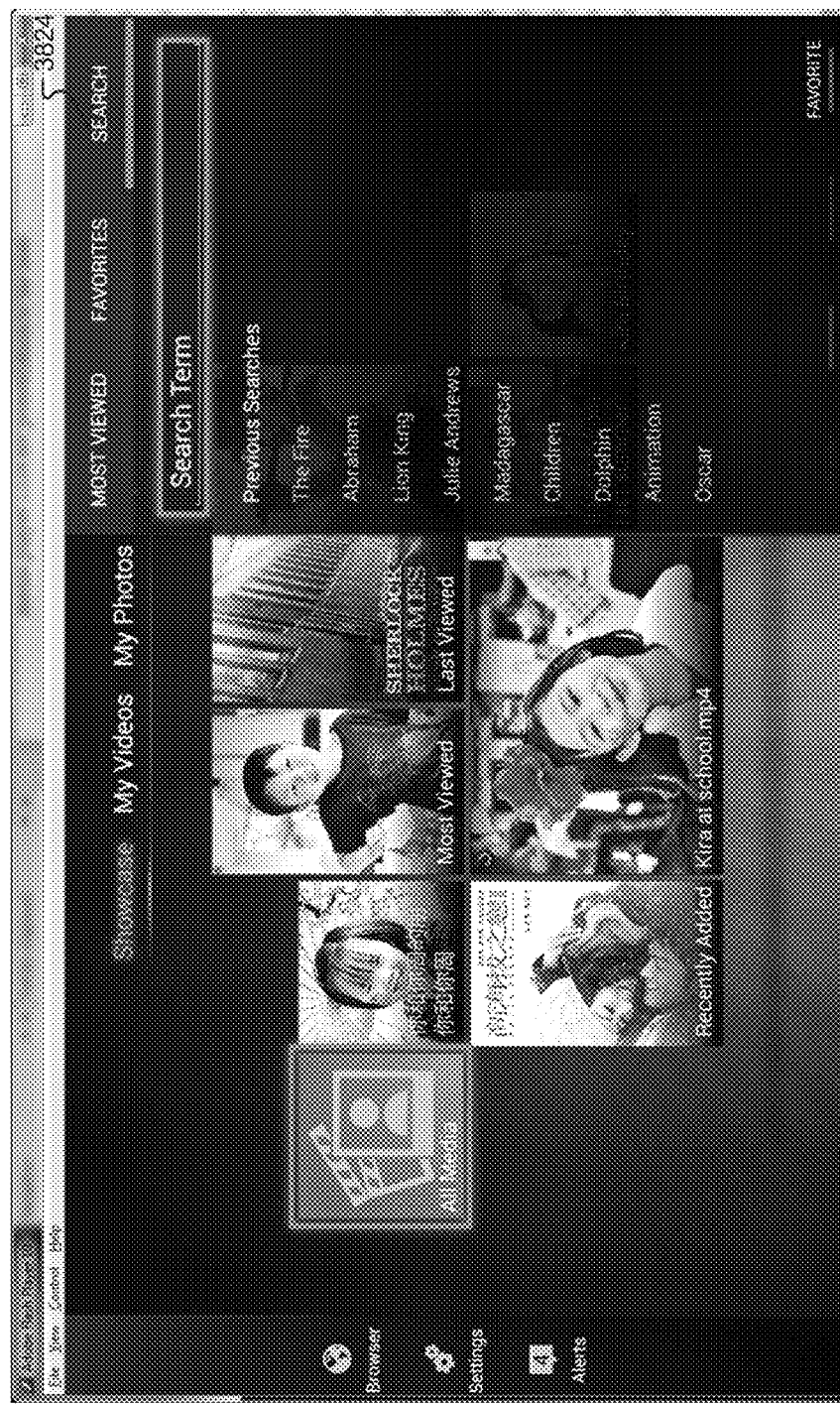

FIG. 40 illustrates in greater detail the last viewed subcategory 3812. Here, in portion 4004, information regarding the last viewed content is presented. Again, information associated with the last viewed content can include duration, date information, whether or not the content is a favorite, or the like. FIG. 41 illustrates in greater detail an exemplary embodiment of the most viewed subcategory 3816. Here, the most viewed content is displayed in portion 4104. The most viewed content can be ranked with, for example, the most viewed content displayed first, the next most viewed content second, and so on. As with the other embodiments, additional information can be associated with each of the individual content items including, for example, duration information, date information, whether or not the content is a favorite, or the like. FIG. 42 illustrates an exemplary embodiment associated with the favorite subcategory 3820 of the application panel. Here, a favorite's portion 4204 presents content that has been indicated as being a favorite by the user. Using, for example, button 4208, a user can toggle whether or not a particular piece of content is or is not a favorite. FIG. 43 illustrates an exemplary embodiment of the search subcategory 3824. As discussed, this search subcategory works similarly to the other previously discussed search features discussed herein.

Figure 44:
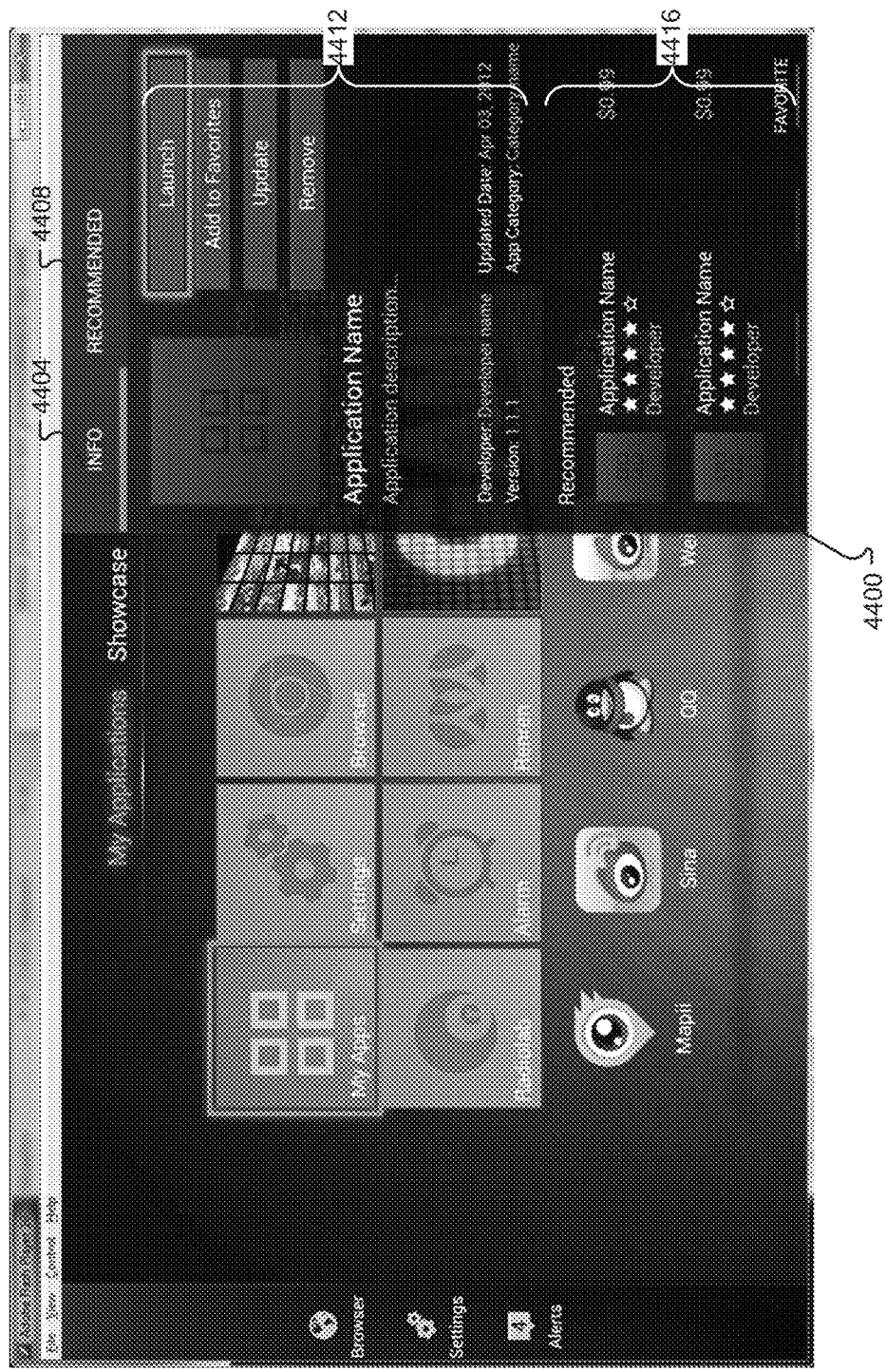
Figure 45:
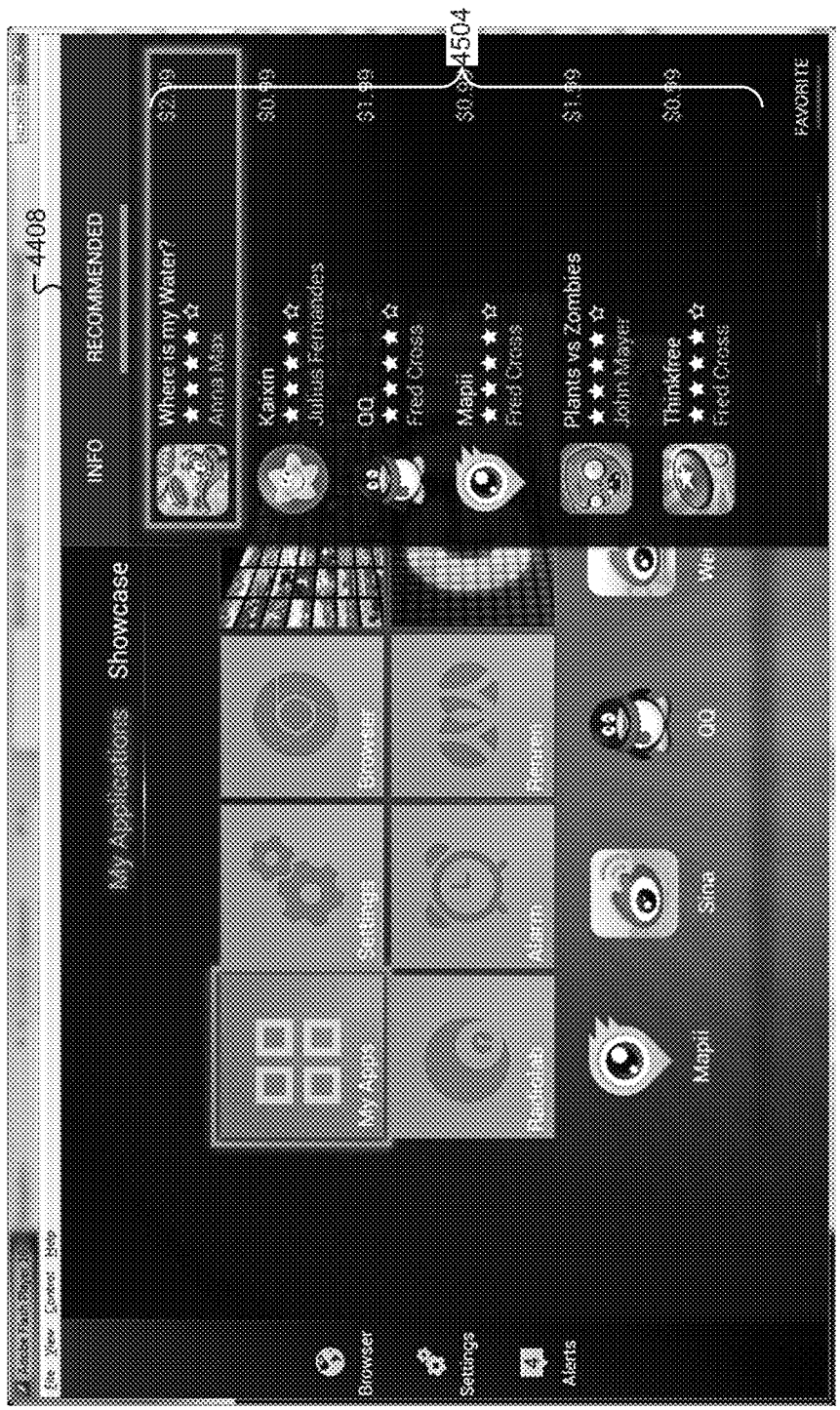

FIGS. 44-45 illustrate exemplary embodiments of the application panel associated with application 464. This applications panel 4400 includes two subcategories including information subcategory 4404 and recommended subcategory 4408. Information subcategory 4404 includes information such as application name, and selectable buttons to launch, add to favorites, update, or remove the particular application in portion 4412. Optionally, a recommended portion 4416 can be provided where further applications are recommended to the user. In FIG. 45, the recommended subcategory 4408 illustrates in portion 4504 other recommended applications based on, for example, user preferences, usage information, content supplier, recommendations, or the like.

Figure 46:
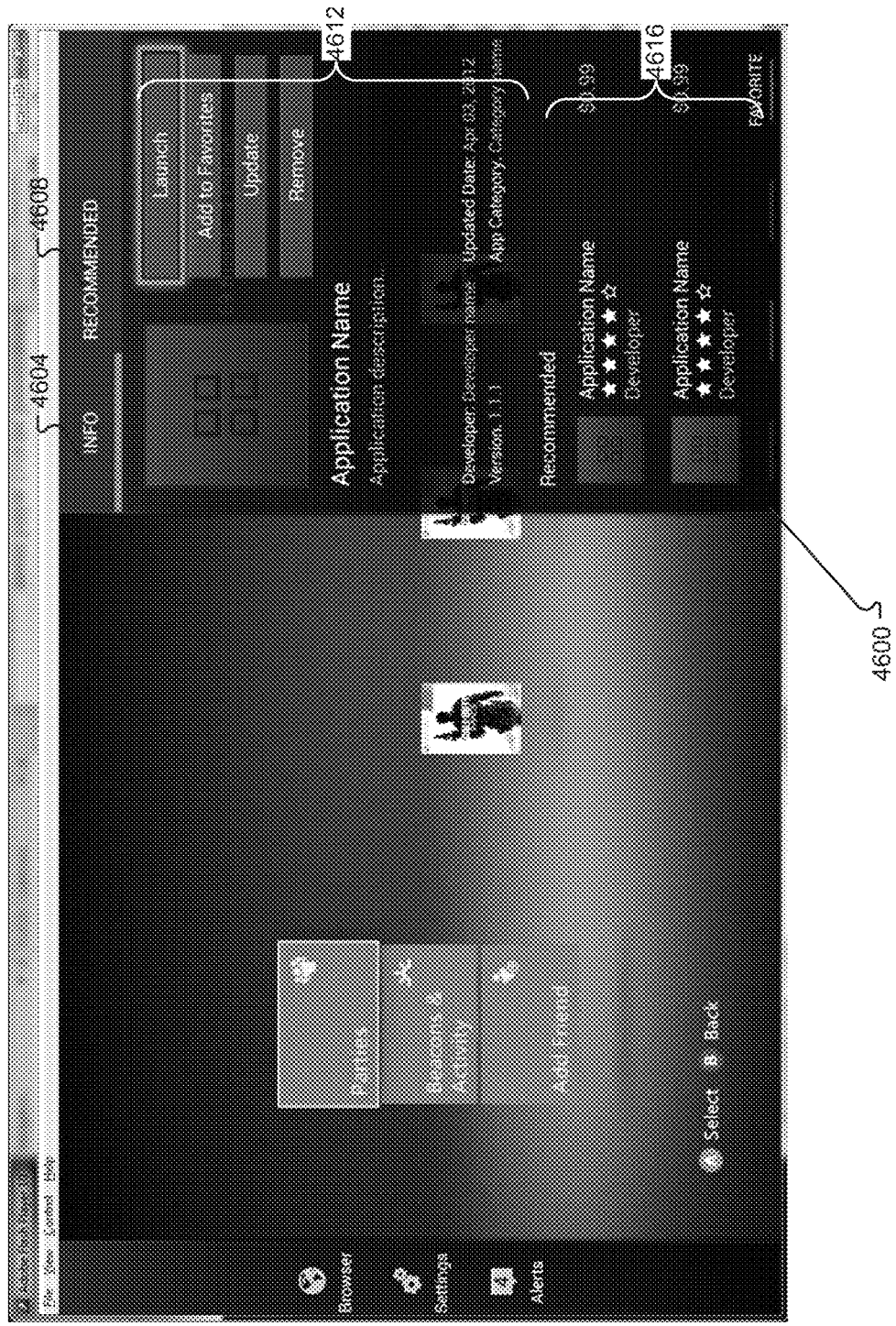
Figure 47:
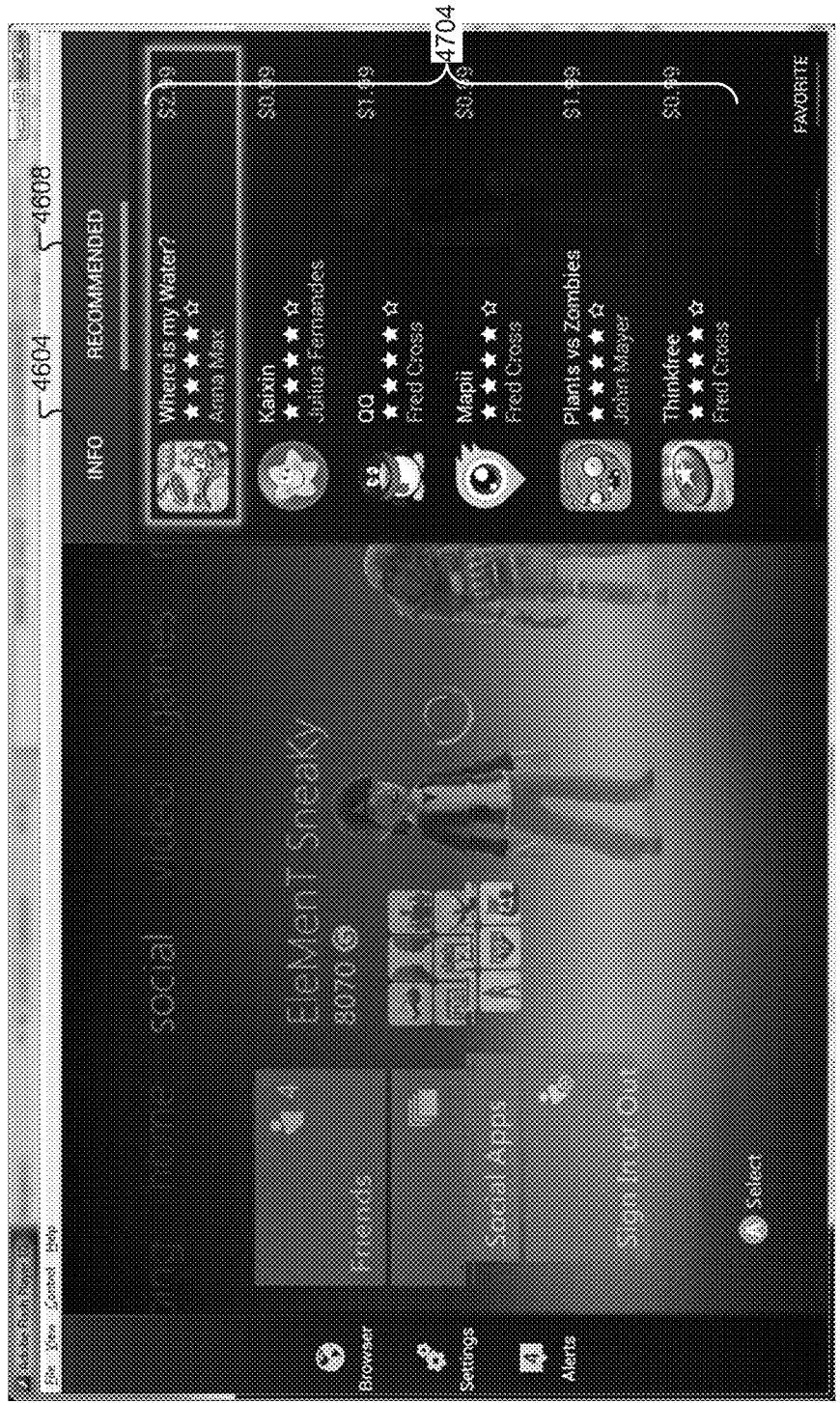

FIGS. 46 and 47 illustrate an exemplary embodiment of the application panel 4600 associated with other inputs 468. This particular exemplary application panel similarly includes an information subcategory 4604 and a recommended subcategory 4608. The information subcategory 4604 illustrated in FIG. 46 includes information such as application name, and selectable buttons to one or more of launch, add to favorites, update and remove the application in portion 4612. A recommendation portion can also optionally be included 4616 that provides other recommended applications, content, or the like. FIG. 47 illustrates the recommended subcategory 4608 with portion 4704 showing recommended applications to the user. Using, for example, the up and down arrows on the remote control, and similar to the other embodiments, a user can select an application for purchase and/or execution by the intelligent TV 100.

Figure 48:
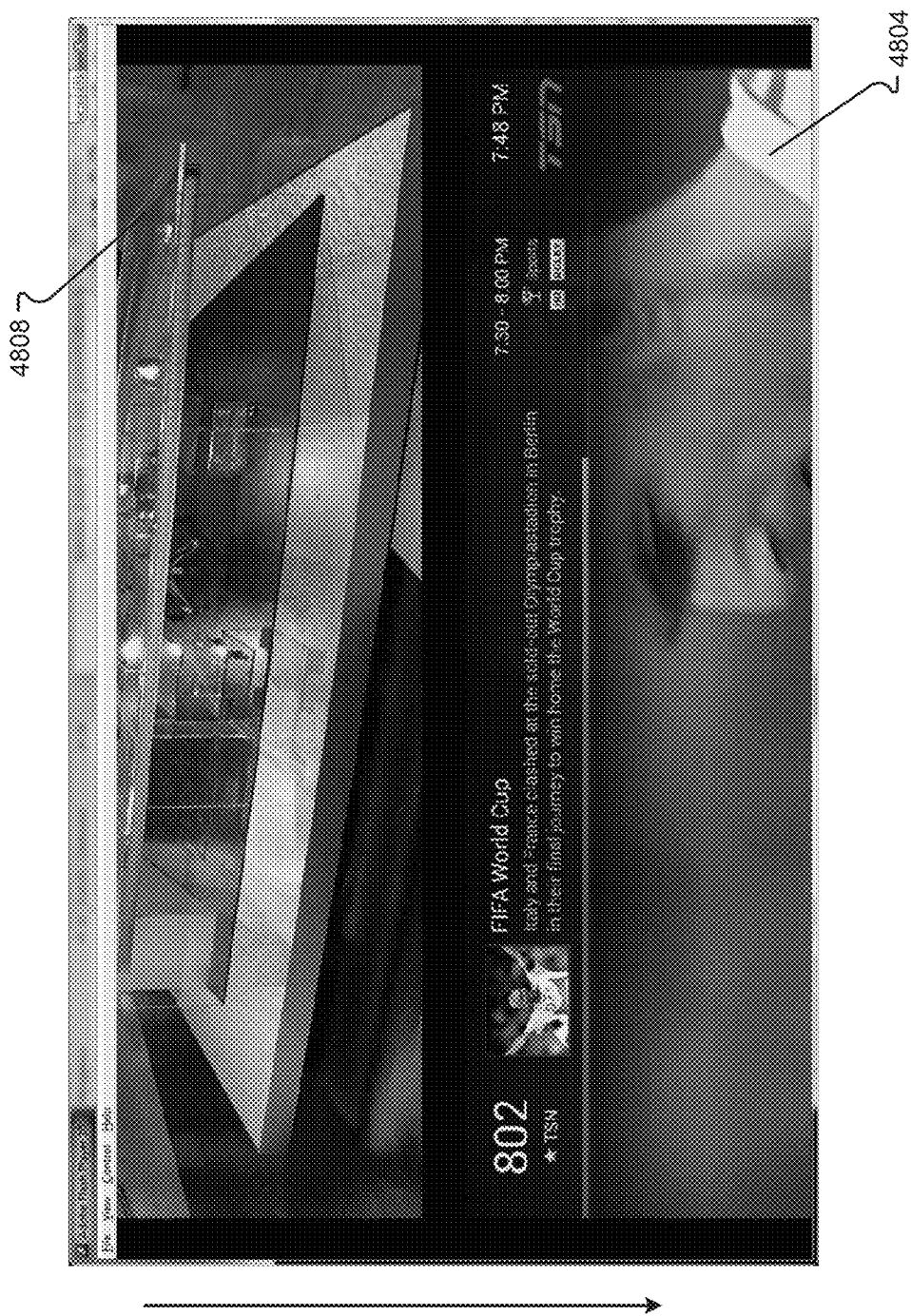
FIG. 48 illustrates channel transition.
Figure 49:
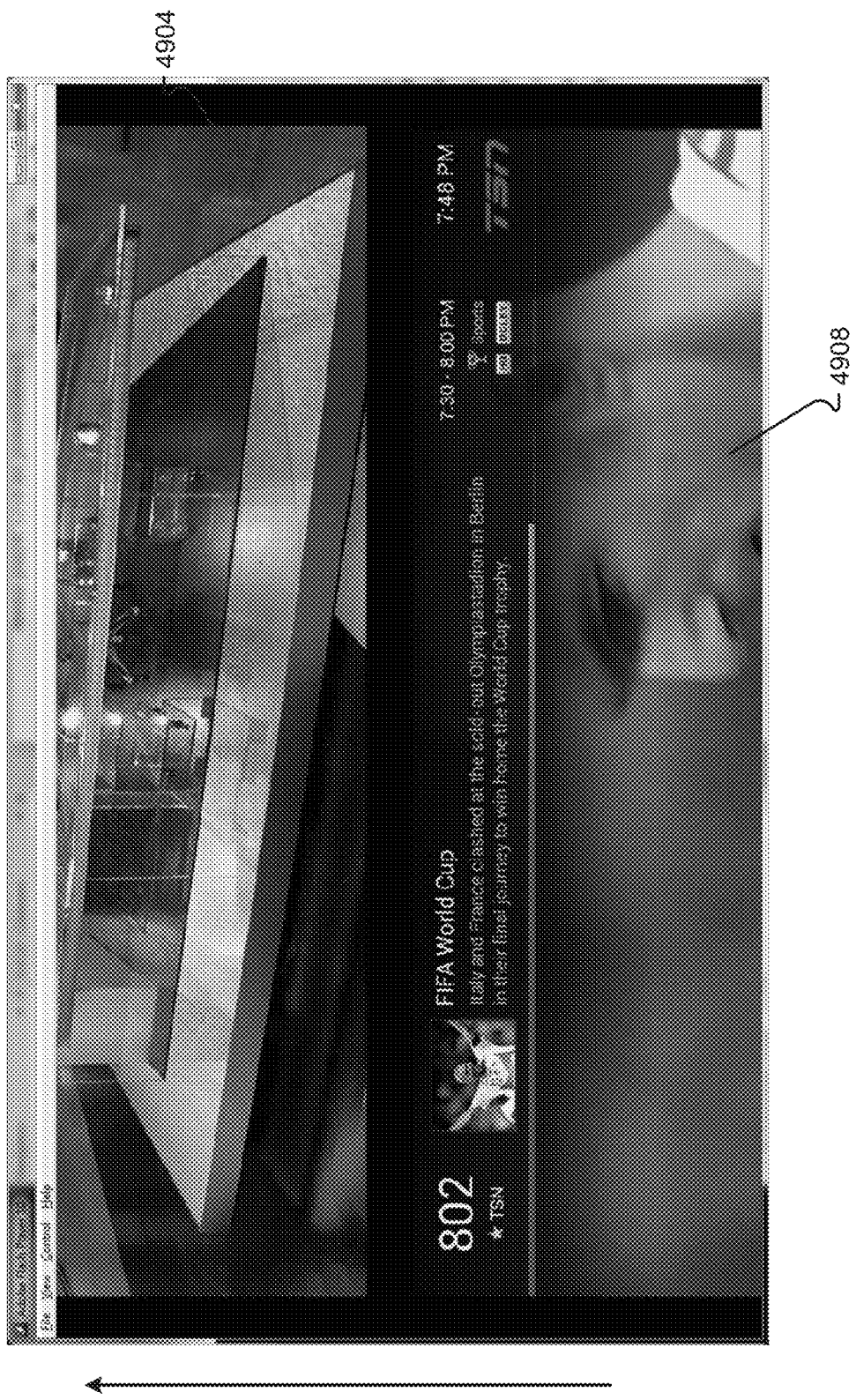
FIG. 49 illustrates channel transition.

FIGS. 48 and 49 illustrate exemplary embodiments of the transition between Live TV feeds. In FIG. 48, a user has pressed the down button on the remote control which transitions, via an exemplary scrolling method, from a first Live TV feed 4804 to a second Live TV feed 4808. Similarly, if a user presses the up key on the remote control as illustrated in FIG. 49, the Live TV feed transitions from a first program 4904 to a second program 4908.

Figure 50:
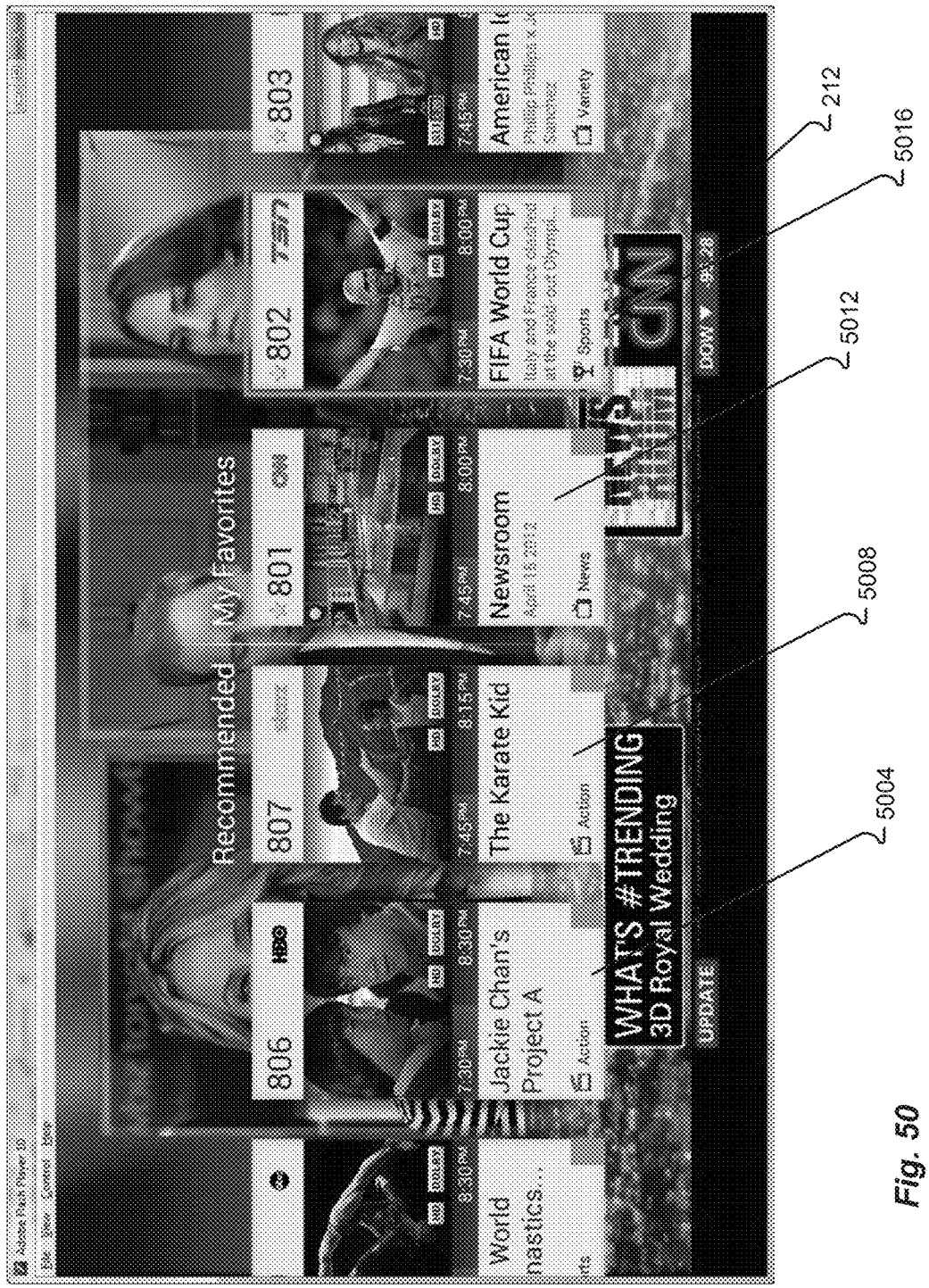
FIG. 50 illustrates Live TV channel selection.

FIG. 50 illustrates an exemplary embodiment of what happens when a user selects the left or right key on the remote control when in Live TV 452. (It is to be appreciated the function of the right-left and up-down keys could be switched, thereby making the previews scroll in a up-down manner instead of horizontally.) Here, previews of the available channels become available, with, in accordance with this exemplary embodiment, recommended channels shown on the left-hand side of the display screen 212, and favorite channels shown on the right-hand screen of display screen 212. A user can than scroll through these various channels using the left and right keys, with a selected channel being illustrated with highlight 5016. A user can then select this channel, via, for example, pressing of the enter button which displays that particular Live TV feed on display screen 212. Of note, and optionally, for each of the recommended and favorite channels being displayed, information, including a preview of what is currently being shown in a Live TV feed can be shown in these channel preview windows 5004, 5008, and 5012. In accordance with this exemplary embodiment, not only information about the program, such as title, a brief description, start and end time is shown, but also category information, whether or not the program is in HD, whether or not the program has Dolby®, as well as the channel number and channel identifier are all optionally provided.

Figure 51:
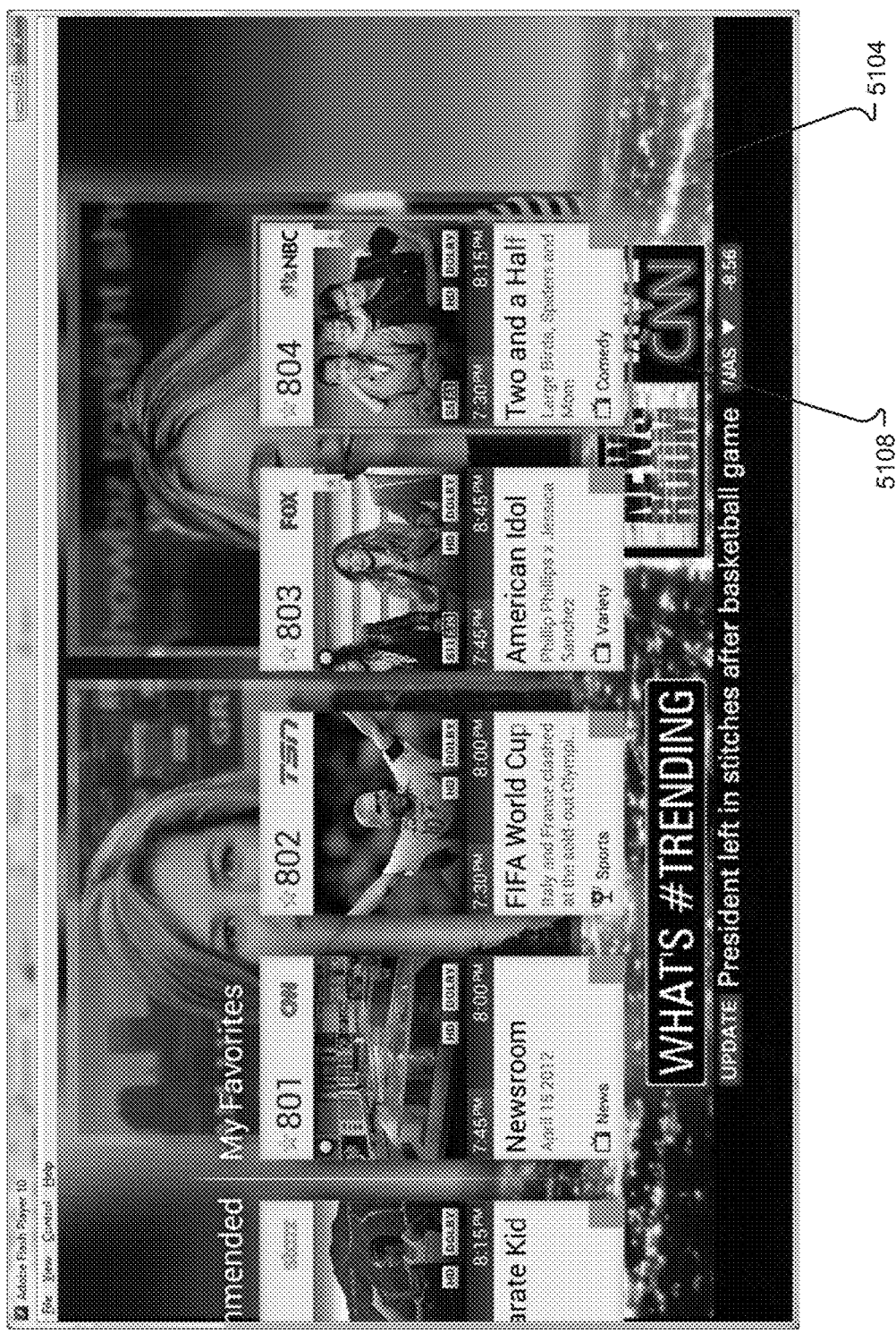
FIG. 51 illustrates favorites in Live TV channel selection.
Figure 52:
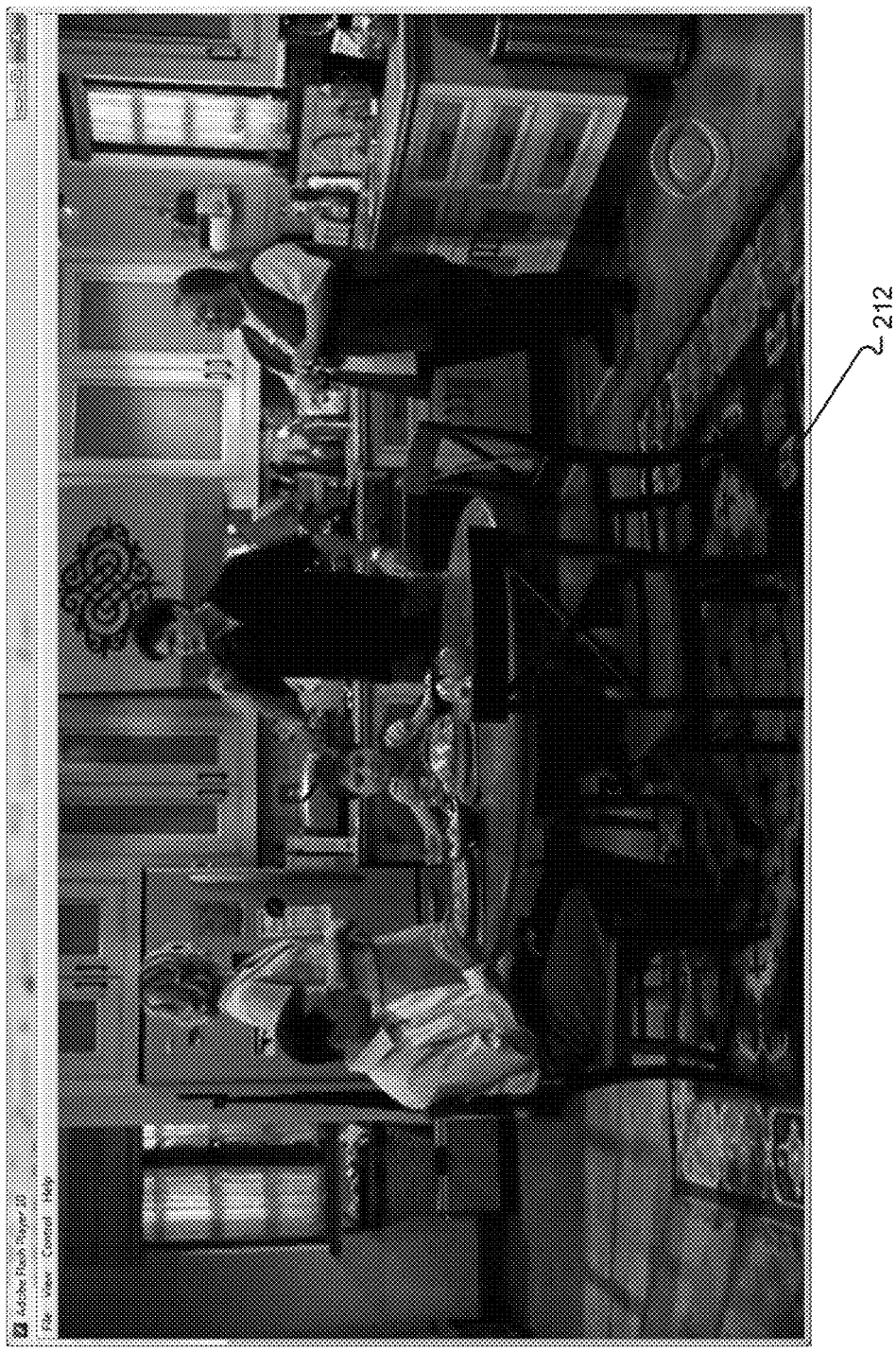
FIG. 52 illustrates tuning to a Live TV channel.

As illustrated in FIG. 51, if a user scrolls to the right, all of the "my favorites" channels are shown noting that in the background, the currently selected Live TV channel is still being presented. This active Live TV channel 5104 can persist optionally regardless of the navigation the user is performing through the other available channels. In FIG. 51, channel 5108 is highlighted, indicated by the highlight box, and upon user selection, via for example the enter button on the remote control, the channel corresponding to 5108 is displayed, as illustrated in FIG. 52.

Figure 53:
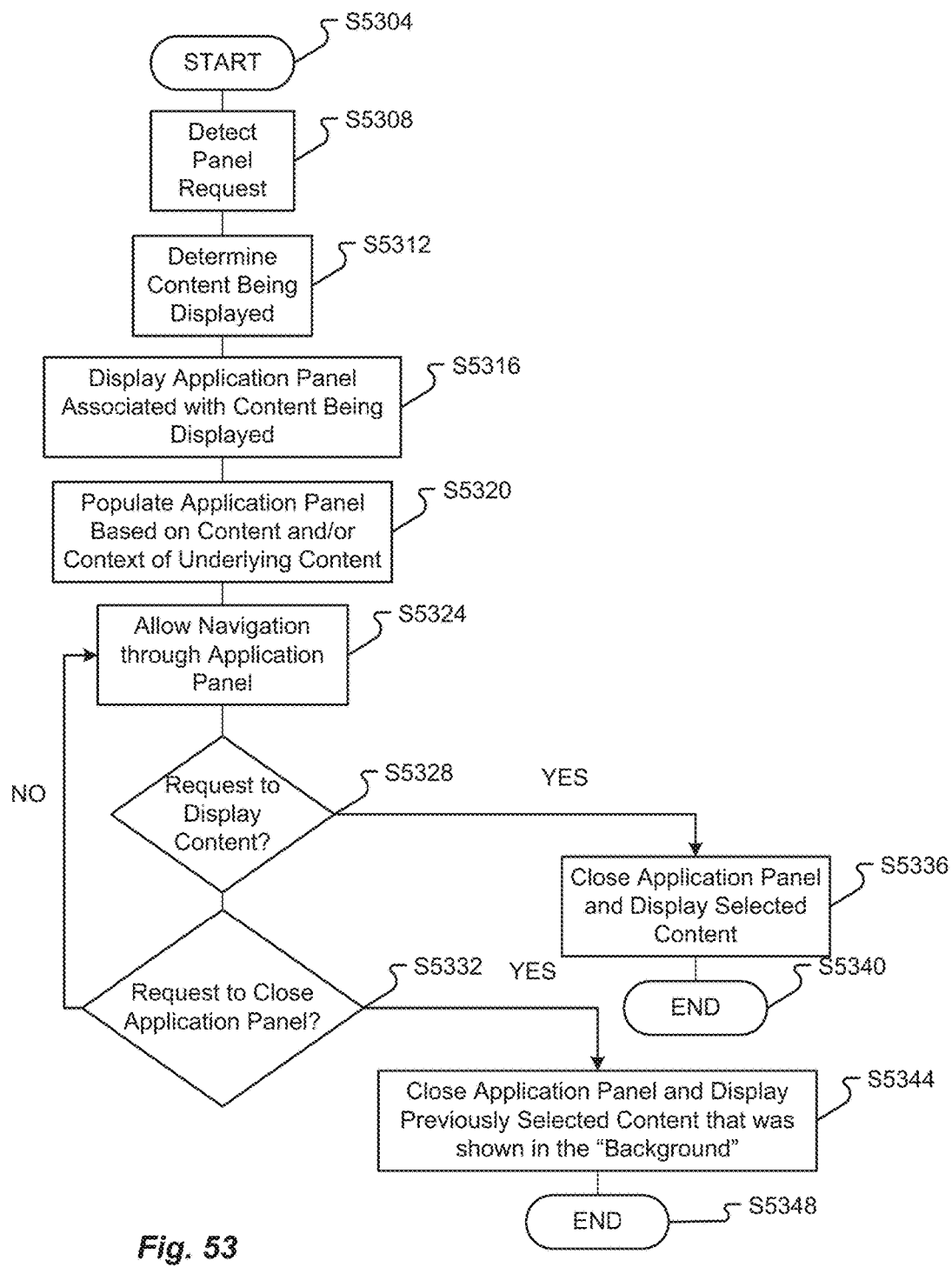
FIG. 53 is a flowchart outlining an exemplary method of panel navigation and management.

FIG. 53 illustrates an exemplary method of managing the application panel. In particular, control begins in step S5304 and continues to step S5308. In step S5308, a request for the application panel is detected. Next, in step S5312, a determination is made as to the underlying content being displayed, e.g., Live TV 452, on demand 456, media center 460, applications 464, or other inputs 468. Then, in step S5316, the application panel associated with the underlying content being displayed is displayed. Control than continues to step S5320.

In step S5320, the application panel is populated based on the underlying content and/or context of the underlying content. Next, in step S5324, navigation through the application panel is allowed. Then, in step S5328, a determination is made as to whether content within the application panel has been selected for display. If content within the application panel is selected for display, control jumps to step S5336 where the application panel is closed and the selected content is displayed with control continue to step S5340.

Otherwise, control continues to step S5332 where a determination is made as to whether a request to close the application panel has been received. If a request to close the application panel has been received, control jumps to step S5344 where the application panel is closed and the previously selected content that was shown in the "background" is displayed on display screen 212, with control continuing to step S5348 where the control sequence ends.

Otherwise, control jumps back to step S5324.

Figure 54:
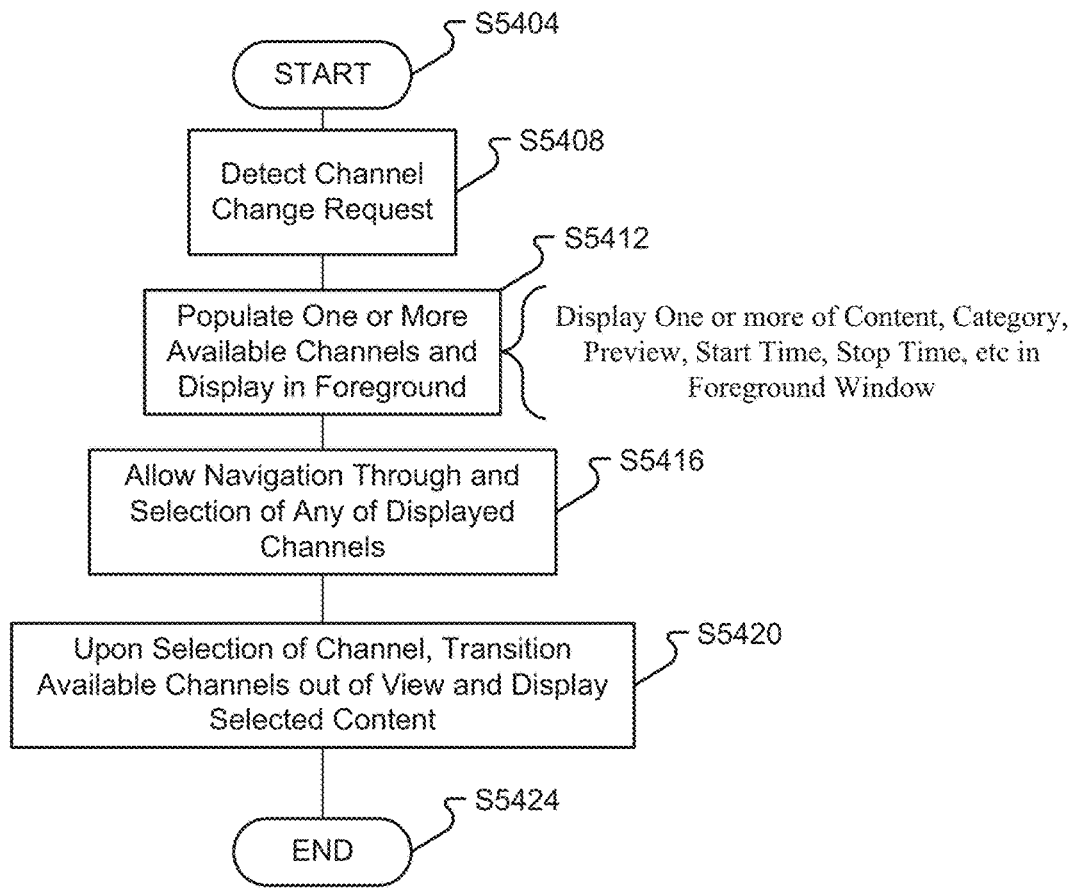
FIG. 54 is a flowchart illustrating an exemplary embodiment of channel navigation.

FIG. 54 outlines an exemplary method of channel navigation. In particular, control begins in step S5404 and continues to step S5408. In step S5408, a channel change request is detected. Next, in step S5412, one or more available channels are populated and displayed in the foreground with, for example, the underlying content being displayed in the background with the available channels optionally being transparent or semi-transparent. Associated with the one or more available channels can be information such as a live preview, category information, start time, stop time, title information, or in general any information associated with that available channel. Control than continues to step S5416.

In step S5416, navigation through the available channels is allowed, with the user optionally being able to select any of the available channels through, for example, pressing of the enter or select button on the remote control. Next, in step S5420, and upon selection of a channel, transition to the selected channel is performed with the selected content being displayed and the available channels being transitioned out of view. Control then continues to step S5424 where the control sequence ends.

The exemplary systems and methods of this disclosure have been described in relation to panels and silos on the Intelligent TV. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a special purpose computer, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device. Moreover, the functionality of the intelligent TV could optionally be entirely embodied in software (a soft intelligent TV) running on, for example, a computing device, tablet, media consumption device, or the like.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of managing an application panel on an intelligent television (TV) comprising: displaying live TV content on the intelligent TV;
   detecting, by a hardware processor, a request to invoke the application panel based on a selection of an application panel button on a remote control associated with the intelligent TV;
   in response to the request, detecting, by the hardware processor, the displayed content on the intelligent TV;
   determining, based on the detected displayed content, and, by the hardware processor, a type of content being displayed, wherein the type of content is at least one of an application and a video on demand;
   displaying, by the hardware processor, the application panel on the intelligent TV, wherein the application panel covers at least a portion of the displayed content;
   in response to the request, detecting, by the hardware processor, context information, wherein the context information is based at least on the determined type of displayed content and a location of the display of the application panel, wherein the location is along at least one edge of the display, wherein the application panel is associated with a silo, wherein the silo is at least one of a Live TV silo, an on-demand silo, a media center silo, and an applications silo;

determining, by the hardware processor, an information to display in the application panel based on both of the displayed content on the intelligent TV and the context information, wherein the determined information includes one or more of an information portion, a new portion, a recommended portion, a genre portion, an electronic program guide, a category portion, a favorites portion and a search portion; and displaying, by the hardware processor, the determined information in the application panel on a display of the intelligent TV.

2. The method of claim 1, wherein the application panel hovers above background content and is partially transparent.

3. The method of claim 2, further comprising continuing to display active background content.

4. The method of claim 2, wherein the background content is Live TV, on demand content, media center content, applications or content from other inputs.

5. The method of claim 4, wherein the application panel is dynamically updated based on the background content.

6. The method of claim 1, further comprising determining and providing one or more sub-categories of information in the application panel.

7. The method of claim 1, further comprising determining and providing one or more sub-categories of selectable information in the application panel.

8. The method of claim 1, wherein the application panel includes executable portions.

9. A system to manage an application panel on an intelligent television (TV) comprising:
　a hardware processor adapted to detect a request to invoke the application panel based on a selection of an application panel button on a remote associated with the intelligent TV;
　a hardware memory, in communication with the hardware processor, the hardware memory adapted to store a panel controller adapted to detect the displayed content on the intelligent TV, the panel controller further adapted to determine, based on the detected displayed content, a type of content being displayed, wherein the type of content is at least one of an application and a video on demand, the panel controller further adapted to detect context information, wherein the context information is based at least on the determined type of displayed content and a location of the application panel, wherein the location is along at least one edge of the display, wherein the application panel is associated with a silo, wherein the silo is at least one of a Live TV silo, an on-demand silo, a media center silo, and an applications silo;
　the hardware memory adapted to store a silo application adapted to determine an information to display in the application panel based on both of the displayed content on the intelligent TV and the context information, wherein the determined information includes one or more of an information portion, a new portion, a recommendation portion, a genre portion, an electronic program guide, a category portion, a favorites portion and a search portion; and
　a display controller adapted to display live TV content and the determined information in the application panel on a display of the intelligent TV.

10. The system of claim 9, wherein the application panel hovers above background content and is partially transparent.

11. The system of claim 10, wherein active background content is displayed.

12. The system of claim 10, wherein the background content is Live TV, on demand content, media center content, applications or content from other inputs.

13. The system of claim 12, wherein the application panel is dynamically updated based on the background content.

14. The system of claim 9, further comprising a content presentation service adapted to determine and provide one or more sub-categories of information in the application panel.

15. The system of claim 9, a content presentation service adapted to determine and provide one or more sub-categories of selectable information in the application panel.

16. The system of claim 9, wherein the application panel includes executable portions.

17. A non-transitory computer readable information storage media having stored thereon instructions, that when executed by one or more processors, cause to be performed:
　displaying live TV content on the intelligent TV;
　detecting a request to invoke the application panel based on a selection of an application panel button on a remote control associated with the intelligent TV;
　in response to the request, detecting the displayed content on the intelligent TV;
　determining, based on the detected displayed content, a type of content being displayed, wherein the type of content is at least one of an application and a video on demand,
　displaying the application panel on the intelligent TV, wherein the application panel covers at least a portion of the displayed content;
　in response to the request, detecting context information, wherein the context information is based at least on the determined type of displayed content and a location of the display of the application panel, wherein the location is along at least one edge of the display, wherein the application panel is associated with a silo, wherein the silo is at least one of a Live TV silo, an on-demand silo, and an applications silo;
　determining an information to display in the application panel based on both of the displayed content on the intelligent TV and the context information, wherein the determined information includes one or more of an information portion, a new portion, a recommended portion, a genre portion, an electronic program guide, a category portion, a favorites portion and a search portion; and
　displaying the determined information in the application panel on a display of the intelligent TV.

18. The non-transitory computer readable information storage media of claim 17, wherein the application panel hovers above background content and is partially transparent.

19. The non-transitory computer readable information storage media of claim 18, further comprising continuing to display active background content.

* * * * *

UNITED STATES PATENT AND TRADEMARK OFFICE
CERTIFICATE OF CORRECTION

PATENT NO. : 9,820,003 B2
APPLICATION NO. : 14/945612
DATED : November 14, 2017
INVENTOR(S) : Eduardo Diego Torres Milano et al.

It is certified that error appears in the above-identified patent and that said Letters Patent is hereby corrected as shown below:

In the Claims

Claim 17, Column 46, Line 32, delete "demand," and insert --demand;--.

Signed and Sealed this
Nineteenth Day of June, 2018

Andrei Iancu
*Director of the United States Patent and Trademark Office*